(12) United States Patent
Ninglekhu et al.

(10) Patent No.: US 12,127,106 B2
(45) Date of Patent: Oct. 22, 2024

(54) APPARATUS, SYSTEM AND METHOD FOR ENHANCEMENTS TO NETWORK SLICING AND THE POLICY FRAMEWORK OF A 5G NETWORK

(71) Applicant: IPLA HOLDINGS INC., New York, NY (US)

(72) Inventors: Jiwan L. Ninglekhu, Royersford, PA (US); Michael F. Starsinic, Newtown, PA (US); Hongkun Li, Malvern, PA (US); Quang Ly, North Wales, PA (US); Catalina Mihaela Mladin, Hatboro, PA (US); Pascal M. Adjakple, Great Neck, NY (US)

(73) Assignee: IPLA HOLDINGS INC, New York, NY (US)

( * ) Notice: Subject to any disclaimer, the term of this patent is extended or adjusted under 35 U.S.C. 154(b) by 373 days.

(21) Appl. No.: 17/619,075

(22) PCT Filed: Jun. 12, 2020

(86) PCT No.: PCT/US2020/037461
§ 371 (c)(1),
(2) Date: Dec. 14, 2021

(87) PCT Pub. No.: WO2020/252281
PCT Pub. Date: Dec. 17, 2020

(65) Prior Publication Data
US 2022/0272620 A1    Aug. 25, 2022

Related U.S. Application Data

(60) Provisional application No. 62/861,841, filed on Jun. 14, 2019, provisional application No. 62/887,881, filed on Aug. 16, 2019.

(51) Int. Cl.
*H04W 48/18* (2009.01)
*H04W 40/02* (2009.01)
(Continued)

(52) U.S. Cl.
CPC .......... *H04W 48/18* (2013.01); *H04W 40/02* (2013.01); *H04W 48/06* (2013.01); *H04W 60/00* (2013.01); *H04W 88/16* (2013.01)

(58) Field of Classification Search
CPC ..... H04W 48/18; H04W 40/02; H04W 48/06; H04W 60/00; H04W 88/16; H04W 88/02
(Continued)

(56) References Cited

U.S. PATENT DOCUMENTS

2006/0209851 A1*  9/2006  Scudder ............... H04L 45/308
                                                                370/401
2015/0126187 A1    5/2015  Ponukumati et al.
(Continued)

FOREIGN PATENT DOCUMENTS

CN    109286567 A    1/2019
WO    2019/032972 A1    2/2019

OTHER PUBLICATIONS

CT1 "Reply LS on PTI handling in UE policy delivery service", 3GPP Draft; C3-191045, 3rd Generation Partnership Project (3GPP), Mobile Competence Centre ; 650, Route Des Lucioles ; F-06921 Sophia-Antipolis Cedex ; France vol. CT WG3, No. Xi An, China; Apr. 8, 2019-Apr. 12, 2019 Apr. 7, 2019 (Apr. 7, 2019), XP051698985.
(Continued)

*Primary Examiner* — Huy C Ho
(74) *Attorney, Agent, or Firm* — CHIP LAW GROUP

(57) ABSTRACT

There is provided an apparatus that includes processing circuitry which determines that a policy is needed from a network for a particular type of traffic or network connection, transmit a non-access stratum (NAS) message to the
(Continued)

network to request a policy, the message indicating what type of traffic or network the policy is required, and receive a response from the network. Provided is another apparatus that includes processing circuitry which receives a first non-access stratum (NAS) message from a network with configuration information that indicates that notifications related to the use of policies by the apparatus are desired, and transmit a second non-access stratum (NAS) message to the network, the second NAS message includes the notification relating to the use of policies by the apparatus.

18 Claims, 25 Drawing Sheets

(51) Int. Cl.
*H04W 48/06* (2009.01)
*H04W 60/00* (2009.01)
*H04W 88/16* (2009.01)

(58) Field of Classification Search
USPC .......................................................... 370/329
See application file for complete search history.

(56) References Cited

U.S. PATENT DOCUMENTS

| 2016/0345244 | A1 | 11/2016 | Chuttani et al. |
| 2019/0029065 | A1 | 1/2019 | Park et al. |
| 2021/0184965 | A1* | 6/2021 | Wang ...................... H04L 45/42 |

OTHER PUBLICATIONS

NTT Docomo et al: "Clarification on user preference and URSP", 3GPP Draft; 23503 CR0164R11 5GS PH1 (REL-15) S2-181339 0 WAS13318_WAS13113-WAS13006_WAS12163 WAS1 1569 E-Mail Revision 10 OF 1811552, 3rd Generation Partnership Project (3GPP), Mobile Competence Centre vol. SA WG2, No. West Palm Beach, USA; Nov. 26, 2018-Nov. 30, 2018 Dec. 4, 2018 (Dec. 4, 2018), XP051568095.

SA WG2: "New SID: Study on enhancement of 5G UE Policy", 3GPP Draft; SP-190449 S2-1906716 SID FS EUEPO, 3rd Generation Partnership Project (3GPP), Mobile Competence Centre ; 650, Route Des Lucioles ; F-06921 Sophia-Antipolis Cedex; France vol. TSG SA, No. Newport Beach, USA; Jun. 5, 2019-Jun. 7, 2019 May 29, 2019 (May 29, 2019), XP051749084.

* cited by examiner

1200

| Contexts | ▼ |
|---|---|
| Time Window | ● |
| Location | ● |
| UE State | ◉ |
| Application Category | ◉ |
| UE User's Roles | ● |

| Select Pre-Conditions | ▼ |
|---|---|
| Conflicting Events | ● |
| Deregister LP Slice | ● |
| Deregister HP Slice | ● |

| Preparation Actions | ▼ |
|---|---|
| Send Registration Update | ● |
| Stop User Place data | ◉ |
| Deregister HP Slice | ● |

Confirm

Enter Third Party Encryption Key

Enter/Enter S-NSSAI Name

Select Encryption Algorithms ▼

Activate Trusted Third Party Encryption

| 8 | 7 | 6 | 5 | 4 | 3 | 2 | 1 | |
|---|---|---|---|---|---|---|---|---|
| \multicolumn{8}{|c|}{Length of UPSI sublist} | octet d / octet d+1 |
| \multicolumn{4}{|c|}{MCC digit 2} | \multicolumn{4}{c|}{MCC digit 1} | octet d+2 |
| \multicolumn{4}{|c|}{MNC digit 3} | \multicolumn{4}{c|}{MCC digit 3} | octet d+3 |
| \multicolumn{4}{|c|}{MNC digit 2} | \multicolumn{4}{c|}{MNC digit 1} | octet d+4 |
| \multicolumn{8}{|c|}{UPSC} | octet d+5 / octet d+6 |
| \multicolumn{8}{|c|}{UPSC} | octet d+7* / octet d+8* |
| \multicolumn{8}{|c|}{• • •} | octet d+9* / octet e* |
| \multicolumn{8}{|c|}{UPSC} | octet e+1* / octet d+2* |

FIG. 15

APPARATUS, SYSTEM AND METHOD FOR ENHANCEMENTS TO NETWORK SLICING AND THE POLICY FRAMEWORK OF A 5G NETWORK

CROSS-REFERENCE TO RELATED APPLICATIONS

This application is the National Stage Application of International Patent Application No. PCT/US2020/037461, filed Jun. 12, 2020 which claims priority to U.S. Provisional Application 62/861,841, filed Jun. 14, 2019, and to U.S. 62/887,881, filed Aug. 16, 2019, the contents of each of which are hereby incorporated by reference in their entirety.

FIELD

The present disclosure relates generally to wireless communications, and more particularly to wireless communications systems, devices, methods, and computer readable mediums to execute a Policy Exchange Framework and execute a Mutually Exclusive Access to Network Slices (MEANS) procedure and a slice-specific third-party encryption procedure.

SUMMARY

An exemplary embodiment of the present disclosure provides an apparatus comprising processing circuitry that is configured to determine that a policy is needed from a network for a particular type of traffic or network connection, transmit a non-access stratum (NAS) message to the network to request a policy, the message indicating what type of traffic or network the policy is required, and receive a response from the network.

Another exemplary embodiment of the present disclosure provides an apparatus comprising processing circuitry that is configured to receive a first non-access stratum (NAS) message from a network with configuration information that indicates that notifications related to the use of policies by the apparatus are desired, and transmit a second non-access stratum (NAS) message to the network, the second NAS message includes the notification relating to the use of policies by the apparatus.

Another exemplary embodiment of the present disclosure provides a method comprising determining, by processing circuitry, that a policy is needed from a network for a particular type of traffic or network connection; transmitting a non-access stratum (NAS) message to the network to request a policy, the message indicating what type of traffic or network the policy is required; and receiving a response from the network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein:

FIG. 12 shows an exemplary graphical user interface (GUI) for selecting contexts, pre-conditions and preparation actions for MEANS policy rules;

FIG. 13 shows an exemplary GUI for activating third-party encryption in a UE;

FIG. 15 shows an exemplary format of a UPSI sublist;

Figure 1A:
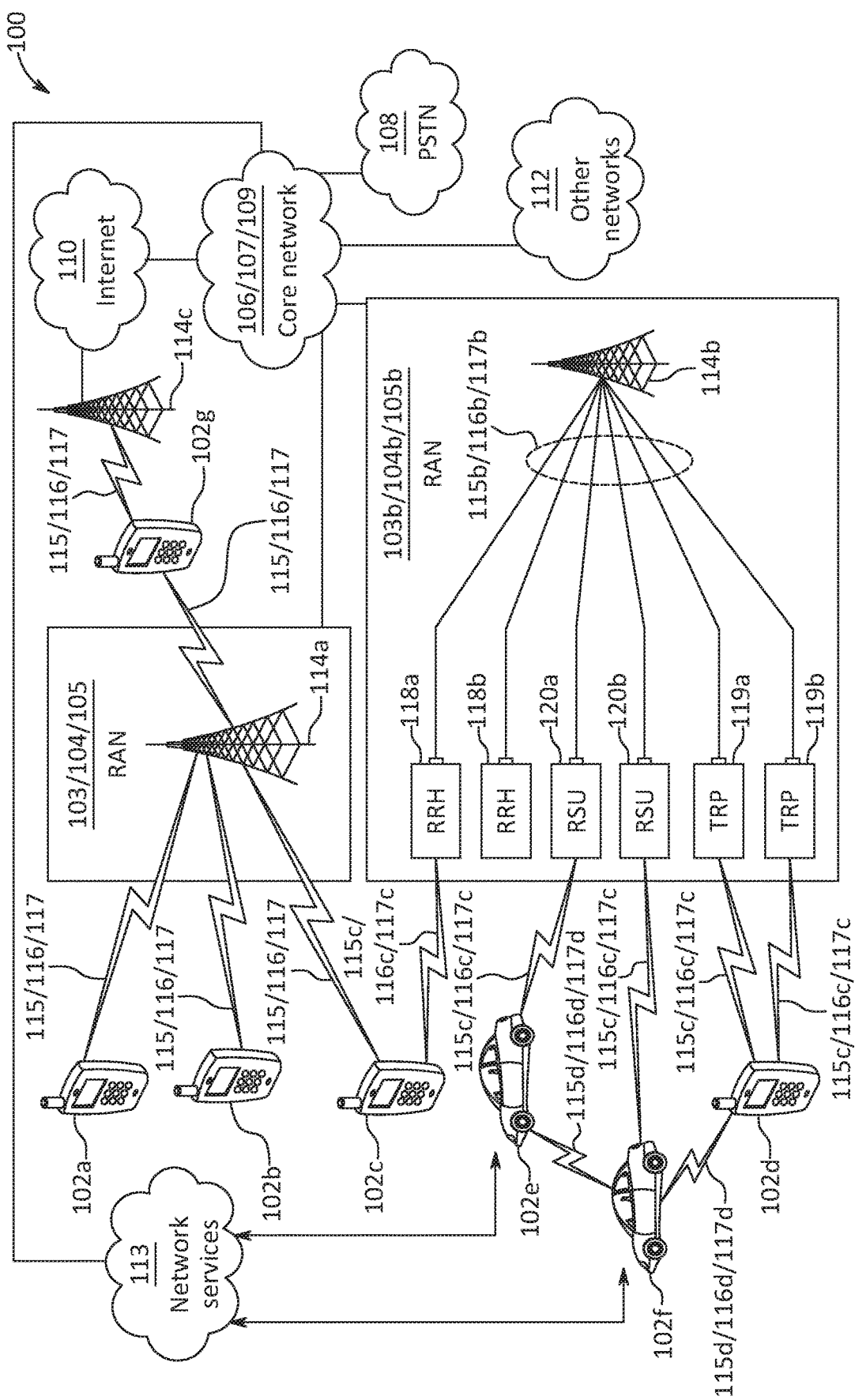
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE- Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to include a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB), ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

The following is a list of acronyms relating to service level and core network technologies that may appear in this description. Unless otherwise specified, the acronyms used herein refer to the corresponding term listed below.

TABLE 1

| | Abbreviations |
|---|---|
| 5G-GUTI | 5G Globally Unique Temporary Identifier |
| 5G-S-TMSI | 5G S-Temporary Mobile Subscription Identifier |
| 5GC | 5G Core Network |
| AAA | Authentication, Authorization, and Accounting |
| AAA-S | Authentication, Authorization, and Accounting Server |
| AF | Application Function |
| AMF | Access and Mobility Management Function |
| ANDSP | Access Network Discovery and Selection Policy |
| AS | Access Stratum |
| CN | Core Network |
| 5G-GUTI | 5G Globally Unique Temporary Identifier |
| CRC | Cyclic Redundancy Check |
| DL | Downlink |
| DNN | Data Network Name |
| DRX | Discontinuous Reception |
| EAP | Extensible Authentication Protocol |
| EPC | Evolved Packet Core |
| ePDG | Evolved Packet Data Gateway |
| GPS | Global Position System |

TABLE 1-continued

| | Abbreviations |
|---|---|
| GPSI | Generic Public Subscription Identifier |
| GTP | GPRS Tunneling Protocol |
| GUI | Graphical User Interface |
| HPLMN | Home Public Land Mobile Network |
| IMSI | International Mobile Subscriber Identity |
| IP | Internet Protocol |
| I-UPF | Intermediate User Plane Function |
| LADN | Local Area Data Network |
| LTE | Long Term Evolution |
| MCC | Mobile Country Code |
| MEANS | Mutually Exclusive Access to Network Slices |
| MF | Mobility Function |
| MM | Mobility Management |
| MME | Mobility Management Entity |
| MNC | Mobile Network Code |
| MNO | Mobile Network Operator |
| N3AN | Non-3GPP Access Network |
| N3GPP | Non-3GPP |
| N3IWF | Non-3GPP Interworking Function |
| NAS | Non-Access Stratum |
| NEF | Network Exposure Function |
| NF | Network Function |
| NG-AN | Next Generation Access Network |
| 5G-GUTI | 5G Globally Unique Temporary Identifier |
| NR | New Radio |
| NSSAI | Network Slice Selection Assistance Information |
| NWDAF | Network Data Analytic Function |
| OS | Operating System |
| OSAppID | Operating System Application Identifier |
| OSId | Operating System Identifier |
| PCF | Policy Control Function |
| PDR | Packet Detection Rule |
| PDU | Protocol Data Unit |
| PEI | Permanent Equipment Identifier |
| PLMN | Public Land Mobile Network |
| PSA | PDU Session Anchor |
| PSI | Policy Section Identifier |
| (R)AN | (Radio) Access Network |
| RSD | Route Selection Descriptor |
| SLA | Service Level Agreement |
| SMF | Session Management Function |
| SSC | Session and Service Continuity |
| SSID | Service Set Identifier |
| S-NSSAI | Single NSSAI |
| SUPI | Subscriber Permanent Identifier |
| TAU | Tracking Area Update |
| TCP | Transmission Control Protocol |
| TP-UPF | Third-party User Plane Function |
| UDM | User Data Management |
| UDR | Unified Data Repository |
| UDSF | Unstructured Data Storage Function |
| UE | User Equipment |
| UPF | User Plane Function |
| UPSC | UE policy section code |
| UPSI | UE policy section identifier |
| 5G-GUTI | 5G Globally Unique Temporary Identifier |
| URSP | UE Route Selection Policy |
| UL | Uplink |
| URSP | UE Route Selection Policy |
| VPLMN | Visited PLMN |
| V2X | Vehicle to Everything |

Moreover, the following terms may appear in this description. Unless otherwise specified, the terms may be described as follows.

Third-party: An organization or an entity other than UE owner or MNO, e.g. a business enterprise.

Privacy/Private: A state or condition of being free from being observed or interfered by unauthorized entities.

Encryption: Encryption is a method by which plain text, or any other type of original data is converted from its readable form to an encoded version that can only be decoded using a decryption key.

Mutually Exclusive Slices: Two or more slices that the UE is allowed to access, but not allowed to access simultaneously.

Network Function: A functional building block within a network infrastructure, which has a well-defined external interfaces and well-defined functional behavior. In practical terms, a Network Function is today often a network node or physical appliance.

Virtual Network Function (VNF): Virtualized network services running on computing platforms that used to be carried out by dedicated hardware. Most VNFs are run in virtual machines (VMs). Common VNFs include virtualized routers, firewalls, WAN optimization, and network address translation (NAT) services.

Network Function Virtualization (NFV): Network functions virtualization (NFV) is an initiative to virtualize network services traditionally run on proprietary, dedicated hardware. With NFV, functions like routing, load balancing and firewalls are packaged as virtual machines (VMs) on commodity hardware.

Application Server (AS): A server that provides push services through a delivery network, e.g. via an IP connection.

PDU Session Anchor (PSA): PSA is the term given to the UPF (User Plane Function) which terminates the N6 interface of a PDU session within a 5G core network.

Note that the terms PSI and UPSI may be used interchangeably in this document.

Example Communication System and Networks FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the features included herein may equally apply to UEs that are WTRUs and UEs that use a wired connection to connect to a network. For example, the features that apply to the wireless interfaces 115, 116, 117 and 115c/116c/117c may equally apply to a wired connection.

Figure 1B:
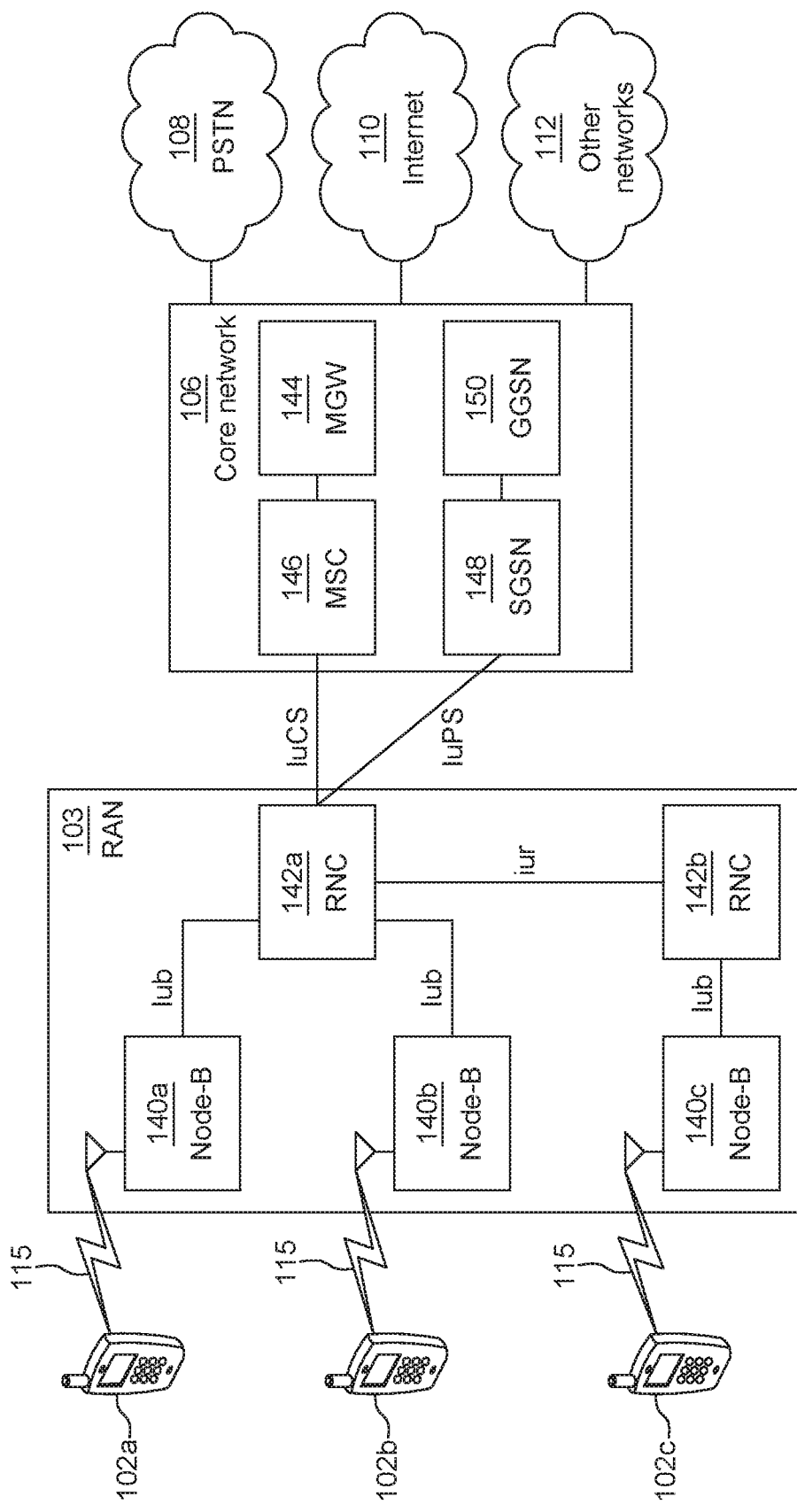
FIG. 1B is a system diagram that shows an example of a Radio Access Network (RAN) architecture and a core network architecture.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
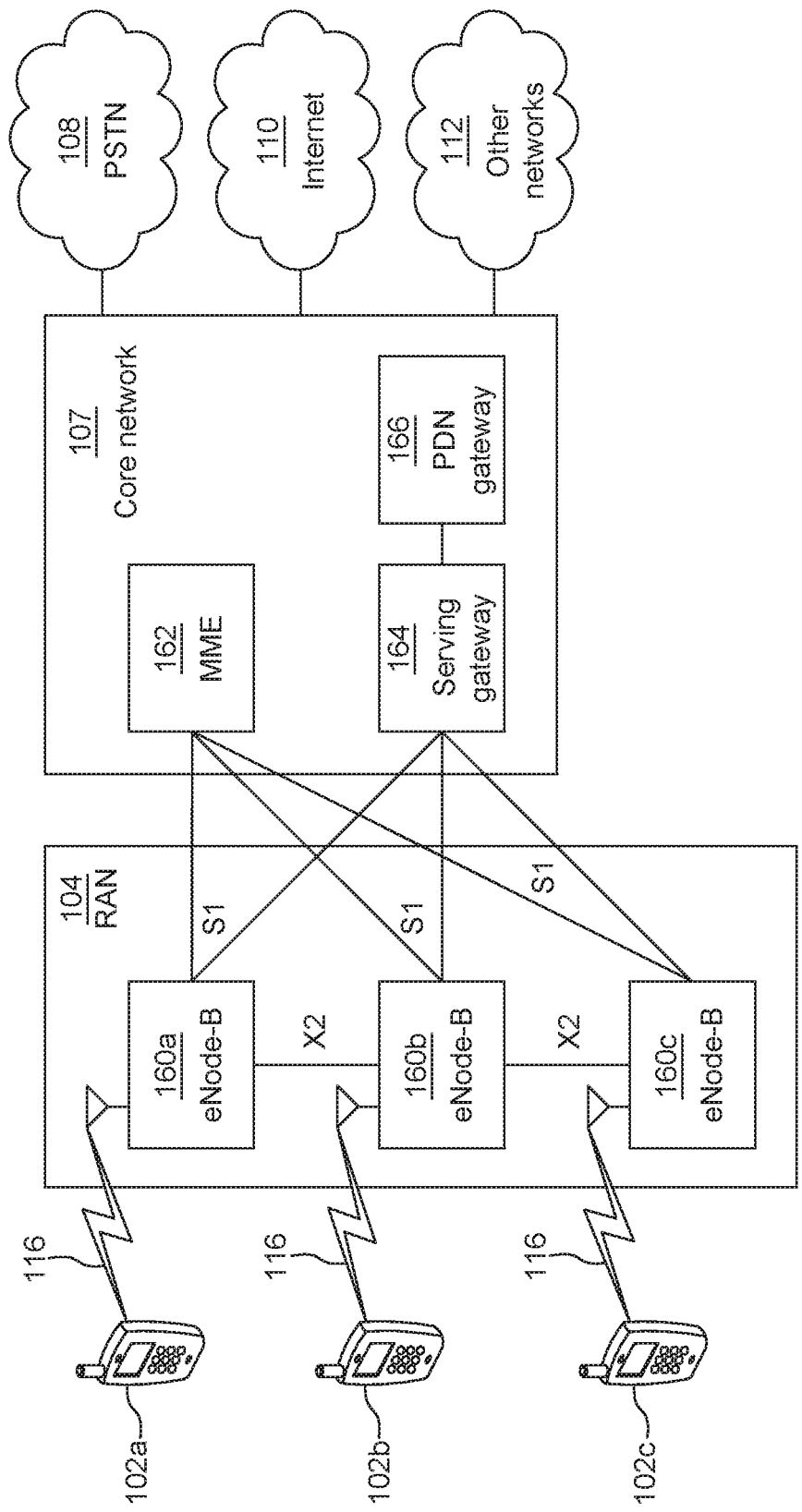
FIG. 1C is a system diagram that shows an example of a Radio Access Network (RAN) architecture and a core network architecture.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
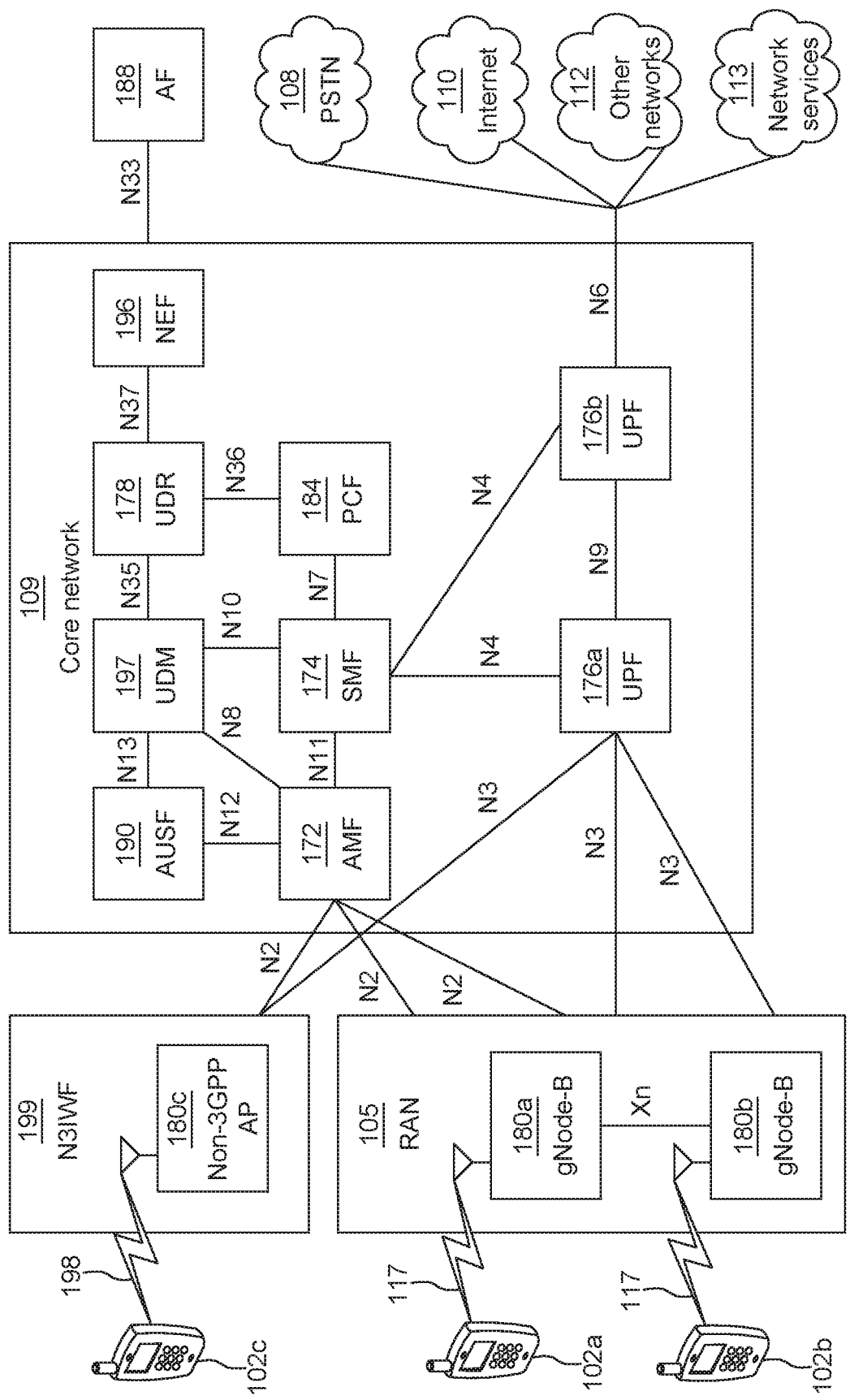
FIG. 1D is a system diagram that shows an example of a Radio Access Network (RAN) architecture and a core network architecture.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not include all of these elements, may include additional elements, and may include multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible for packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102*a*, 102*b*, and 102*c* so that the AMF may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102*a*, 102*b*, or 102*c* may connect to an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
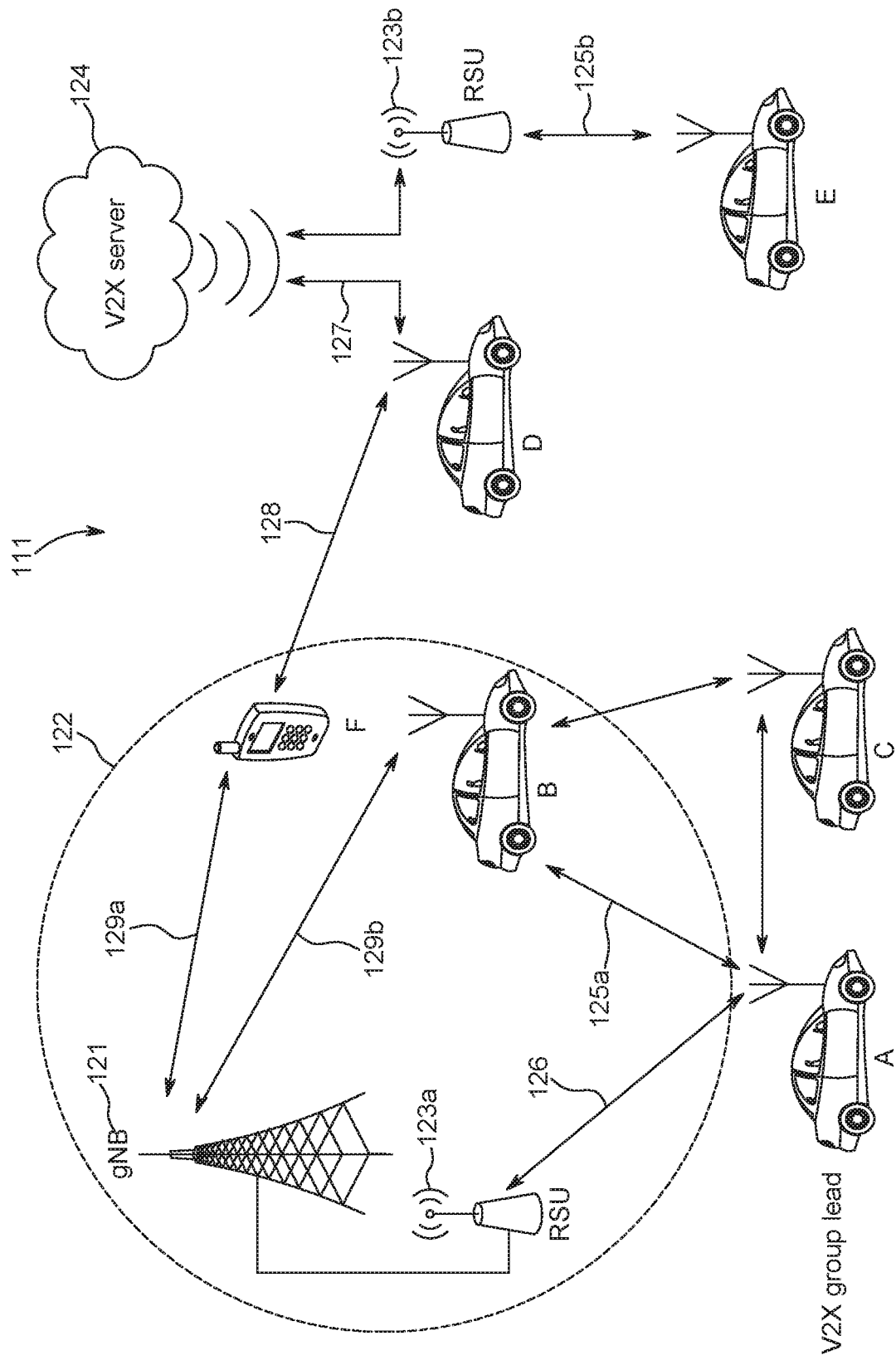
FIG. 1E is a system diagram that shows an example 3GPP architecture.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123*a* and 123*b*. In practice, the concepts presented herein may be applied to any number of WTRUs, base station gNBs, V2X networks, and/or other network elements. One or several or all WTRUs A, B, C, D, E, and F may be out of range of the access network coverage 122. WTRUs A, B, and C form a V2X group, among which WTRU A is the group lead and WTRUs B and C are group members.

WTRUs A, B, C, D, E, F may communicate with each other over a Uu interface 129*b* via the gNB 121 if they are under the access network coverage (only B and F are shown under the network coverage in FIG. 1E). WTRUs A, B, C, D, E, F may communicate with each other directly via a Sidelink (PC5 or NR PC5) interface 125 *a*, 125*b*, 128, if they are under or out of the access network coverage (e.g., A, C, WTRUs A, B, C, D, E, F may communicate with each other D and E are shown out of the network coverage in FIG. 1E).

WTRUs A, B, C, D, E, and F may communicate with RSU 123*a* or 123*b* via a Vehicle-to-Network (V2N) 126 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
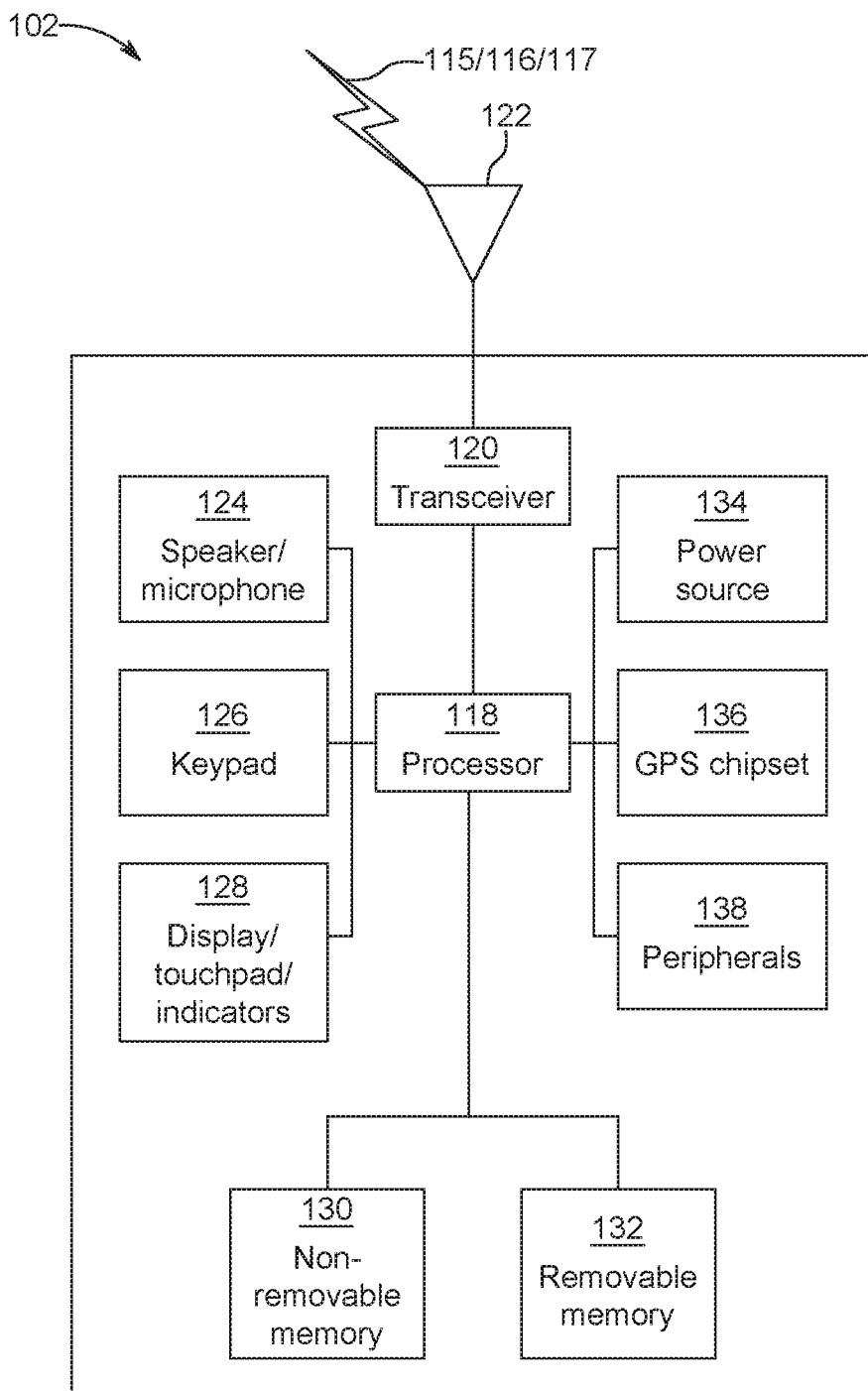
FIG. 1F is a system diagram of an example apparatus or device configured for wireless communications.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that may not be physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
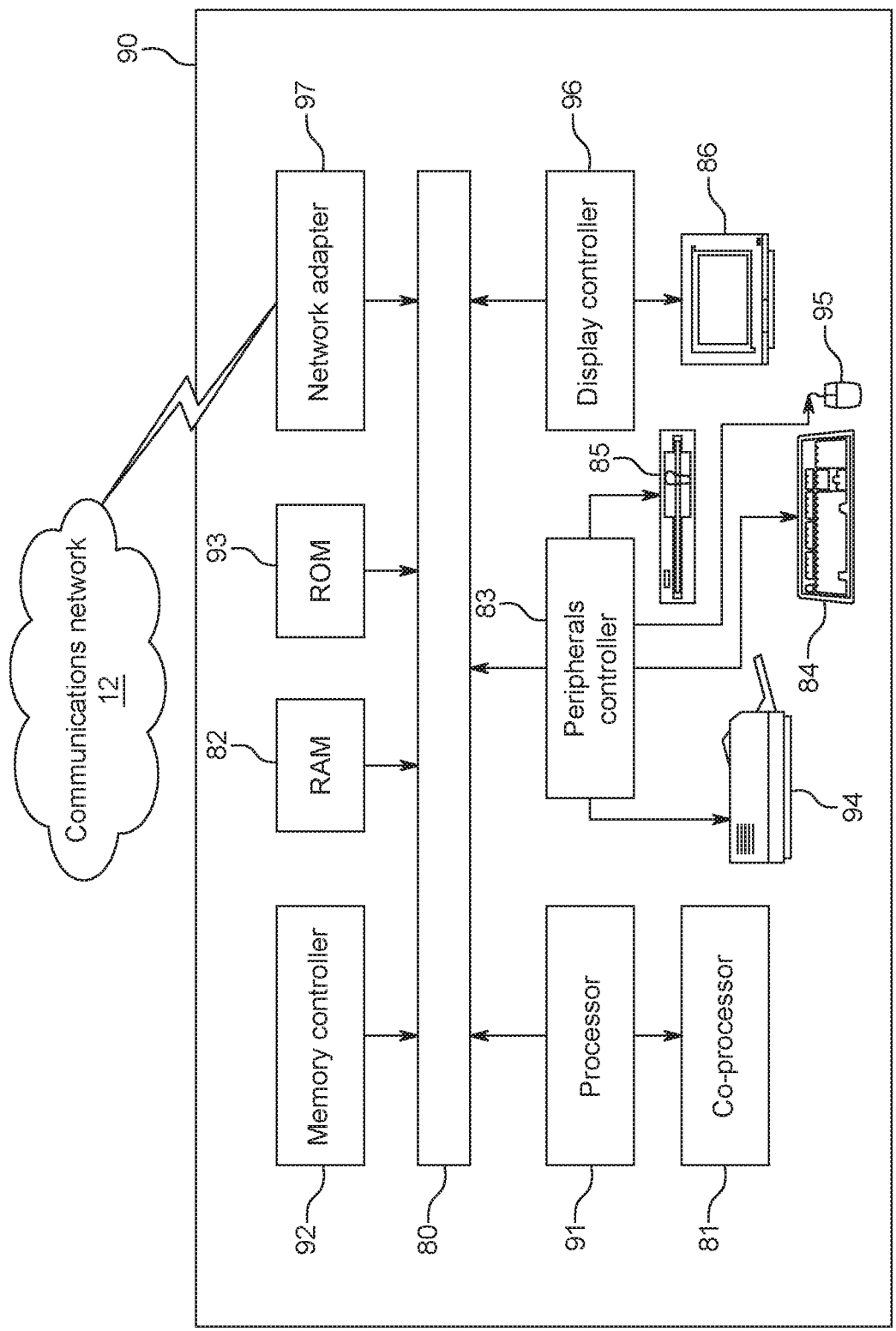
FIG. 1G is a system diagram that shows an example of a computing system used in a communication network.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a GUI. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

5G Non-Roaming Reference Architecture

Figure 2:
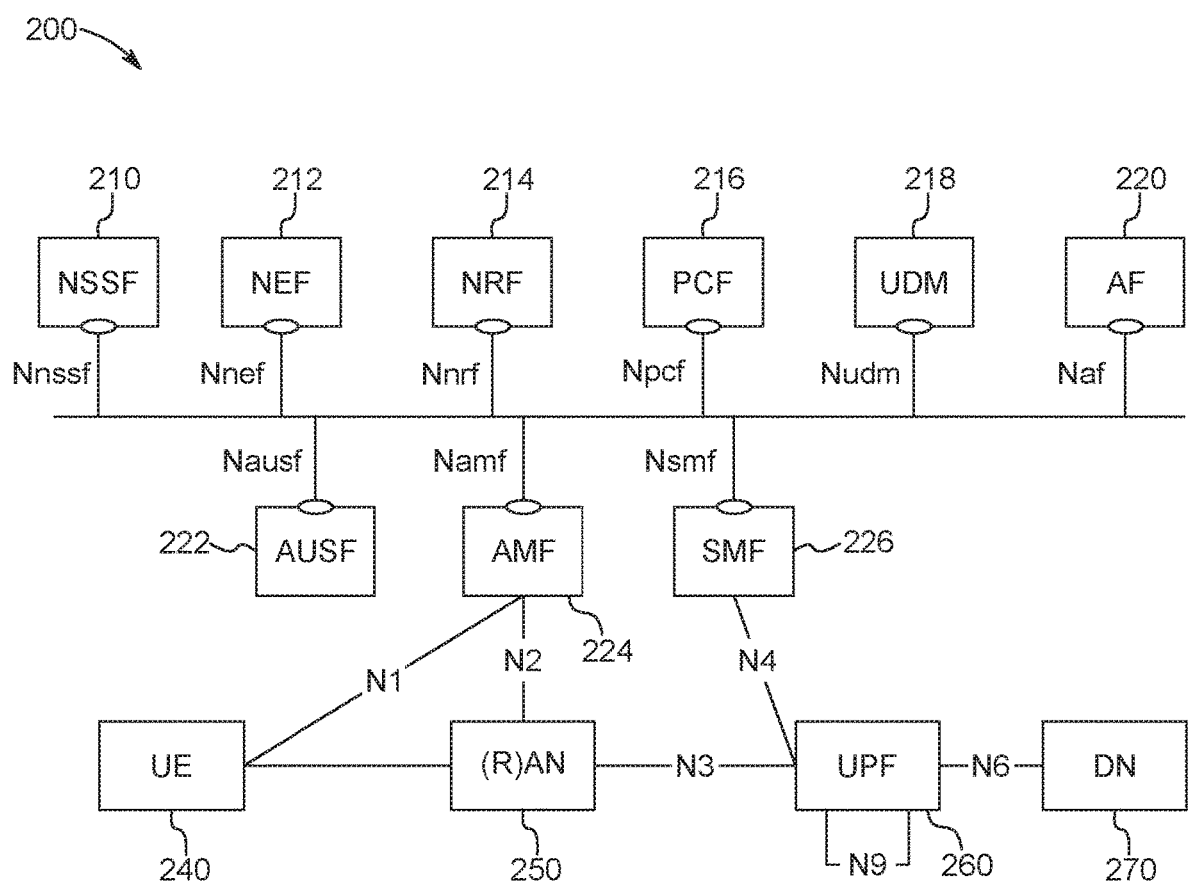
FIG. 2 shows an exemplary 5G system architecture.

FIG. 2 shows an exemplary 5G System non-roaming reference architecture. Service-based interfaces are used within the Control Plane in which network functions within the core network communicate with each other.

FIG. 2 illustrates essential network functions 200. Some additional network functions are not shown in FIG. 2 for simplicity. A full network function names are listed below. Their definitions are presented in clause 6.2 of TS 23.501 (TS 23.501, System Architecture for the 5G System; Stage 2, V15.2.0) and NF services are presented in clause 5.2 of TS 23.502 (TS 23.502, Procedures for the 5G System; Stage 2, V15.2.0), both incorporated herein by reference.

Network Slice Selection Function (NSSF) 210
Network Exposure Function (NEF) 212
Network Repository Function (NRF) 214
Policy Control Function (PCF) 216
Unified Data Management (UDM) 218
Application Function (AF) 220
Authentication Server Function (AUSF) 222
Access Management Function (AMF) 224
Session Management Function (SMF) 226
(Radio) Access Network ((R)AN) 250
User Plane Function (UPF) 260
Data Network (DN) 270.

Network Slicing

Network Slicing is a mechanism to be used by mobile network operators to support multiple 'virtual' networks behind the air interface. This involves 'slicing' the network into multiple virtual networks to support different service types. A UE 240 is able to connect to a slice via different RANs. Network slicing enables an operator to create networks customized to provide optimized solutions for different market scenarios which demands diverse requirements, e.g. in the areas of functionality, performance and isolation.

Figure 3:
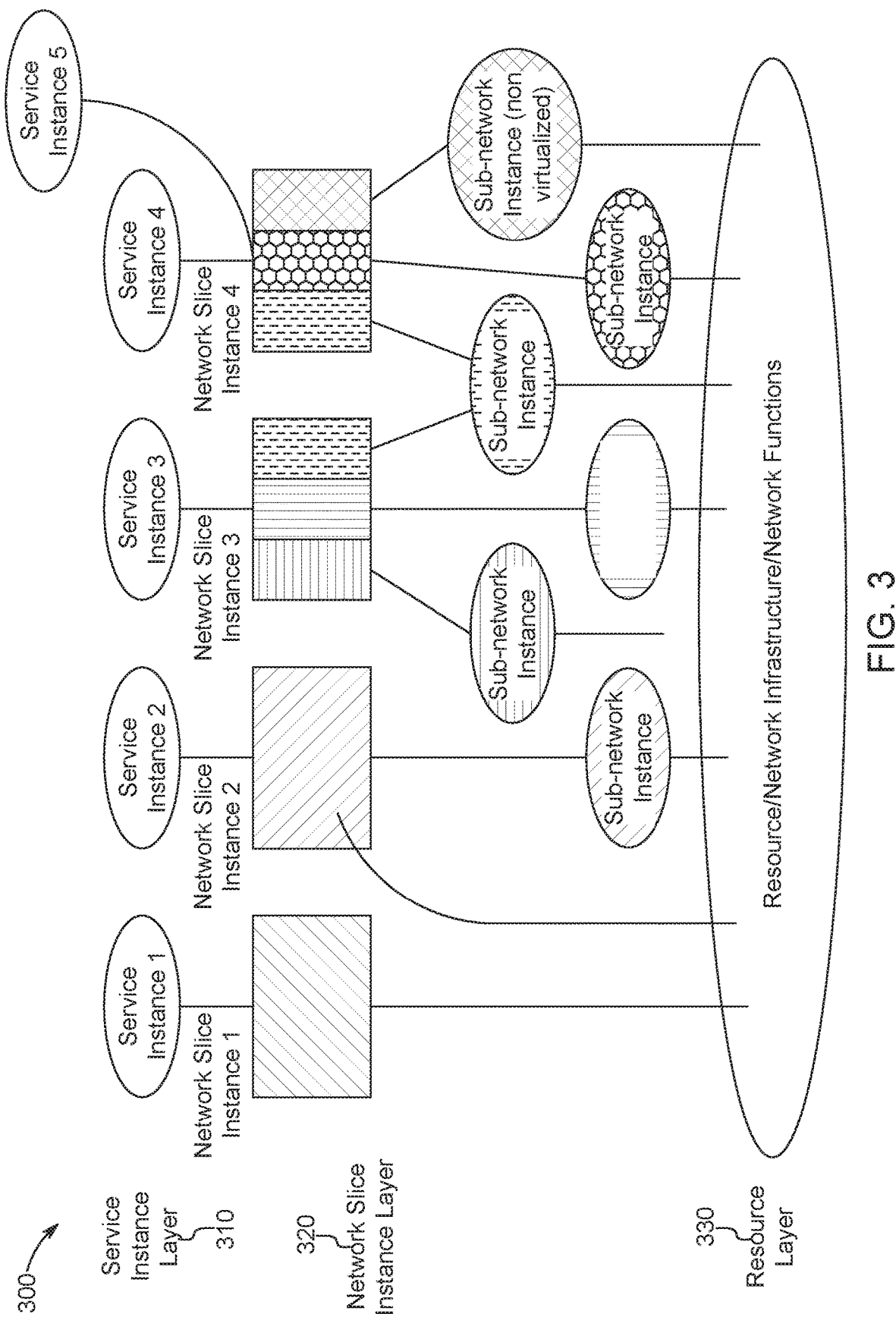
FIG. 3 shows an exemplary architecture of network slicing.

FIG. 3 shows an exemplary conceptual architecture of network slicing 300. Service instance layer 310 includes service instances. Network slice instance layer 320 includes network slice instances, each made up of a set of network functions and the resources to run these network functions. Different patterns are used to indicate the different network slice instances or sub-network slice instances. A sub-network slice instance comprises a set of network functions and resources to run those network functions but may not in itself a complete logical network. A sub-network slice instance may be shared by multiple network slice instances. Resource layer 330 includes resources, network infrastructure and network functions.

The illustrated architecture for network slicing 300 is a good fit for the 5G network because 5G use cases (e.g., massive IoT, critical communications, and enhanced mobile broadband) demand diverse and extreme requirements. Introduction of new network services is made more efficient with the illustrated network slicing.

5G Network Slicing Fundamentals

Network slices may differ based on supported features and network functions, and thus such Network Slices may have different Single Network Slice Selection Assistance Information(s) (S-NSSAIs) with different Slice/Service Types. An operator can deploy multiple Network Slice instances delivering the same features but for different groups of UEs, as they deliver a different committed service and/or because they are dedicated to a customer, in which case such Network Slices may have e.g. different S-NSSAIs with the same Slice/Service Type but different Slice Differentiators (TS 23.501 clause 5.15.2.1).

The network may serve a single UE with one or more Network Slice instances simultaneously regardless of access type(s) over which the UE is registered (i.e. 3GPP Access and/or N3GPP Access). An AMF instance serving the UE logically belongs to each of the Network Slice instances serving the UE, i.e. this AMF instance is common to the Network Slice instances serving a UE. The number of simultaneous network slice connections per UE is limited by the number of S-NSSAIs in the Requested/Allowed NSSAI. The selection of the set of Network Slice instances for a UE is triggered by the first contacted AMF in a Registration procedure normally by interacting with the NSSF and can lead to a change of AMF.

A PDU Session belongs to one and only one specific Network Slice instance per PLMN. Different Network Slice instances do not share a PDU Session, though different slices may have slice-specific PDU Sessions using the same DNN. During a Handover procedure, the source AMF selects a target AMF by interacting with the NRF.

The S-NSSAI and the NSSAI

The NSSAI is a collection of S-NSSAIs. An NSSAI may be a Configured NSSAI, a Requested NSSAI or an Allowed NSSAI. In an exemplary implementation, there are at most eight S-NSSAIs in Allowed and Requested NSSAIs sent in signaling messages between the UE and the Network. The Requested NSSAI signaled by the UE to the network allows the network to select the Serving AMF, Network Slice(s) and Network Slice instance(s) for this UE.

The S-NSSAIs in the Configured NSSAI, the Allowed NSSAI, the Requested NSSAI, the Rejected S-NSSAIs (TS 23.501) include only values from the Serving PLMN. The Serving PLMN can be the HPLMN or a VPLMN. The S-NSSAI(s) in a PDU Session Establishment Request include one Serving PLMN S-NSSAI value and in addition may include a corresponding HPLMN S-NSSAI value to which this first value is mapped.

The optional mapping of Serving PLMN S-NSSAIs to HPLMN S-NSSAIs include Serving PLMN S-NSSAI values and corresponding mapped HPLMN S-NSSAI values.

Based on the operator's operational or deployment needs, a Network Slice instance can be associated with one or more S-NSSAIs, and an S-NSSAI can be associated with one or more Network Slice instances. Multiple Network Slice instances associated with the same S-NSSAI may be deployed in the same or in different Tracking Areas. When multiple Network Slice instances associated with the same S-NSSAI are deployed in the same Tracking Areas, the AMF instance serving the UE may logically belong to (i.e. be common to) more than one Network Slice instance associated with this S-NSSAI.

Based on the Requested NSSAI (if any) and the Subscription Information, the 5GC is responsible for the selection of a Network Slice instance(s) to serve a UE including the 5GC Control Plane and User Plane Network Functions corresponding to this Network Slice instance(s).

The (R)AN may use Requested NSSAI in access stratum signaling to handle the UE Control Plane connection before the 5GC informs the (R)AN of the Allowed NSSAI. The Requested NSSAI is used by the RAN for AMF selection.

When a UE is successfully registered over an Access Type, the CN informs the (R)AN by providing the Allowed NSSAI for the corresponding Access Type.

An S-NSSAI identifies a Network Slice. An S-NSSAI is comprised of a Slice/Service type (SST), which refers to the expected Network Slice behaviour in terms of features and services; and a Slice Differentiator (SD), which is optional information that complements the Slice/Service type(s) to differentiate amongst multiple Network Slices of the same Slice/Service type.

An S-NSSAI can have standard values (i.e. such S-NSSAI is only comprised of an SST with a standardized SST value, see clause 5.15.2.2 of TS 23.50.1, and no SD) or non-standard values (i.e., such S-NSSAI is comprised of either both an SST and an SD or only an SST without a standardized SST value and no SD). An S-NSSAI with a non-standard value identifies a single Network Slice within the PLMN with which it is associated. An S-NSSAI with a non-standard value shall not be used by the UE in access stratum procedures in any PLMN other than the one to which the S-NSSAI is associated.

Standardized SST Values

Standardized SST values provide a way for establishing global interoperability for slicing so that PLMNs can support the roaming use case more efficiently for the most commonly used Slice/Service Types. The SSTs which are standardized are in Table 2 as follows:

TABLE 2

Standardized SST values

| Slice/Service type | SST value | Characteristics. |
|---|---|---|
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |

NOTE:
The support of all standardised SST values may not be required in a PLMN.

Subscription Aspects about NSSAI

The Subscription Information shall include one or more S-NSSAIs i.e. Subscribed S-NSSAIs. Based on operator's policy, one or more Subscribed S-NSSAIs can be marked as a default S-NSSAI. If an S-NSSAI is marked as default, then the network is expected to serve the UE with a related applicable Network Slice instance when the UE does not send any valid S-NSSAI to the network in a Registration Request message as part of the Requested NSSAI.

The Subscription Information for each S-NSSAI may include a Subscribed DNN list and one default DNN. The network verifies the Requested NSSAI the UE provides in the Registration Request against the Subscription Information. In roaming case, the UDM shall provide to the VPLMN only the S-NSSAIs from the Subscribed S-NSSAIs the HPLMN allows for the UE in the VPLMN.

When the UDM updates the Subscribed S-NSSAI(s) to the serving AMF, based on configuration in this AMF, the AMF itself or the NSSF determines the mapping of the Configured NSSAI for the Serving PLMN and/or Allowed NSSAI to the Subscribed S-NSSAI(s).

Mutually Exclusive Access to Network Slices (MEANS)

Mutually Exclusive Slices

As stated in TR 23.740 (TR 23.740 Study on Enhancement of Network Slicing, V16.0.0), access to network slices may be considered mutually exclusive for a UE when their respective S-NSSAIs are both present in the UE's subscription and the UE is prevented from accessing both S-NSSAIs simultaneously. According to TS 23.501, in 5GC, the AMF instance serving the UE logically belongs to each of the Network Slice instances serving the UE, i.e. this AMF instance is common to the network slice instances serving a UE. This means, two network slices are mutually exclusive for a UE, if the UE cannot be registered to both the slices at a time. For a UE to have mutually exclusive access to two network slices, UE must de-register from the first slice and register with the second slice.

S-NSSAIs that the UE provides in the Requested NSSAI which are neither in the Allowed NSSAI nor provided as a rejected S-NSSAI by the UE, shall not be regarded as rejected, i.e. the UE may request to register these S-NSSAIs again next time the UE sends a Requested NSSAI.

Past Proposals on Methods for MEANS

TR 23.740 identified issues wherein several scenarios necessitating Mutually Exclusive Access to Network Slices (MEANS) due to SLAs, regulations and deployment models. It included eight different proposed solutions to resolve the MEANS issue in 5GS.

Solution 1.1 proposed to introduce a new optional subfield called S-NSSAI Group in the URSP, as part of the Network Slice Selection field of the Route Selection component. If an S-NSSAI value in the URSP is associated with an S-NSSAI Group, all instances of this S-NSSAI in the URSP shall be associated with the same S-NSSAI Group value. UE shall not include another S-NSSAI value associated with a different S-NSSAI Group in the Requested NSSAI. That is, S-NSSAI from other S-NSSAI groups are mutually exclusive.

Solution 1.2 proposed that the UE be configured with a capability to select between network slices in such a way that the UE knows whether two given S-NSSAIs can be requested simultaneously in the Requested NSSAI, or how to sort the S-NSSAIs in the Requested NSSAI in priority order as Solution 1.5.

Solution 1.3 mandates UE to be configured with the S-NSSAIs that are mutually exclusive, prior to the usage. For each S-NSSAI in the UE subscription, Configured NSSAI and Default Configured NSSAI, a Mutual Exclusion Class Information is associated. This information identifies if an S-NSSAI can be used with other S-NSSAIs and rules to define such coexistence.

Solution 1.4 proposed that within a group of network slices, each network slice can serve the UE simultaneously with other network slice(s) within the 5GS. However, network slices that are not in the same group cannot serve the UE simultaneously within the 5GS. UE must indicate its capability to support or not support mutually exclusive slices.

Solutions 1.5 proposed to utilize features that already exists in the Rel 15. It was assumed that the UE had internal logic to understand which applications were needed at a given time and was able to prioritize the applications requiring different S-NSSAIs. Based on the priority in the URSP rules, only one slice could be accessed at a time by configuring a slice that is mutually-exclusive-slice to that slice with lower priority.

Solution 1.6 proposed Exclusion Rules. These rules were configured in the subscriber record within the UDM on a per S-NSSAI basis. The exclusion rule could be either preconfigured in the UE or provided via the Registration procedure or Configuration Update procedure. The exclusion rule defines S-NSSAIs that are mutually exclusive to specific S-NSSAI, which effectively yields combinations of S-NSSAI that can be accessed simultaneously that may be optionally tagged as groups.

Solution 1.7 proposed that each Network Slice is deployed to be belonging to a Mutually Exclusive Access Network Slice Group (MEAG). Each Mutually Exclusive Access Network Slice Group represents a set of network slices which can share a common AMF. The Allowed NSSAI provided to the UE during registration procedure shall not include S-NSSAIs from different MEAGs. When UE requests S-NSSAI different from MEAG in current active network slice, UE shall deregister from current network slice, first.

Solution 1.8 proposed that an indication can be used together with any of the existing solutions proposed in TR 23.740. It can be sent as whether the MEANS group can or shall be accessed while in CM-IDLE without indicating GUAMI or 5G-S-TMSI in 5G-AN signaling or whether UE can request it while in CM-CONNECTED. Optionally, AMF may indicate to which MEANS groups the UE can use the more efficient re-allocation while staying in CM-CONNECTED for the current Registration.

UE Route Selection Policy (URSP)

URSP (UE Route Selection Policy) rules are policies that are used by the UE to determine how to route outgoing traffic. Traffic can be routed to an established PDU Session, can be offloaded to non-3GPP access outside a PDU Session, or can trigger the establishment of a new PDU Session. The rules are provided by the PCF in the 5GC to the UE.

URSP Rules have two main parts. A Traffic Descriptor Part (Application Descriptor (OSId and OSAppID, IP tuples, domain descriptors, Non-IP descriptors, DNN, and Connection Capabilities) is used by the UE to determine what traffic the rule applies to. A Route Selection Descriptors (RSD) part that includes descriptions of route(s) (i.e. S-NSSAI, DNN, Access Type, etc.) that may be used to route the data that matches the traffic descriptor.

The UE may also have local preferences that can be used to determine how to treat traffic. Local preferences take precedence over URSPs.

Each URSP rule is assigned a precedence.

The contents of a URSP rule is shown in Table 3. Table 3 is copied from TS 23.503 (TS 23.503, 3GPP Policy and Charging Control Framework for the 5G System), incorporated herein by reference.

A URSP rule is determined to be applicable when every component in the Traffic descriptor matches the corresponding information from the application. A URSP rule may not applicable if, for a component in the Traffic descriptor, no corresponding information from the application is available; or the corresponding information from the application does not match any of the values in the Traffic descriptor component.

If a URSP rule is provided that includes a Traffic descriptor with two or more components, it is recommended to provide precedence for each URSP rule(s), and Traffic descriptors with less components, for the likelihood of URSP rule(s) to match an application. Each URSP rule includes a list of Route Selection Descriptors, each having a different Route Selection Descriptor Precedence value. Route Selection Descriptors (RSD) are listed in Table 4. Table 4 is taken from S2-1904376, an approved Change Request Technical Document for TS 23.503. In addition to regular RSD from Release 15, the table includes Route Selection Validation Criteria.

TABLE 3

UE Route Selection Policy Rule

| Information name or attribute | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It includes OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |
| Rule Precedence | Determines the order the URSP rule is enforced in the UE. | Mandatory (NOTE 1) | Yes | UE context |

(NOTE 1):
Rules in a URSP shall have different precedence values.
(NOTE 2):
The information is used to identify the Application(s) that is(are) running on the UE's OS. The OSId does not include an OS version number. The OSAppId does not include a version number for the application.
(NOTE 3):
At least one of the Traffic descriptor components shall be present.
(NOTE 4):
The format and some values of Connection Capabilities, e.g. "ims", "mms", "internet", etc., are defined in TS 24.526 [19]. More than one connection capabilities value can be provided.
(NOTE 5):
A URSP rule cannot include the combination of the Traffic descriptor components IP descriptors and Non-IP descriptors.

TABLE 4

Route Selection Descriptor

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD may not be considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

(NOTE 1):
Every Route Selection Descriptor in the list shall have a different precedence value.
(NOTE 2):
At least one of the route selection components shall be present.
(NOTE 3):
When the Subscription Information includes only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components shall be included in the Route Selection Descriptor.
(NOTE 5):
The SSC Mode 3 shall only be used when the PDU Session Type is IP.
(NOTE 6):
The Route Selection Descriptor may not be considered valid unless all the provided Validation Criteria are met.

Route Selection Descriptor

An RSD includes one or more of the following components:
  Session and Service Continuity (SSC) Mode: Indicates that the matching application's traffic shall route via a PDU Session supporting the included SSC Mode.
  Network Slice Selection: Indicates that the traffic of the matching application shall be routed via a PDU Session supporting any of the included S-NSSAIs.
  DNN Selection: Indicates that the traffic of the matching application shall be routed via a PDU Session supporting any of the included DNNs. When DNN is used in Traffic descriptor, corresponding RSD of the rule shall not include DNN Selection component.
  PDU Session Type Selection: Indicates that the traffic of matching application shall be routed via a PDU session supporting the included PDU Session Type.
  Non-Seamless Offload indication: Indicates that traffic of the matching application is to be offloaded to non-3GPP access outside of a PDU Session when the rule is applied. If this component is present in an RSD, no other components shall be included in the RSD.
  Access Type Preference: If the UE needs to establish a PDU Session when the rule is applied, this indicates the Access Type (3GPP or non-3GPP).

One URSP rule with the "match all" Traffic descriptor is used to route the traffic of applications which do not match any other URSP rules and shall be evaluated with the lowest priority in Rule Precedence. The RSD in this URSP rule includes at most one value for each Route Selection Component. However, note that TS 23.503 states "If the UE fails to establish a PDU session with any of the Route Selection Descriptors, it tries other URSP rules in the order of Rule Precedences with matching Traffic descriptors, except the URSP rule with the "match-all" Traffic descriptor, if any. The UE shall not use the UE Local Configuration in this case.".

Route Selection Validation Criteria

Route Selection Validation Criteria or simply Validation Criteria was introduced in S2-1904376, a CR for TS 23.503. Route Selection Validation Criteria includes a list of attributes whose configured values must be met for the RSD in URSP to be valid. Table 4 shows a list of Route Selection Validation Criteria that includes Time Window and Location Criteria.

Time Window: The Route Selection Descriptor may not be considered valid unless the UE is in the time window.

Location Criteria: The Route Selection Descriptor may not be considered valid unless the UE's location matches the Location Criteria.

In addition, when the Route Selection Descriptor includes a Time Window or a Location Criteria, the PDU session is considered matching only if the PDU Session is associated with the same Time Window or a Location Criteria Validity Conditions. However, a UE's support of the Validation Criteria in a URSP rule is optional. If a non-supporting UE receives Validation Criteria, it ignores the Validation Criteria portion of the RSD and uses the rest of RSD.

Configuration and Provision of URSP

The UE may be provisioned with URSP rules by PCF of the HPLMN. When the UE is roaming, the PCF in the HPLMN may update the URSP rule in the UE. In addition, the UE may be also pre-configured with URSP rules (e.g. by the operator). If both URSP rules provisioned by the PCF and pre-configured URSP rules are present, only the URSP rules provisioned by the PCF is used by the UE.

For every newly detected application the UE evaluates the URSP rules in the order of Rule Precedence and determines if the application is matching the Traffic descriptor of any URSP rule. When a URSP rule is determined to be applicable for a given application, the UE shall select an RSD within this URSP rule in the order of the Route Selection Descriptor Precedence Information name.

When a valid RSD is found, the UE determines if there is an existing PDU Session that matches all components in the selected RSD. When a matching PDU Session exists, the UE associates the application to the existing PDU Session, i.e. route the traffic of the detected application on this PDU Session. If none of the existing PDU Sessions matches, the UE tries to establish a new PDU Session using the values specified by the selected RSD. If the PDU Session Establishment Request is accepted, the UE associates the application to this new PDU Session.

The RSD of a URSP rule shall be only considered valid if all the following conditions are met:

If any S-NSSAI(s) is present, the S-NSSAI(s) is in the Allowed NSSAI.

If any DNN is present and the DNN is an LADN DNN, the UE is the area of availability of this LADN.

The V-PCF may retrieve ANDSP and URSP from the H-PCF via N24/Npcf.

When the UE is roaming, and the UE has valid rules from both HPLMN and VPLMN the UE gives priority to the valid ANDSP rules from the VPLMN.

PDU Session Management

URSP rules are used to associate application traffic with an existing, or new PDU session. For the case that an application cannot be associated to any PDU Session, the UE can inform the application that association of the application to PDU Session failed.

Note that the UE may periodically check if PDU Sessions are being used. If they are not being used, the UE may initiate a PDU Session Release.

ANDSP Rules

When the UE registers with the 5GC, it indicates whether it supports ANDSP. This indication is provided to the PCF. If the UE is able to access the 5GC via non-3GPP access, then it is required to support ANDSP.

ANDSP Rules only contain rules that aid the UE in selecting a WLAN access network. Rules for selecting other types of non-3GPP access networks are not specified by 3GPP.

The WLAN access network selected by the UE with the use of an ANDSP policy may be used for directing traffic offload (i.e. sending traffic to the WLAN outside of a PDU Session) and for registering to 5GC using the non-3GPP access network selection information.

An ANDSP may contain the following information

WLANSP rules

The UE has WLANSP rules from the VPLMN and HPLMN. VPLMN rules take precedence.

WLANSP rules include SSID's and validity conditions such as time of day, geolocation, network location, etc.

ePDG identifier configuration

N3IWF identifier configuration

Non-3GPP access node (N3AN) selection information—

The UE uses this information to select an ePDG or N3IWF

Organization of UE Policy Information

The policy information part of the UE's subscription is organized in the UDR as a Policy Set Entry. A Policy Set Entry consist of one or more PSI(s). Each PSI consist of zero or more ANDSP and/or URSP policies. This is described in reference TS 23.503 and depicted in FIG. 14.

Figure 14:
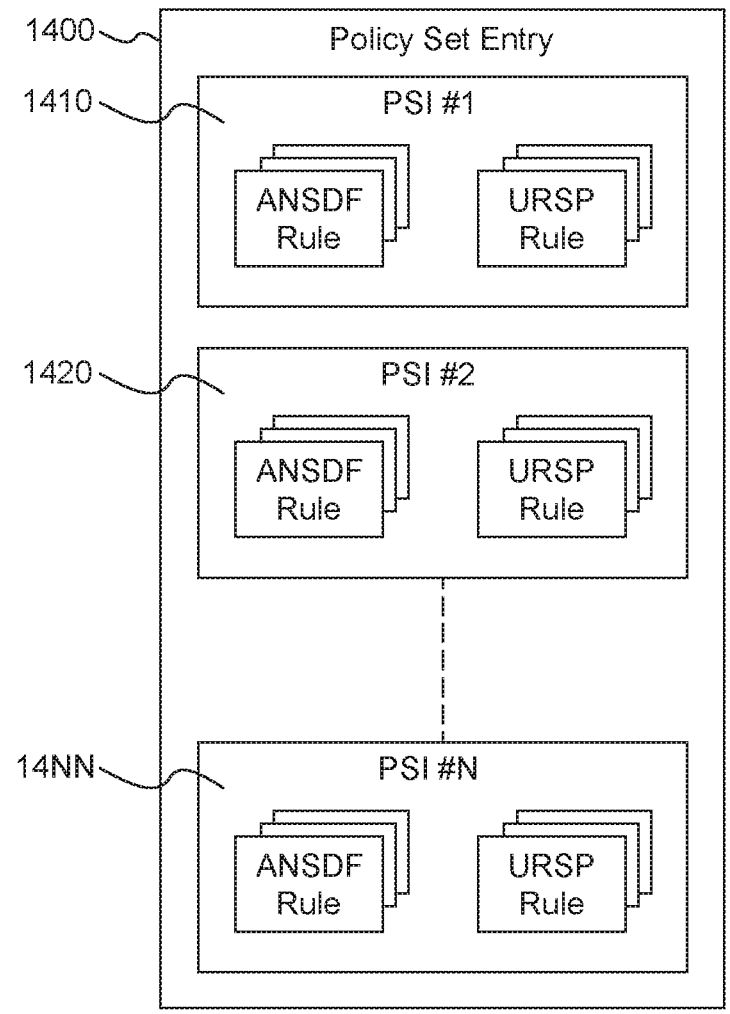
FIG. 14 shows an exemplary policy set entry.

FIG. 14 may also be considered a representation of how policy information is stored on the UE. The Network sends policy information to the UE with PSI granularity. In other words, a single PSI is the smallest amount of policy information that the network can send to the UE and is the smallest amount of policy information that the UE can reject. A PSI can contain as little as one ANDSP rule or one URSP rule.

Per reference TS 24.501, a UE policy section identifier (UPSI) is composed of two parts:

a PLMN ID part containing the PLMN ID for the PLMN of the PCF which provides the UE policies; and a UE policy section code (UPSC) containing a value assigned by the PCF.

The UE processes the UE policy sections, each identified by the UPSI, received from the PCF and informs the PCF of the result.

Indicating to the Network which Policies are Installed

When the UE registers, it provides the network with a UE Policy Container that includes the list of all PSIs that are installed in the UE, an indication of UE's support for ANDSP, and the UE's operating system identifier. This information is carried in the UE STATE INDICATION message that is sent by the UE in the REGISTRATION REQUEST message as defined in reference TS 24.501.

The UE STATE INDICATION message includes a UPSI List IE which includes the UPSI sublist IE. FIG. 15 shows the format of a UPSI sublist as defined in reference TS 24.501. A UPSI sublist lists all of the UPSC's that are associated with a PLMN.

Installation of UE Policy Information

The "UE Configuration Update procedure for transparent UE policy delivery" of TS 23.502, section 4.2.4.3 of TS 23.502 is used to deliver policies to the UE.

When the UE registers, it provides the network with a UE Policy Container that includes the list of all PSIs that are installed in the UE, an indication of UE's support for ANDSP, and the UE's operating system identifier. When the AMF receives the policy container, the AMF will invoke the PCF's Npcf_UEPolicyControl Create service operation and provide the policy container to the PCF. The PCF may choose to invoke the "UE Configuration Update procedure for transparent UE policy delivery" procedure to send new policies to the UE.

Per reference TS 24.501, the "MANAGE UE POLICY COMMAND" is used by the network to install, remove, or update a UE Policy Section.

Note that only the HPLMN can install URSP policies in the UE. Section D.2.1.6 of reference TS 24.501 states that "Receipt of an instruction associated with a UPSI which has a PLMN ID part that is not equal to the PLMN ID of the UE's HPLMN and the instruction contains a UE policy part with a UE policy part type set to "URSP". The UE shall set the UE policy delivery service cause to #111 (Protocol error, unspecified) for the instruction in the UE policy section management result IE of the MANAGE UE POLICY COMMAND REJECT message.".

Note that only the HPLMN or RPLMN can install ANDSP policies in the UE. Section D.2.1.6 of reference TS 24.501 states that "Receipt of an instruction associated with a UPSI which has a PLMN ID part that is not equal to the PLMN ID of the UE's HPLMN or the UE's RPLMN and the instruction contains a UE policy part with a UE policy part type set to "ANDSP". The UE shall set the UE policy delivery service cause to #111 (Protocol error, unspecified) for the instruction in the UE policy section management result IE of the MANAGE UE POLICY COMMAND REJECT message."

UE Triggered V2X Policy Provisioning Procedure

Figure 16:
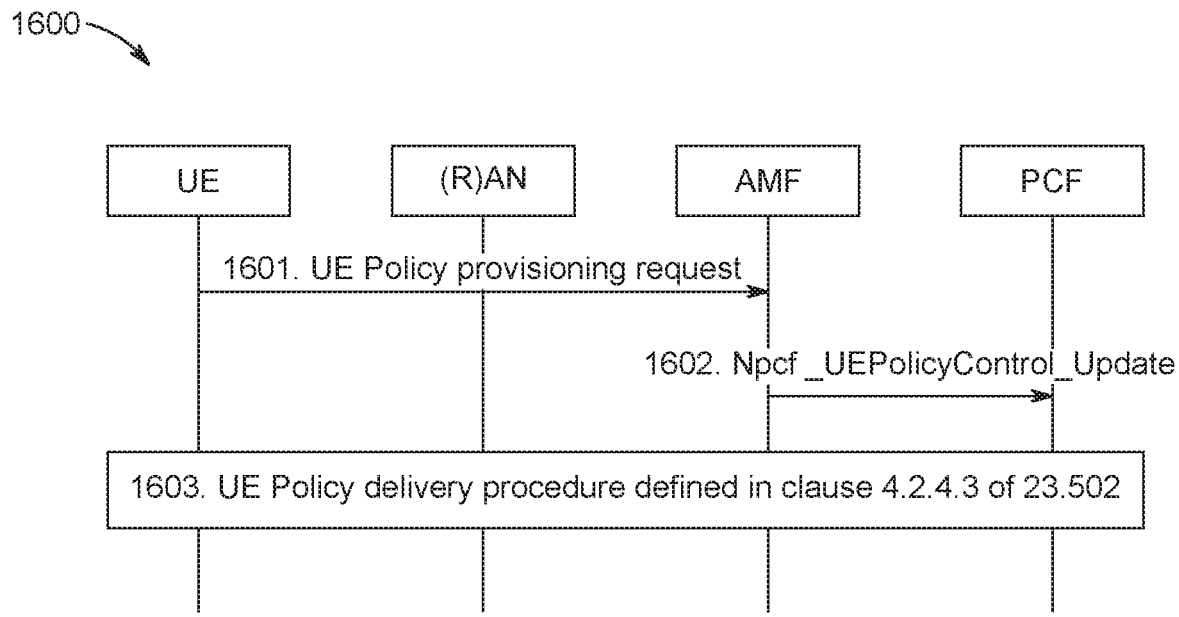
FIG. 16 shows an exemplary UE triggered V2X Policy provisioning procedure.

Reference TS 23.287 describes a UE triggered V2X policy provisioning procedure. FIG. 16 illustrates a policy provisioning procedure 1600. Steps 1601-1602 may be triggered by the UE if the validity timer for the V2X Policy/Parameter expires or if there are no valid parameters, e.g., for current area, or due to abnormal situation. Step 1603 is the same UE Configuration Update procedure for transparent UE policy delivery" procedure that was previously discussed.

Network Slice-Specific Secondary Authentication/Authorization

A serving PLMN shall perform Network Slice-Specific Secondary authentication and authorization for the S-NSSAIs of the HPLMN, which are subject to subscription information. The UE shall indicate in the Registration Request message in the UE 5GMM Core Network Capability whether it supports this feature. If the UE does not support this feature, the AMF shall not trigger this procedure for the UE and if the UE requests these S-NSSAIs that are subject to Secondary authentication/authorization they are rejected for the PLMN.

If a UE is configured with S-NSSAIs, which are subject to Network Slice-Specific Secondary authentication and authorization, the UE stores an association between the S-NSSAI and corresponding User ID and credentials for the Network Slice-Specific Secondary authentication and authorization.

To perform the Network Slice-Specific Secondary authentication and authorization for a S-NSSAI, the AMF invokes an EAP-based Network Slice-Specific Secondary authorization procedure documented in TS 23.502 (see also TS 33.501) for the S-NSSAI.

This procedure can be invoked for a supporting UE by an AMF at any time, e.g. when The UE registers with the AMF and one of the S-NSSAIs of the HPLMN which maps to a S-NSSAI in the Requested NSSAI is requiring Network Slice-Specific Secondary authentication and authorization (see clause 5.15.5.2.1 for details); or The Network Slice-Specific AAA Server triggers a UE re-authentication and authorization for a S-NSSAI; or The AMF, based on operator policy or a subscription change, decides to initiate the Network Slice-Specific Secondary authentication and authorization procedure for a certain S-NSSAI which was previously authorised.

After a successful or unsuccessful UE Network Slice-Specific Secondary authentication and authorization, the UE context in the AMF shall retain the authentication and authorization status for the UE for the related specific S-NSSAI of the HPLMN the UE remains RM-REGISTERED in the PLMN, so that the AMF may not be required to execute a Network Slice-Specific Secondary authentication and authorization for a UE at every periodic or mobility Registration procedure with the PLMN.

A Network Slice-Specific AAA server may revoke the authorization or challenge the authentication and authorization of a UE at any time. When authorization is revoked for an S-NSSAI that is in the current Allowed NSSAI, the AMF shall provide a new Allowed NSSAI to the UE and trigger the release of all PDU sessions associated with the S-NSSAI.

The AMF provides the GPSI of the UE to the AAA Server to allow the AAA server to initiate the Network Slice-Specific Secondary authentication and authorization, or the Authorization revocation procedure, where the UE's current AMF needs to be identified by the system, so the UE authorization status can be challenged or revoked.

The Network Slice-Specific Secondary authentication and authorization requires that the UE Primary Authentication and Authorization of the SUPI has successfully completed. If the SUPI authorization is revoked, then also the Network Slice-Specific Secondary authorization is also revoked.

Figure 4A:
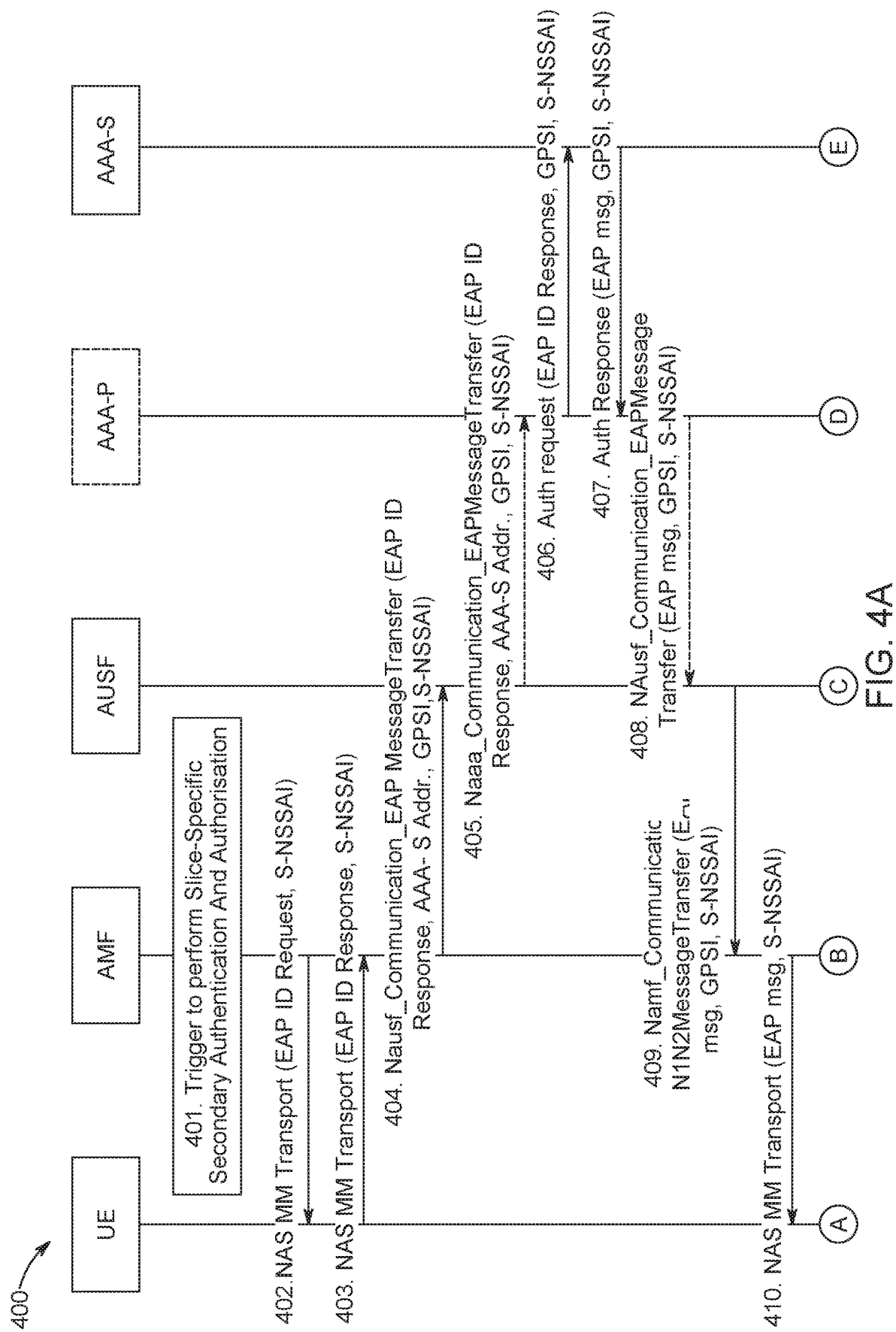
FIGS. 4A and 4B show an exemplary slice-specific secondary authentication and authorization procedure.
Figure 4B:
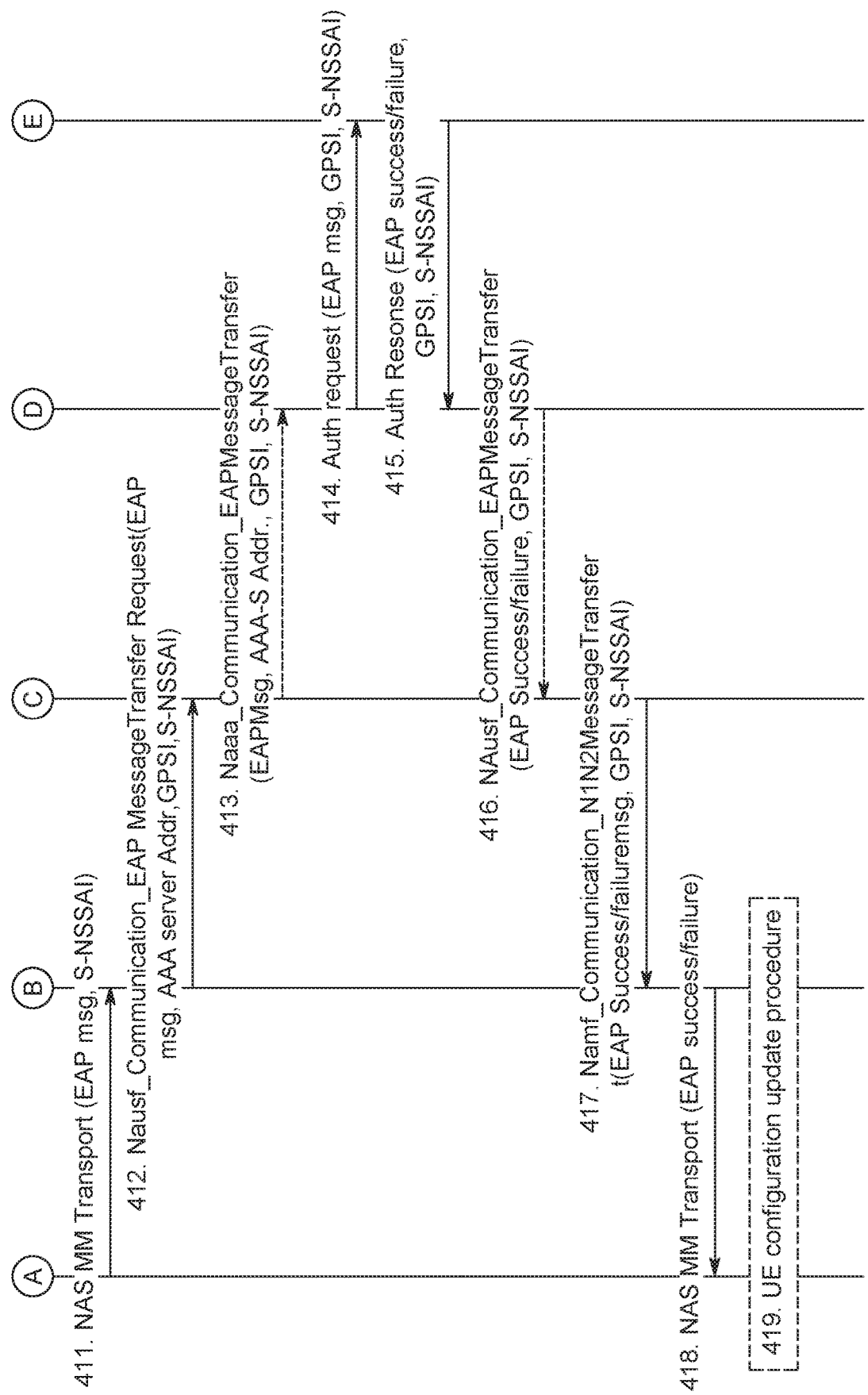

FIGS. 4A and 4B illustrate an exemplary slice-specific secondary authentication and authentication procedure 400 in accordance with S2-1902882 (S2-1902882, TS 23.502: support of secondary slice authentication), incorporated herein by reference. It depicts a procedure for slice-specific secondary authentication and authorization. Within the process, a Third-party AAA-S may be used for secondary authentication and authorization. The steps are presented as follows:

401. For S-NSSAIs that are requiring Network Slice-Specific authentication and authorization, based on local policy, change of subscription information, or triggered by the AAA Server, the AMF may trigger the start of the Network Slice Specific Authentication Procedure.

402. The AMF may request the UE User ID for EAP authentication (EAP ID) for the S-NSSAI in a NAS MM Transport message including the S-NSSAI. This is the S-NSSAI of the H-PLMN, not the locally mapped S-NSSAI value.

403. The UE provides the EAP ID for the S-NSSAI alongside the S-NSSAI in an NAS MM Transport message towards the AMF.

404. The AMF sends the EAP ID to the AUSF in a Nausf_Communication_EAPMessage_Transfer (EAP ID Response, AAA-S address, GPSI, S-NSSAI).

405. If the AAA-P is present (e.g. because the AAA-S belongs to a third party), the AUSF invokes the Nausf_Communication_EAPmessageTranfser service to forward the message to the AAA-P otherwise the AUSF forwards the message directly to the AAA-S.

406. The AAA-P associates AAA-S address with the S-NSSAI and forwards the EAP Identity message to the AAA-S addressable by the AAA-S address together with S-NSSAI and GPSI.

407-414. EAP-messages are exchanged with the UE. One or more than one iteration of these steps may occur. As illustrated in FIG. 4A, AAA-S may transmit an EAP message to AAA-P (407), AAA-P may then transmit an EAP message to AUSF (408), AUSF may then transmit an EAP message to AMF (409), and AMF may then transmit an EAP message to the UE (410). Likewise, in FIG. 4B, the UE may transmit an EAP message to AMF (411), the AMF may transmit an EAP message to AUSF (412), the AUSF may transmit an EAP message to AAA-P (413), and then the AAA-P may transmit an EAP message to AAA-S (414).

415. EAP authentication completes. An EAP-Success/Failure message is delivered to the AAA-P (or if the AAA-P is not present, directly to the AUSF) with GPSI and S-NSSAI.

416. If the AAA-P is used, the AAA-P sends the Nausf_Communication_EAPmessageTransfer (EAP-Success/Failure, S-NSSAI, GPSI) to the AUSF.

417. The AUSF sends the Namf_Communication_N1N2messageTranfser (EAP-Success/Failure, S-NSSAI, GPSI) to the AMF.

418. The AMF transmits a NAS MM Transport message (EAP-Success/Failure) to the UE.

419. If a new Allowed NSSAI or new Rejected NSSAIs needs to be delivered to the UE, or if the AMF re-allocation is required, the AMF initiates the UE Configuration Update procedure.

User Plane Protocol Stack for a PDU Session

Figure 5:
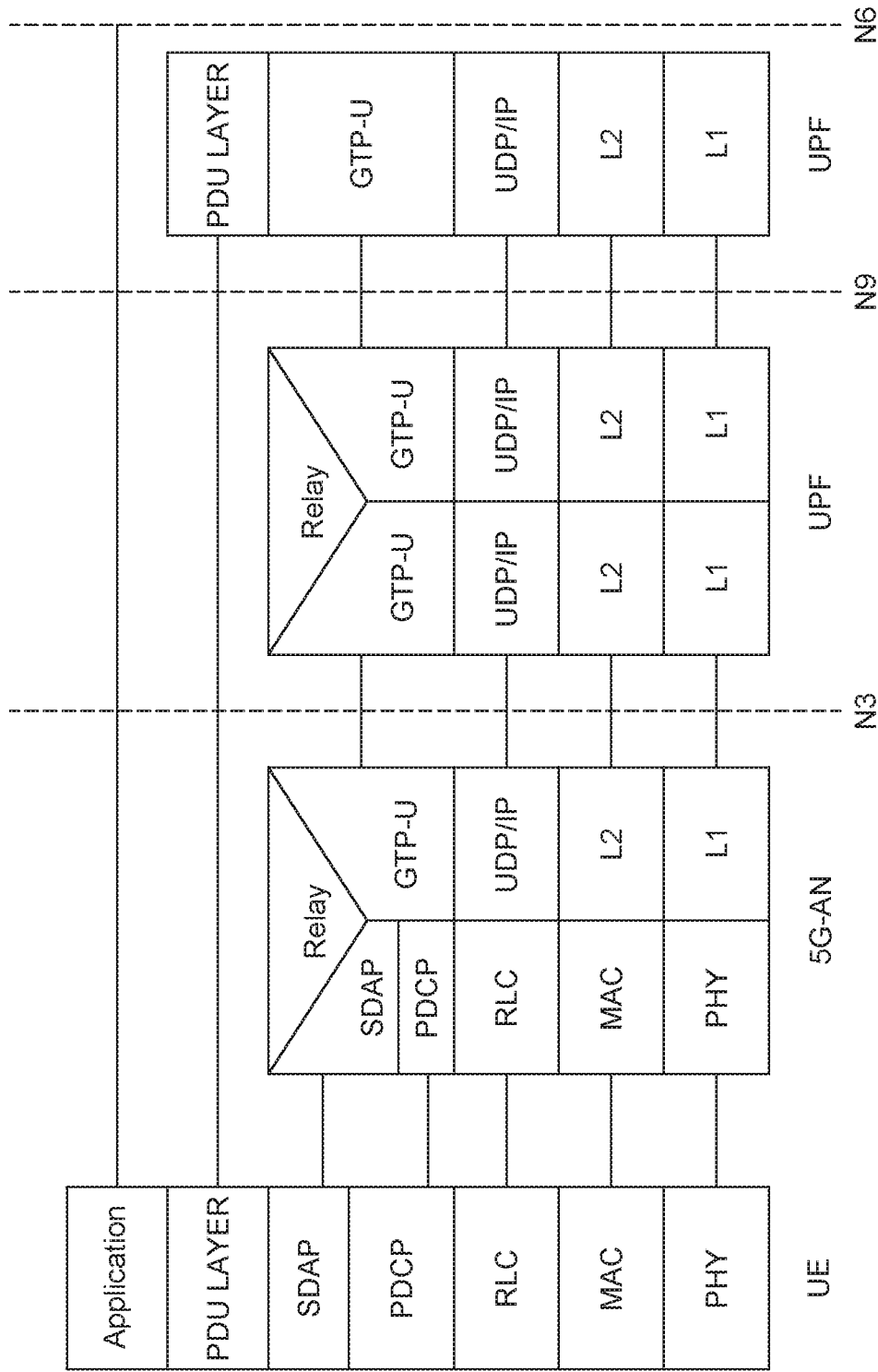
FIG. 5 shows an exemplary user plane protocol stack.

FIG. 5 shows an exemplary user plane protocol stack that is related with a PDU Session.

5G-AN protocol stack: This set of protocols/layers depends on the AN:
When the 5G-AN is a 3GPP NG-RAN.
When the AN is an Untrusted non 3GPP access to 5GC.
UDP/IP: These are the backbone network protocols.
NOTE 1: The number of UPF in the data path may not be constrained by 3GPP specifications: there may be in the data path of a PDU Session 0, 1 or multiple UPFs that do not support a PDU Session Anchor functionality for this PDU Session.
NOTE 2: The N9 interface may be intra-PLMN or inter PLMN (in the case of Home Routed deployment).

If there is an UL CL (Uplink Classifier) or a Branching Point UPF in the data path of a PDU Session, the UL CL or Branching Point UPF acts as the non PDU Session Anchor UPF of FIG. 5. In that case there are multiple N9 interfaces branching out of the UL CL/Branching Point each leading to different PDU Session anchors.

PDCP Layer and Ciphering: A Brief Overview

Figure 6:
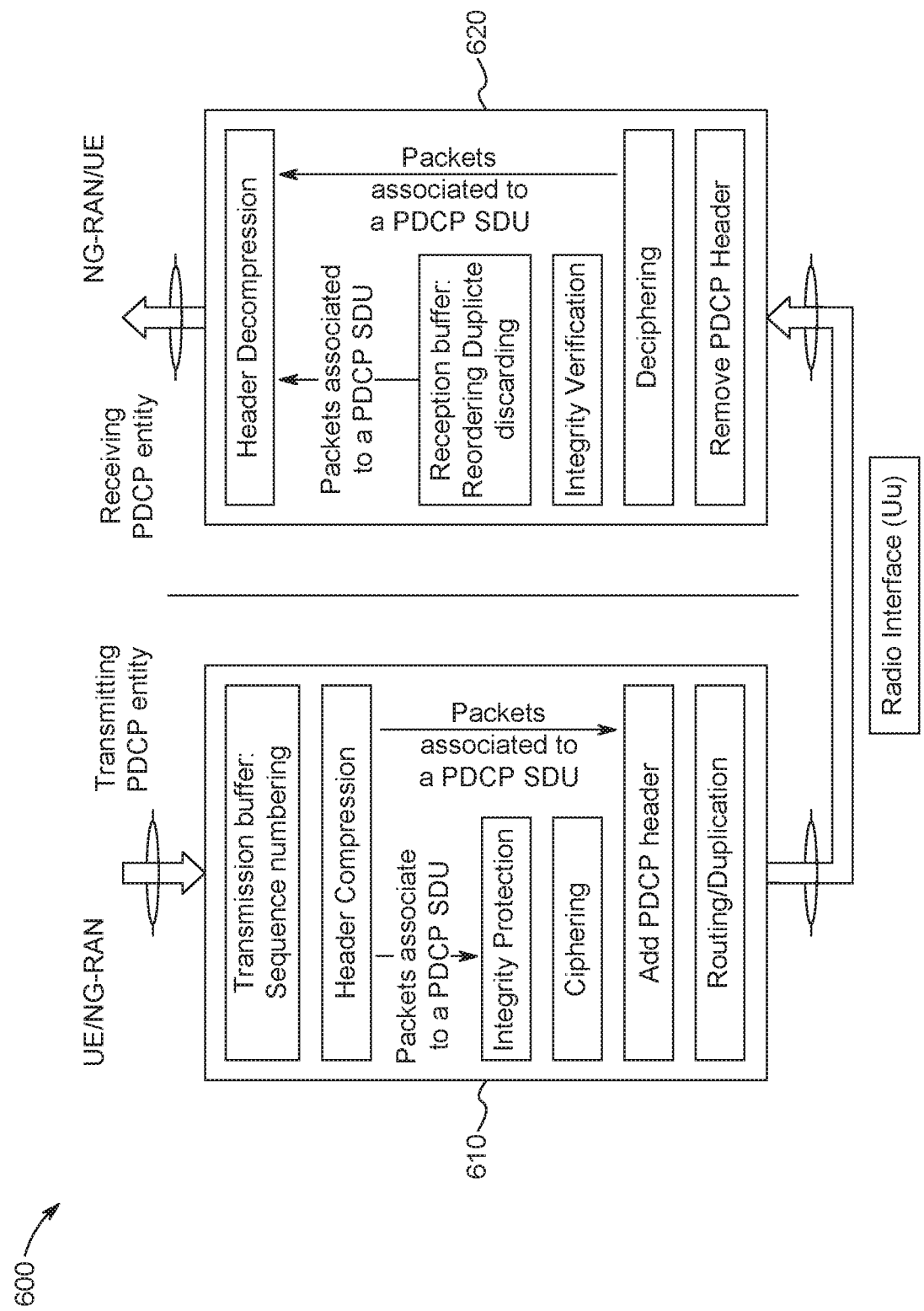
FIG. 6 shows an exemplary diagram of a PDCP layer.

FIG. 6 shows an exemplary functional diagram 600 of a PDCP layer. The detail functions offered by PDCP layer is described in TS 38.323 (TS 38.323, Evolved Universal Terrestrial Radio Access (E-UTRA); Packet Data Convergence Protocol (PDCP) specification, V15.3.0), incorporated herein by reference.

FIG. 6 shows a transmitting PDCP entity (UL) 610 on the left-hand side and receiving PDCP entity (DL) 620 on the right-hand side. On the transmitting end, packets are received from the SDAP layer and are sequence numbered. PDCP entities associated with DRBs can be configured by upper layers to use header compression. If header compression is configured, the header compression protocol generates two types of output packets:
compressed packets, each associated with one PDCP SDU (PDCP Service Data Unit);
standalone packets not associated with a PDCP SDU.

The header compression may not be applicable to the SDAP header and the SDAP Control PDU if included in the PDCP SDU.

The data unit that is integrity protected is the PDU header and the data part of the PDU before ciphering. The integrity protection is always applied to PDCP Data PDUs of SRBs. The integrity protection is applied to PDCP Data PDUs of DRBs for which integrity protection is configured. The integrity protection may not be applicable to PDCP Control PDUs.

For downlink and uplink ciphering and deciphering, the parameters that are required by PDCP for ciphering are defined in TS 33.501 and are input to the ciphering algorithm.

For user-plane data the ciphering function includes both ciphering and deciphering and, is performed in PDCP layer, if configured. The data unit that is ciphered is the MAC-I and the data part of the PDCP Data PDU except the SDAP header and the SDAP Control PDU if included in the PDCP SDU. The ciphering may not be applicable to PDCP Control PDUs. The ciphering algorithm and key to be used by the PDCP entity are configured by upper layers, and the ciphering method shall be applied as specified in TS 33.401 (TS 33.401, 3GPP System Architecture Evolution (SAE); Security architecture, V15.7.0), incorporated herein by reference.

The ciphering function is activated/suspended/resumed by upper layers.

When security is activated and not suspended, the ciphering function shall be applied to all PDCP Data PDUs indicated by upper layers for the downlink and the uplink, respectively. For downlink and uplink ciphering and deciphering, the parameters that are required by PDCP for ciphering are defined in TS 33.401 and are input to the ciphering algorithm. The parameters required by PDCP which are provided by upper layers are listed below:
BEARER (defined as the radio bearer identifier in TS 33.401. It will use the value RB identity−1);
KEY (the ciphering keys for the control plane and for the user plane are $K_{RRCenc}$ and $K_{UPenc}$, respectively).

Once the packets are ciphered, PDCP header is added on each packet before routing.

Ciphering of PDCP packets in the user plane is between a UE and the RAN node only. Ciphered data in the PDCP layer is deciphered at the receiving RAN's PDCP layer. With an assumption that the MNO controls core network and the RAN node, any encrypted PDCP layer data shall be visible to the MNO at RAN node.

In addition, the RAN node implements two different interfaces that are supported by two different set of protocol stacks to communicate with UE and the UPF in user plane as shown in FIG. 5.

UICC

Universal integrated circuit card (UICC) is the tamper proof integrated circuit in a UE, on which the Universal Subscriber Identity Module (USIM) resides as trust anchor. It offers a protected storage and can process long-term subscriber credentials and security critical information. Security critical information includes user identity, device identity, cryptographic keys, and integrity protection and encryption algorithms.

The UICC may indicate that there is an existing agreed pre-shared key or a certificate that was pre-exchanged that can be used to setup a secure channel with the entity with which a communication channel may be established. UICC may include algorithms and applications that can use, access or derive keying materials from the information stored or supplied.

Network Slice Deployment Models

3GPP TR 22.830 (TR 22.830 Study on Business Role Models for Network Slicing, V16.1.0), incorporated herein by reference, presents various deployment models. In previous generations of cellular technology, business role models centered on two key types of relationships: those between Mobile Network Operators (MNOs) and their subscribers and those between MNOs (e.g., roaming, RAN sharing). 5G allows 3rd parties more control over system capabilities. In accordance with deployment model 3 in TR 22.830:

Only part of the network is owned and/or managed by the MNO, with other parts being owned and/or managed by a 3rd party. There are four potential business relationship models impacting the trust relationships for stakeholder role model 3.

Model 3a: MNO provides the virtual/physical infrastructure and Virtual/Network Functions (V/NFs); a 3rd party uses the functionality provided by the MNO, Model 3b: MNO provides the virtual/physical infrastructure and V/NFs; a 3rd party manages some V/NFs via APIs exposed by the MNO, Model 3c: MNO provides virtual/physical infrastructure; a 3rd party provides some of the V/NFs, Model 3d: a 3rd party provides and manages some of the virtual/physical infrastructure and V/NFs.

Models 3c and 3d provide extended control for the 3rd party on the network capabilities supporting its service. In four potential business relationship models above, three management role models can be considered for models 3c and 3d.

1. MNO manages all virtual/physical infrastructure and all V/NFs including 3rd party's ones, 2. 3rd party manages its own virtual/physical infrastructure and/or its own V/NFs; MNO manages the others.

3. 3rd party manages virtual/physical infrastructure and/or V/NFs including its own virtual/physical infrastructure and/or V/NFs and some MNO's virtual/physical infrastructure and/or V/NFs; MNO manages the others.

Problem Statement

Use Case: MEANS Requirement for a UE

An employee has a UE that belongs to the company he works for. The company is ok with the employee using the UE for personal matters (e.g. web surfing). However, company policy is such that company does not want the employee to be able to access the internet while he is accessing the company's network during work hours. In this example, the user's Mobile Broadband Slice needs to be mutually exclusive from the Company's Work-related Slice under certain conditions (e.g. work hours).

In another scenario, a vehicle connects to a V2X slice for autonomous driving and to an IoT Slice for sending diagnostic data to the car manufacturer. When driving, use of the IoT slice should be avoided so that over the air resources can be dedicated to automated driving. When the UE is not driving, access to the IoT slice is permissible so that sensor information can be uploaded. Thus, the IoT and V2X slice need to be mutually exclusive when automated driving is enabled, but not at other times.

Problem Statement: MEANS Issues

Based on operator policy, some slices are mutually exclusive to a given UE. This means that a UE cannot be simultaneously registered to certain slices. In a scenario where UE applications need to access slices that are mutually exclusive, the network slices could be assigned a precedence that would signify the priority of one slice over another. Based on the slice priority, the UE will be given access to the more important slice while any traffic that is associated with the other (i.e. mutually exclusive) slice will be blocked or not allowed.

The MEANS mechanisms that have been proposed in TR 23.740 describe how S-NSSAIs can be grouped together such that slices that are mutually exclusive are separated. Some of the solutions propose utilizing URSP rules to resolve the MEANS issue. In particular, Solution 1.3 of TR 23.740 proposed utilizing URSP-type priority rules with a new Mutual Exclusion Class Information associated with a slice. Solution 1.5 of TR 23.740 proposed a way of grouping mutually exclusive slices by using the existing URSP rule framework without any enhancements. Finally, Solution 1.6 of TR 23.740 makes a point about having URSP rules that could tag or batch network slices with other slices that are not mutually exclusive. TS 23.740 is incorporated herein by reference.

Solutions that have been discussed thus far in TR 23.740 are semi-static in nature in the sense that they do not allow the UE to consider its current context (e.g. time of day, location, role of the user, application type etc.) when determining which slice has higher priority. The problem that will be addressed in this application is how to handle the case where the choice of higher priority slice is not static in nature but dependent on the UE's context. This application describes how to configure the UE to know what traffic should be blocked in order to prevent the UE from attempting to register, or access, mutually exclusive slices and for the case where the UE needs to take certain actions (i.e. disconnect from a mutually exclusive slice) before accessing a high priority slice.

Use Case: Requirement for a Slice-Specific Privacy

A Third-party may be a business entity that has leased one or more network slices from a mobile network operator (MNO). The third-party business entity may be referred to as a tenant of the MNO. The tenant and the MNO may have a business agreement where the MNO provides one or more slices that allows the third-party to have administrative control and authority over its leased network slices. Administrative authority may mean that the third-party has the capability to configure network functions, set the UE's configuration in the slice, provisioning encryption keys, configure different policies (e.g. access control) within the tenant owned network slices.

Consider the system 700 of the hypothetical Ace Innovations Inc. Ace Innovations is a third-party client that has leased two network slices, namely Slice 1 720*a* and Slice 2

Figure 7:
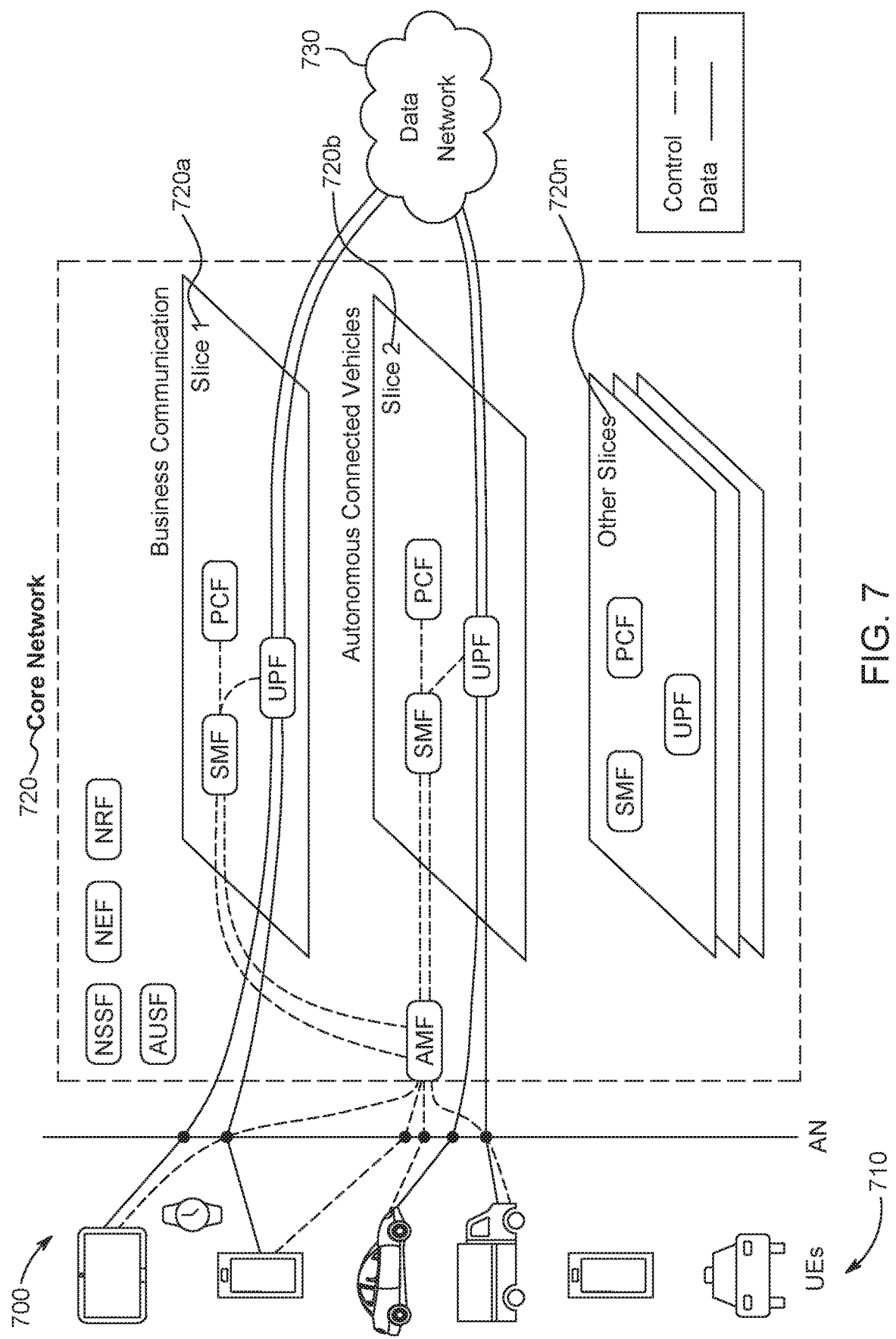
FIG. 7 shows an exemplary third-party network slice configuration.

720b, from an MNO as depicted in FIG. 7. As seen in FIG. 7, there may be other slices 720n that exist in the core network 720. Each slice may have one or more network functions within the network-slice. FIG. 7 shows some of the main network functions instances (e.g. an SMF, PCF and UPF). Note that some network functions are common between network slices (e.g. the AMF). In addition, each slice may have other network function instances such as NRF, NSSF, NEF and AUSF.

Ace Innovations requires data exchanges over data network 730 for autonomous connected vehicles 710 that demand low latency. The company also requires a general telecommunication services for handsets that are used to carry out other business activities. Hence, Ace Innovations has leased two network slices and established an SLA with the MNO for each slice. The SLAs establish the expected performance and features of each slice. As depicted in FIG. 7, Slice 1 is allocated to serve business communications, e.g. voice and data from mobile phones, tablets etc. and, Slice 2 is designed to support all the communication flowing from autonomous vehicles deployed in the field that are registered with Ace Innovations.

Ace Innovations demands that each slice provide slice-specific privacy. That is, user plane traffic originating from the UEs in a network slice should be completely private from other slices, and private from the MNO.

Problem Statement: Encryption Issues

Existing cellular network security offers a mechanism for user plane to secure communication between the UE and RAN node by utilizing a PSK and an agreed-upon encryption algorithm between the two. Specifically, 3GPP user plane encryption happens in the PDCP layer between the UE and RAN. As user plane data travels from the RAN to the UPF(s), the data is not encrypted by any 3GPP protocol.

If a UE application requires that the data be protected in an end-to-end fashion (from the UE Application to the Application Server or the secure network that hosts the Application Server), then Application Layer security is required. The current architecture poses the following problem. If user plane data needs to be protected as it traverses the operator's network, then application layer security is required. This leads to a situation where encryption needs to happen twice; once in the application layer and once in the PDCP layer, this is costly in terms of computational complexity and latency.

A solution to the above problems is to only perform encryption at the application layer and not in the PDCP layer. However, this approach is inefficient because it does not leverage the pre-provisioned credentials and encryption engines that are part of the UICC.

In summary, there will be cases where the latency demands of the SLA make it too costly to perform encryption twice (once at the application layer and again in the PDCP layer) and the SLA demands that communication within the slice be private both in terms of other users of the network and the MNO. Additionally, if a new encryption mode is to be added to the 3GPP system, there needs to be a way for the network to configure the UE to use this new mode and configure the mode (e.g. configure what algorithm and what keys should be used when the mode is activated).

Use Case: Network Needs to Determine What Policies are Installed on the UE

The network determines what policies to send to the UE. Of course, it would be inefficient for the network to send a policy to the UE if the policy is already installed on the UE. Thus, in the Rel-15 design, the UE signals to the network which policies are installed in the UE. The network can then install any policies that the UE is missing.

Problem Statement: Network Needs to Determine What Policies are Installed on the UE As previously described, during registration, the UE tells the network all PSI's that are installed. If a PSI is not present, the network assumed that it is not installed. Also as stated in reference SP-190449 (incorporated herein by reference): "In Rel-15 5GS UE Policy design, the UE needs to include all its stored PSIs (for URSP and ANDSP) in the UE Policy Container reported to PCF. PCF will assume that UE has no policy if a PSI is missing and provision the corresponding UE Policies, even if the UE has no interest in requesting such policies. This is inefficient and may result in overload of control plane signaling. This study will investigate the optimization of the UE Policy (e.g. URSP, ANDSP, etc.) requesting and distribution procedure."

The UE needs a more efficient way of indicating to the network what policies, or PSI's, are provisioned, or installed, in it.

Use Case: UE Requires a New Policy

An event occurs on the UE and, as a result of the event, the UE requires new, or updated, URSP rules. Examples of events that might cause the UE to request new URSP rules are a new application being installed or the UE's operating system being updated, that the UE fails to map UL to an existing route, or that the UE maps UL data to an unestablished route and the unestablished route cannot be established.

Problem Statement: UE Requires a New Policy

If the UE wants to request new policies, it needs to do an initial registration. Per SP-190449: "When the URSP is missing or invalid, the UE can only use initial Registration procedure to retrieve the URSP, which will interrupt the other ongoing sessions not using URSP (e.g. PDU Session for V2X session uses V2X Policy, this will cause driving safety issue)."

The UE needs a way to indicate to the network that it needs new policies (URSP and/or ANDSP) rule(s) (e.g. for some new traffic) and receiving new URSP rule(s) without interrupting other traffic.

Use Case: Network Needs to Determine What Policies to Send to the UE

The network makes decisions about what policies to send to the UE. The policies that are sent to the UE are sometimes specific to an application, a type of traffic, a type of network, etc. Also, what policies are sent to the UE may also depend on the UE's location or future location. As the UE moves, LADN's and/or Edge Servers become available or become unavailable. The UE needs to be provisioned with policies to account for this.

Problem Statement: Network Needs to Determine What Policies to Send to the UE

The network often cannot tell what policies are relevant to the UE. For example, a policy that is specific to an application that is not installed in the UE is not relevant to the UE. It would be inefficient to send policies to the UE that will not be used by the UE. In other words, the PCF has no way of knowing what policies the UE wants. For example, the network may know the type of OS on a device, but not what applications are installed. This is also described in SP-190449, which states: "PCF will assume that UE has no policy if a PSI is missing and provision the corresponding UE Policies, even if the UE has no interest in requesting such policies. This is inefficient and may result in overload of control plane signaling."

Use Case: Network Needs to Determine if the UE is Correctly Applying URSP rules

The network would like to verify that the UE is correctly applying URSP rules, for example to check that UE's are behaving properly and as expected. Being able to detect that a UE is not applying a URSP rule correctly can help the network to determine, or detect, if a UE is sending traffic for a certain application to the wrong DN or Slice.

Problem Statement: Network Needs to Determine if the UE is Correctly Applying URSP Rules As stated in reference SP-190449, "Currently, the network does not know whether the URSP is enforced by the UE correctly or not, especially in the case the PCF selected by the SMF is different from the PCF selected by the AMF. The network may need to verify that the traffic is routed over a PDU session that complies with the characteristics sent in the URSP rule.".

Thus, the network does not have a way of checking if the UE is correctly applying URSP rules. In other words, the network needs a way of checking that the UE is correctly applying URSP rules when it chooses what Slice/DNN/PDU Session should be used for a given application flow.

Use Case: Network Needs to Determine when the UE Needs New Policies

As previously discussed, what policies are sent to the UE may also depend on the UE's location or future location. As the UE moves, LADN's and/or Edge Servers become available or become unavailable. The UE needs to be provisioned with policies to account for this. The nature of edge services is that they may only be provided by the VPLMN in a given area. Thus, it may be that the V-PCF sometimes needs to send policies to the UE.

Another trigger for sending updated policies to the UE may be based on requests from application functions. The AF will sometimes need to provide the network with new, or updated, traffic descriptors.

Problem Statement: Network Needs to Determine when the UE Needs New Policies

It might be inefficient for the network to wait until the UE moves to a location before sending URSP rules to the UE for the location. There is currently no way to trigger the provision of UE policies based on the UE's anticipated future location, the UE's anticipated future behavior, or based on request from 3rd party application servers.

Currently, only the H-PCF sends policies to the UE. The H-PCF sends the VPLMN's policies based on SLA. However, the policies may need to change based on e.g. the UE location (e.g. due to the availability of edge services and LADN's). It is not reasonable to make the policies very dynamic and, at the same time, SLA driven.

If the network sends a policy to the UE that applies to current, or active traffic, it might be necessary for the network to indicate to the UE that the rule should apply to traffic that is currently captured by a different rule.

Use Case: Making Policies Group Based

As stated in reference SP-190449, "In Rel-15, the Policy Set Entry is retrieved by the PCF per SUPI from the UDR in HPLMN and per PLMN ID from the UDR in VPLMN. In practice, operator usually apply the same policy for a group of UE based on their user category, user class or group ID, e.g. gold user or silver user or a predefined group, and the UE policy can be retrieved per group of UE."

Problem Statement: Making Policies Group Based

Policy set entries are stored and retrieved per SUPI, it would be more efficient to make the retrieval and storage group based.

Use Case: Policy Management in Interworking Scenarios

When a UE is able switch between 4G and 5G, it is desirable to have the UE apply a single/consistent set of policies.

Problem Statement: Policy Management in Interworking Scenarios

In 4G, ANDSF is used to provision the UE with policies. In 5G, NAS is used to provision the UE with policies. When ANDSF is not available, but the UE might be in an interworking scenario, the network needs to have a way to ensure that the UE is provisioned with policies that are consistent between 4G and 5G.

Summary

The 5G network is expected to support MEANS. MEANS for a UE may be dependent on UE contexts and pre-conditions. To enable context-aware MEANS for a UE, this application provides the following:

A mechanism by which a slice is chosen over another slice based on enhanced URSP rules that have been provisioned in the UE, by the network. These enhancements to the policies are provided so that the UE may be configured to consider the UE's current context when determining which slice has higher priority.

Enhancements to the RSD in the URSP rules are described in this application. The enhancements allow the RSD to be configured with Pre-Conditions that may be based on the UE's context. The Pre-Conditions indicate to the UE that the route is only valid if Pre-Conditions are met. For example, pre-condition: "Active PDU Session associated with Mutually Exclusive S-NSSAI(s)" field in the RSD can indicate to the UE that the RSD may not be considered valid if there is active traffic associated with the mutually exclusive S-NSSAI.

The RSD in the URSP rules is further enhanced with Preparation Actions that the UE takes if all the parts of the RSD are valid and the Validation Criteria are met. The UE should take the preparation action(s) before attempting to use the route. For example, preparation action: "Send a Registration Update" may mean to send a registration update so that lower priority slice(s) is removed from the Allowed NSSAI.

The Pre-Condition(s) and Preparation Action(s) in the enhanced RSD of the URSP rules may be associated with Context information (e.g. the UE's location, the time of day, User permissions, etc.).

Another issue that is addressed in this application is that the 5G network is also expected to support different deployment models, wherein a third-party entity may want slice-specific privacy so that the packets flowing through the slice are encrypted as they pass through the MNO's network or through NF's that are shared with other slices in the network. This application provides a mechanism for enabling third-party enabled slice specific encryption. Hence, the following features are presented in this application:

An enhanced procedure by which a third-party AAA-S may be able to request the UE to activate a new encryption mode called Third-party Encryption.

The Slice-specific Authentication and Authorization process is enhanced to support slice-specific third-party encryption where, During third-party Slice Authentication and Authorization, the UE NAS Layer receives the third-party encryption information (TPEI). The TPEI is interpreted as an indication that encryption should be applied in a new Slice Data Encryption (SDE) Layer for all PDU Sessions that are associated with the network slice and that encryption should not be applied at the PDCP layer for all PDU Sessions that are associated with the network slice.

A new sublayer called Slice Data Encryption (SDE) layer that resides in the UE protocol stack under PDU layer and above SDAP layer and between PDU layer and the GTP-U layer in the PSA UPF's protocol stack.

When sending packets, the SDE Layer receives slice-specific PDUs (i.e. packets) from the PDU layer, encrypts the PDU and submits the encrypted PDUs to the lower layer as Encrypted SDAP SDUs. The SDAP layer handles the Encrypted SDAP SDUs by assigning them QoS flow ID and adding SDAP headers. Encrypted SDAP SDUs are relayed towards GTP-U layer in 5G-AN.

Third-party PSA UPF in the third-party network is cascaded with the intermediate UPF (I-UPF) of the CN via an N9 interface. PSA UPF in is where received encrypted SDE packets are decrypted.

When an AS in the third-party network wants to send slice-specific private data to the UE, PSA's SDE layer receives PDUs (i.e. packets) from the PDU layer encrypts the PDUs and submits the encrypted PDUs to the lower GTP-U layer, where GTP-U headers are added over encrypted SDE packets. GTP-U packets from PSA are tunneled towards the GTP-U layer of I-UPF in the CN.

This application provides systems and methods for a UE to encode, or create, an identifier that represents all of the UPSI's that are installed in the UE and then send the encoding to the network.

The encoding may be based on a CRC or Hash calculation.

The value may be sent in the UE STATE INDICATION message.

This new information can be part of the UPSI list or the UPSI sublist.

The UE maybe triggered to perform the calculation and send it to the network when it receives a MANAGE UE POLICY COMMAND with an indication that the calculation should be sent to the network. The MANAGE UE POLICY COMMAND may indicate to the UE whether it should send all UPSI's to the PCF or an identifier that represents all of the UPSI's The encoding can be created on a per PLMN, group, OS, user, location, or application type basis.

The PCF may receive the encoding, determine that the UE's policies need to be updated, and send updated policies to the UE.

This application provides systems and methods for a UE to indicate to the network that it needs policies to handle certain types of traffic. The application further provides systems and methods for a UE STATE INDICATION message to be modified to allow the UE to indicate to the network that it needs a URSP policy for a certain type of traffic.

The UE STATE INDICATION may carry a Traffic Descriptor to indicate to the network what type of traffic the request applies to.

The UE STATE INDICATION may carry an ePDG identifier, N3IWF Identifier, or SSID to indicate to the network what access network it needs policies for.

The UE may be triggered to send this message to the network when it cannot establish a route for traffic that meets the Traffic Descriptor e.g. when a PDU session establishment fails for the Traffic Descriptor or the UE attempts to update its allowed NSSAI to accommodate the route and determines that that it cannot update its allowed NSSAI.

The UE may be triggered to send this message by a GUI.

This application provides systems and methods for a how the network may send a message to the UE that indicates what types of policies the network can provide.

The message can indicate that policies are available for certain Traffic Descriptors, ePDGs, N3IWFs, or SSIDs.

The UE may respond indications of the whether policies that are associated with the Traffic Descriptors, ePDGs, N3IWFs, or SSIDs are desired by the UE.

The network (PCF) maybe triggered to send this message based on a request from the AF, an indication from the SMF that certain traffic types have been detected, an indication of anticipated behavior from the NWDAF, an indication from the UDM/UDR, etc.

This application provides systems and methods for a Network (PCF) to configure the UE (or SMF/UPF) to send reports to the network when certain URSP related events are detected.

The configuration information may be sent in the MANAGE UE POLICY COMMAND. The contents of the configuration information are detailed further in the application.

The reports may be sent from the UE in the UE STATE INDICATION command The contents of the report are detailed further in the application.

When the PCF receives the report, it may determine that policies on the UE need to be updated.

Instead of coming from the UE, the report may come from the UPF to the PCF via the SMF.

The application provides systems and methods for how the PCF may use analytic information from the NWDAF or AF to anticipate what policies the UE will need.

The NWDAF may provide UE Mobility predictions to the PCF and the PCF may use this information to determine what policies to send to the UE.

The AF may store anticipated UE behavior in the UDR. The PCF may subscribe to this information and use it to determine what policies to send to the UE The application provides systems and methods for how the network can indicate to the UE that the UE should only apply certain rules under certain conditions.

Certain conditions include the UE's location and the UE's ongoing traffic.

The indication can be sent in the UE Configuration Update command

The application provides systems and methods for how policy data may be stored on a group basis in the UDR by an AF and retrieve, on a group basis, by the PCF.

The application describes how the 5GC may provide EPC policies to the UE. The EPC attached UE requests the policies from the MME and the MME retrieves the policies from a PCF via an AMF.

MEANS Using URSP Rules

As previously discussed, the MEANS issue has not been addressed by 3GPP yet. The solutions proposed in TR 23.740 cover limited aspects of the issue in what they do to determine which slice, or which type of traffic, takes priority. Therefore, this application provides enhancements to the URSP rules in order to enable MEANS.

To enable MEANS, mechanisms are proposed that (i) allow a slice to be prioritized based on context-aware URSP rules, provisioned in the UE by the network, (ii) allow RSD enhancements in the URSP rules to be configured with Pre-Conditions and Preparation Actions, and (iii) the Pre- Conditions and Preparation Actions in the enhanced RSD may be associated with Context information such as the UE's location, the time of day, active user privileges, etc.

The enhancements allow the UE's context to be factored into slice/route selection. The enhancements also allow the UE to be configured such that certain types of traffic (e.g. targeting lower priority slices) can be blocked depending on the UE's context (e.g. UE's location, time of day, UE user's active roles etc.). The URSP rules may also explicitly indicate the priority of one S-NSSAI relative to another S-NSSAI. This process is illustrated in FIG. 8.

Figure 8:
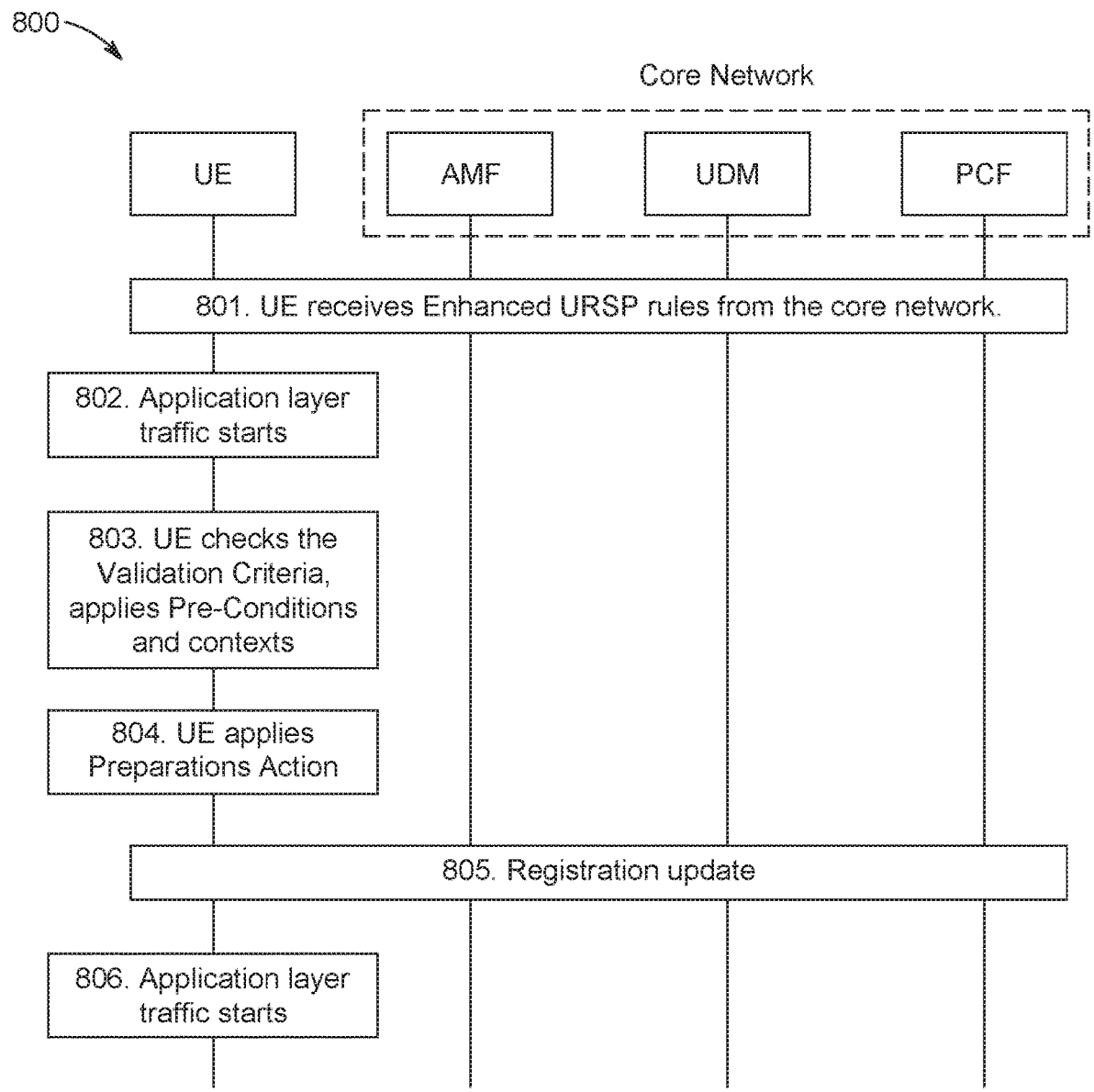
FIG. 8 shows an exemplary procedure for Mutually Exclusive Access to Network Slices (MEANS)

In particular, FIG. 8 illustrates the following exemplary procedure 800:

801. The UE receives the enhanced URSP rules from the PCF in the core network.

802. An application on the UE begins to generate traffic.

803. The UE begins to evaluate what URSP rule should be applied to the generated traffic. The URSP rules may include pre-Conditions that are used to determine if the traffic should be allowed. When evaluating the URSP rules, the UE may consider the UE's context. The URSP rules may indicate to the UE how the UE's context should be considered. The UE checks for on-going sessions, UE contexts, and validation criteria before a registration update.

804. The RSD that the UE selects from the URSP may include preparation actions that must be applied before the UE allows the traffic. The UE checks if it needs to conduct preparation actions. A preparation action could include actions for instance, ending an ongoing session of a lower priority slice and/or ensuring for a congestion free network slice, before requesting registration for a higher priority network slice. In this step, the UE executes the preparation actions.

805. The UE sends a registration update request to the network. The UE registers with new S-NSSAI(s). The request indicates to the network that the UE wants to add the S-NSSAI that is associated with the new traffic to the UE's allowed NSSAI. Note that this step may be integrated with step 4.

806. A PDU Session is established in the S-NSSAI that was added to the allowed NSSAI and the UE uses the PDU Session to send the new traffic. The UE starts application traffic towards a new slice. Note that this step may be integrated with steps 4 and 5.

Network Slice Priority

When two or more slices are mutually exclusive, there should be a mechanism for selecting one slice among the slices, while excluding others. In this application, a slice is chosen over another slice based on URSP rules that have been provisioned to the UE by the network. These policies may be configured to consider the UE's current context when determining which slice has priority. For example, slice B may have higher priority over slice A, when the UE is at a certain location or during a certain time window.

Handling Traffic for Lower Priority Slices

Consider a scenario where slice A and slice B should be mutually exclusive. Slice A's traffic always takes higher priority over traffic that is targeted for slice B. The UE can include slice A and B in its requested NSSAI, but the response from the network may only indicate slice A in the allowed NSSAI because it is higher priority. The response from the network might include an indication (i.e. a cause value) that indicates to the UE that slice B is not allowed because it is mutually exclusive to slice A.

Consider the case where, later the UE initiates traffic for slice B while there is ongoing traffic for slice A. In this case, the UE must be configured to block traffic for slice B, as there is an ongoing traffic for a higher priority slice (i.e. slice A). In an exemplary implementation of this application, the URSP rules are enhanced such that the network can configure the UE to block traffic for slice B.

Table 5 shows one example of how the format of the RSD can be enhanced with Pre-Conditions. Pre-Conditions indicate to the UE that the route is only valid if Pre-Conditions are met. In the example of Table 5, an "Active PDU Session associated with Mutually Exclusive S-NSSAI(s)" field is added to the RSD. This field may indicate to the UE that the RSD is not considered valid if there is active traffic associated with the mutually exclusive S-NSSAI. Alternatively, an indication could be provided to tell the UE that the RSD is only considered valid if there are no mutually exclusive S-NSSAI(s) in the allowed NSSAI.

It should be noted that, in order for the network to configure the URSP rule such that traffic for the lower priority slice is blocked, the network should configure all RSDs in the URSP rule with the same Pre-Conditions. Configuring all RSDs with the same Pre-Conditions would allow the UE to determine that no route to the slice is valid while connected to a mutually exclusive slice. Alternatively, Pre-Conditions may be associated with Traffic Descriptor instead of an RSD in the URSP rule. This way, UE can implement Pre-Conditions before selecting the route, and hence, the selection of appropriate S-NSSAI(s). Note that the network is aware of the slices' priorities.

Consider the case where, later the UE initiates traffic for slice B while there is no ongoing traffic for slice A. In this case, the UE is allowed to initiate traffic for slice B and UE should update its registration by including slice B in its requested NSSAI.

Note that the UE might know, based on the priority indication that was received in the earlier Registration Response, to not include S-NSSAI B in the registration request. Alternatively, the UE may know, based on the Pre-Conditions that were indicated in the RSD rules, to not include S-NSSAI B in the registration request.

Note that Pre-Conditions may be part of the Validation Criteria.

TABLE 5

Enhanced RSD

| Information name | Description | Category | PCF permitted to modify in URSP | Scope |
| --- | --- | --- | --- | --- |
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |

TABLE 5-continued

Enhanced RSD

| Information name | Description | Category | PCF permitted to modify in URSP | Scope |
|---|---|---|---|---|
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD may not be considered to be valid if the current time is not in the time window. | Optional | Yes | UE context |
| Location Criteria | The UE location where the matching traffic is allowed. The RSD rule may not be considered to be valid if the UE location does not match the location criteria. | Optional | Yes | UE context |
| Pre-Conditions (NOTE 7) | This part defines pre-condition component | Optional | | |
| Active PDU Session associated with Mutually Exclusive S-NSSAI(s) | The RSD may not be considered valid if there is traffic that is associated with Mutually Exclusive S-NSSAI(s). | Optional | Yes | UE Context |
| Preparation Actions (NOTE 8) | This part defines Preparation Actions component | Optional | | |
| Preparation Action(s) | If all of the parts of the RSD are valid and the Validation Criteria is met, the UE must take the preparation action(s) before attempting to use the route. | Optional | Yes | UE Context |

(NOTE 1):
Every Route Selection Descriptor in the list shall have a different precedence value.
(NOTE 2):
At least one of the route selection components shall be present.
(NOTE 3):
When the Subscription Information includes only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components shall be included in the Route Selection Descriptor.
(NOTE 5):
The SSC Mode 3 shall only be used when the PDU Session Type is IP.
(NOTE 6):
The Route Selection Descriptor may not be considered valid unless all the provided Validation Criteria are met.
(NOTE 7):
The Route Selection Descriptor may not be considered valid unless all the provided Pre-Conditions are met.
(NOTE 8):
The Route Selection Descriptor may not be considered valid until the UE executes the preparation actions.

Handling Traffic for Higher Priority Slices

Continuing with the case of the previous section, consider the case where, later the UE initiates traffic for slice A while there is ongoing traffic for slice B. In this case, the UE should block/discontinue the traffic for slice B and update its registration by including slice A in its request NSSAI. In an exemplary implementation of this application, the RSD is updated to allow the network to indicate to the UE that, in this scenario, the UE should block/discontinue the traffic for slice B and update its registration by including slice A in its request NSSAI.

In an exemplary implementation of this application, the RSD is updated with Preparation Action(s) as shown in Table 5. A preparation action is an action that the UE takes if all of the parts of the RSD are valid and the Validation Criteria are met. The UE should take the preparation action(s) before attempting to use the route. In this example, a preparation action might be "Send a Registration Update so that slice B is removed from the Allowed NSSAI and Slice A is added". The UE would do this by including slice A's S-NSSAI in its request NSSAI and not including slice B's S-NSSAI. As the preparation action completes, UE is registered with slice A. Other examples of preparation action might include "Terminate PDU Sessions that are associated with slice B." Of course, removing S-NSSAI B from the allowed NSSAI also implies that the PDU sessions that are associated with S-NSSAI B should be terminated.

In the case where slices A and B are mutually exclusive, and slice A takes priority. It may be the case that the UE will attempt to send a Registration Update so that slice B is removed from the Allowed NSSAI and Slice A is added. If Slice A is congested, the network may respond with a wait timer indicating that the slice is congested, or in an overload state, and cannot be accessed at this time. In this scenario, the UE would not be registered with either slice A or slice B while it is backed off. Thus, this application proposes that the registration message be enhanced to allow the UE to indicate to the network that it wants to add slice A to its allowed NSSAI and remove slice B only on the condition that Registration to slice A can be completed. Alternatively, the registration request message could be enhanced to allow the UE to indicate to the network that it wants to register with slices A and B and that slice A is higher priority. The network can then respond to the UE with an Allowed NSSAI that indicates what slices it is registered with. If it did not allow registration with slice A because it is congested, a slice A back off timer may be provided.

UE's Context when Determining Slice Priority

Which slice takes priority over other mutually exclusive slices may depend on the UE's context.

The Pre-Condition(s) and Preparation Action(s) that were added to the RSD as shown in Table 5 may be associated with Context information. For example, a Pre-Conditions or Preparation Action may be associated with a time period such that the Pre-Condition or Preparation Action is ignored by the UE outside the time window, or within the time window. This would be useful in a scenario where 2 slices are mutually exclusive only within a certain time window or when slice priority depends on the current time. For example, pre-condition "Active HP slice PDU session within in time window" may mean that UE is not allowed to request registration for any lower priority slice within the given time window.

In another example, a UE's Pre-Conditions or Preparation Action may be associated with a location such that the Pre-Condition or Preparation Action is ignored by the UE outside the time window, or within the time window. This would be useful in a scenario where 2 slices are mutually exclusive only in a certain location or when the slice priority depends on the UE location. In addition, the Pre-Conditions and Preparation Action may depend on current user(s) logged in the UE (among multiple users), the active role or privileges the user has acquired, QoS requirements, the state of the UE (e.g. Mobile state, stationary, parking, charging, Idle, inactive etc.), application category (e.g. Medical, sports, finance, HR, technology test, technology production etc.), the category of other active applications, the UE condition (e.g. Emergency, normal, urgent etc.), whether the UE has an emergency PDU session, etc.

Alternatively, UE may be able to use Validation Criteria to derive context information for the UE and utilize it to make decisions for MEANS.

For the case where the UE's context may be used to determine that certain slices are not mutually exclusive or that a different slice takes highest priority, it should be possible to specify a "don't care" or "always ok" pre-condition that is associated with a context check. For example, a "don't care" or "always ok" pre-condition that is associated with the time 3:00 AM-3:00 PM may indicate that the slice is not mutually exclusive to any other slices at that time of day or is always highest priority at that time of day.

There may be cases where policies for mutual exclusion of slices may need to be overwritten. However, this may not be possible for all mutually exclusive slices. But if overwriting mutually exclusion is allowed, it should be possible for applications in the UE to indicate when "Exceptions" apply to certain pieces of traffic or flows. For instance, an exception may be invoked during emergency by enforcing "Exception due to emergency" or for political reasons by involving "Exception by executive veto privilege". Nevertheless, "Exceptions" may be limited by contextual facts. For example, if an air taxi is flying and it is accessing Air Services slice, but the user tries to access mutually exclusive Ground Services slice, it may be denied even if the user invokes executive veto privilege. The URSP rule may have indicated to the UE under which Emergency conditions the UE may register with mutually exclusive slices. The UE may further indicate the emergency condition to the network when attempting to register to the mutually exclusive slices.

Slice-Specific Encryption for Third-Party Data Privacy

To establish a private network slice such that the data transferred from within the network slice is undetectable by other slices and the MNO, a private communication channel must span from UE to the network that hosts the third-party server the UE is in communication with and vice versa.

A UE must have a pre-shared key with third-party server (e.g. an Authentication, Authorization and Accounting Server (AAA-S)). During the general UE registration process, when UE attempts to obtain access to Third-party's network-slices, the AAA-S may authenticate and authorize the UE as described in S2-1902882 and conceptually depicted in FIG. 9.

A network slice that involves user plane communication includes a PSA user plane function (PSA UPF) that anchors the UE's user plane connection. The PSA is a UPF that routes user plane packets out of the CN towards the data network that hosts the Application Server (AS) that the UE is in communication with. The PSA is typically deployed within the MNO's network. Since 3GPP protocols do not encrypt data between the RAN and PSA UPF, user plane data is not encrypted by 3GPP protocols as it traverses the MNO's network (unless application layer encryption was applied).

Figure 9:
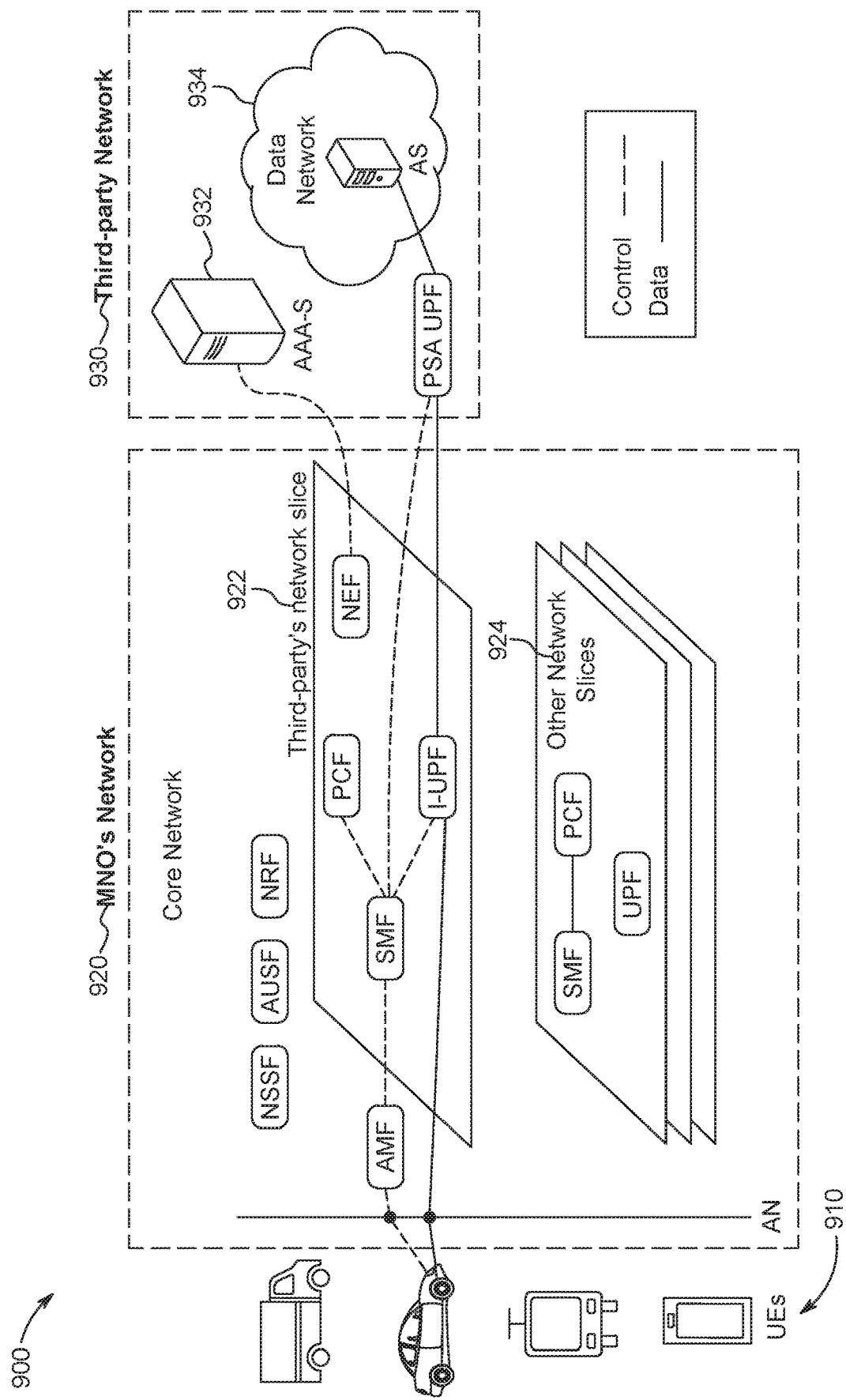
FIG. 9 shows an exemplary network slice with third-party resources.

In an exemplary implementation of this application, there is a deployment where the PSA is deployed in the third-party's network with the AS in data network 934 that the UE is communicating with. Other UPF(s) may be deployed in the MNO's network between the RAN and PSA. The MNO may deploy UPFs within the MNO network to perform functions such as routing, charging, etc. This is illustrated in FIG. 9. It shows a third-party controlled network slice 922 in the core network/MNO network 920 with an I-UPF cascaded with the PSA that resides outside of the core network in the third-party's network 920 and hence, under the control of the third-party entity. In this application, it is proposed that the PSA be the UE 910's security endpoint (instead of the RAN node). The PSA UPF can be administered and controlled by the third-party entity via third party network 930. It is positioned in series with the MNO's I-UPF's or connects directly to the MNO's RAN node. This means that whatever user plane packets that I-UPF receives are tunneled as is, towards PSA UPF.

FIG. 9 shows the basic entities involved in the process of slice-specific Third-party encryption for private channel. The rectangular boxes show domains with separate administrative authorities. In particular, there is an MNO network and a third-party network. Notice that MNO's network includes AN and parts of the network slice.

In FIG. 9, control signals are shown among AMF, SMF, I-UPF, NEF and PCF. FIG. 9 also depicts other service functions such as NSSF, AUSF, and NRF. These NFs are placed outside of the Third-party network slice to indicate that they may be shared by network slices in the core network. Some of the network functions such as NSSF and NRF help in administering processes in the network slice, and thus shall not be a reserved NF of a network slice. The NEF may expose an API that allows the third-party AAA-S 932 to securely authenticate and authorize UEs.

The solid line indicates user plane data channel that spans from the UE, through the access network (AN) and the two cascaded UPFs (the I-UPF and PSA).

Procedure to Enable Third-Party Encryption

The process in FIGS. 4A and 4B obtained from S2-1902882 may be enhanced, such that the Third-party AAA-S may be able to request that the UE activate a new encryption mode. This new encryption mode is referred to as Third-Party Encryption in this application.

When the UE performs the registration procedure, the network may activate the slice specific 3rd party authentication and authorization procedure. In an exemplary implementation of this application, this procedure is enhanced to allow the AAA-S to indicate to the UE that the new encryption mode should be activated. Alternatively, the new encryption mode activation indication can be sent by another NF (e.g. the AMF) based on an indication from the UDR.

Figure 10A:
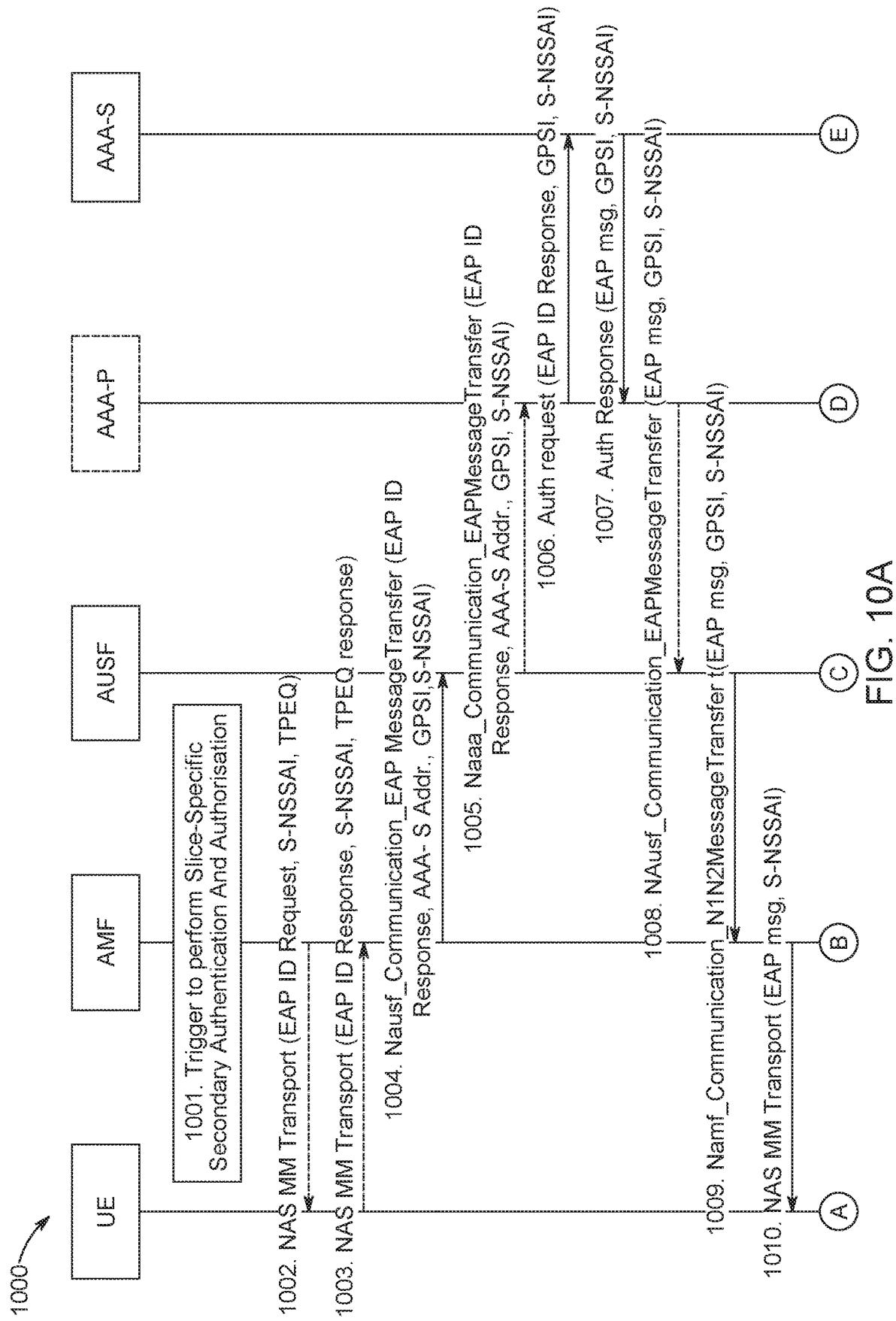
FIGS. 10A and 10B show an exemplary procedure for slice-specific third-party encryption.
Figure 10B:
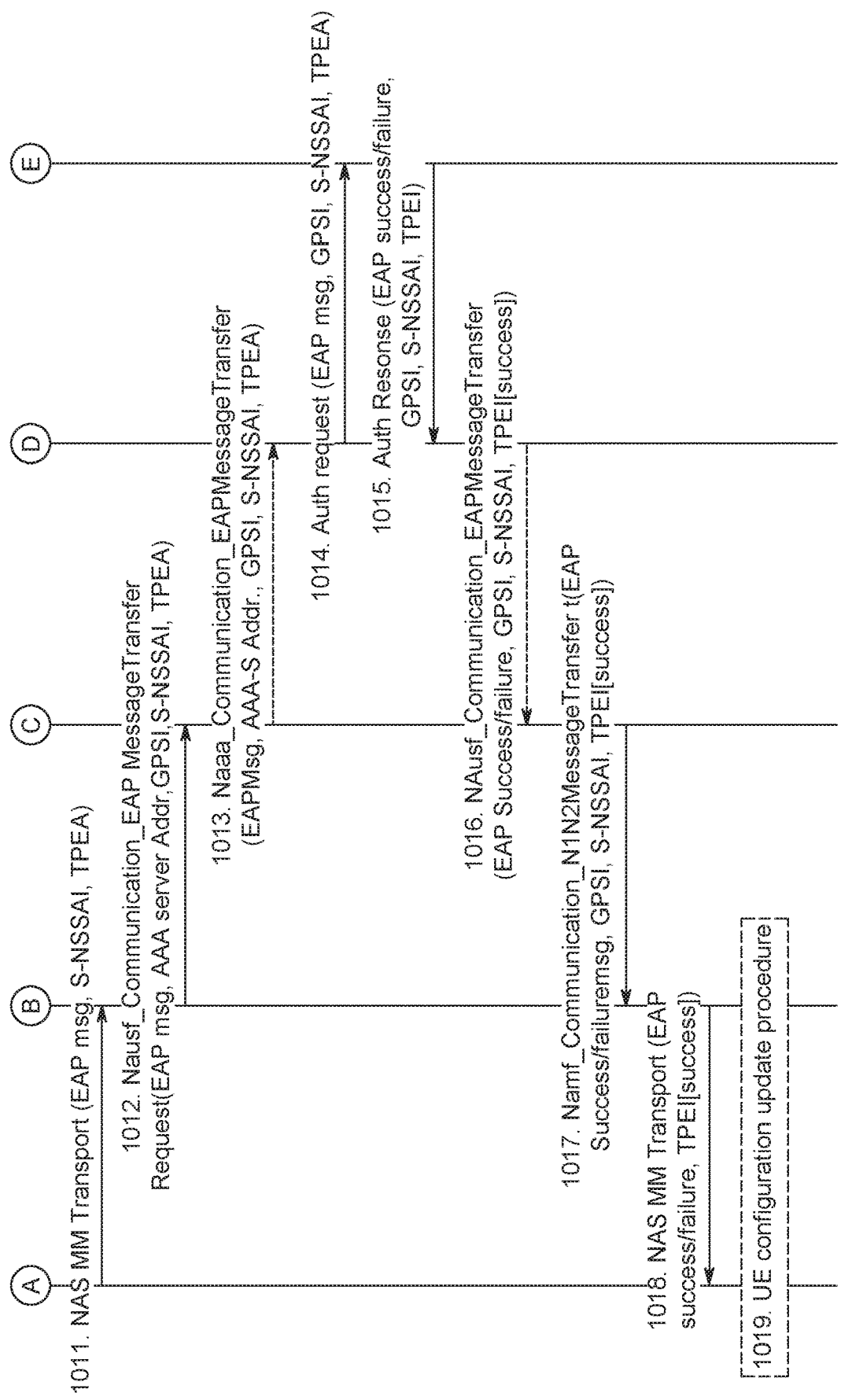

FIGS. 10A and 10B illustrate an exemplary procedure 1000 for slice-specific third-party encryption. In particular, FIGS. 10A and 10B show how the existing procedure may be updated to allow the AAA-S to indicate to the UE that the new security mode should be enabled.

In addition, Steps 1007-10114, which are summarized in FIGS. 4A and 4B are described individually, as these steps involve the enhancement process. Call flows in FIGS. 10A and 10B are described as follows:

1001. For S-NSSAIs that are requiring Network Slice-Specific Secondary authentication and authorization, based on local policy, change of subscription information, or triggered by the AAA Server, the AMF may trigger the start of the Network Slice Specific Secondary Authentication Procedure. The UE attempts to register to the slice.

1002. The AMF requests the UE User ID for EAP authentication (EAP ID) for the S-NSSAI in a NAS MM Transport message including the S-NSSAI. AMF may also ask if UE supports the new encryption mode, Third-party encryption, with a Third-Party Encryption Query (TPEQ) message, TPEQ. Alternatively, this indication may have been provided by the UE in a Registration Request. The network asks for the UE's ID, indicates if $3^{rd}$ party encryption is supported, and the UE responds.

1003. The UE provides the EAP ID for the S-NSSAI alongside the S-NSSAI in an NAS MM Transport message towards the AMF. In addition, UE may provide a TPEQ response that indicates UE's acknowledgement or support for Third-Party Encryption.

1004. The AMF confirms UE's capability to support Third-Party Encryption for privacy. It sends the EAP ID to the AUSF in a Nausf_Communication_EAPMessage_Transfer (EAP ID Response, AAA-S address, GPSI, S-NSSAI). If UE couldn't acknowledge the TPEQ message, the AMF has the ability to discard, or reject, third-party Encryption enablement procedure, or simply allow the flow to continue and indicate to the AAA-S that the UE cannot support third party encryption so that the AAA-S can determine whether to allow the UE.

1005. The AUSF invokes the Nausf_Communication_EAPmessageTransfer service to forward the message to the AAA-P.

1006. The AAA-P associates AAA-S address with the S-NSSAI and forwards the EAP Identity message to the AAA-S addressable by the AAA-S address together with S-NSSAI and GPSI. The AAA-S server has authenticated the UE.

1007. AAA-S sends an Authentication Response (EAP message, GPSI, S-NSSAI) for the UE towards AAA-P. EAP message includes challenge for the UE.

1008. The AAA-P sends the Nausf_Communication_EAPmessageTransfer (EAP msg, S-NSSAI, GPSI) to the AUSF.

1009. The AUSF sends the Namf_Communication_N1N2messageTranfser (EAP msg, S-NSSAI, GPSI) to the AMF.

1010. The AMF transmits a NAS MM Transport message (EAP msg, S-NSSAI) to the UE.

1011. At this point, UE has authenticated the AAA-S Server. Hence, UE may provide a response to the challenge in the EAP message alongside the S-NSSAI in an NAS MM Transport message towards the AMF. As a response to the TPEQ (Step 2), a UE may attach Third-party Encryption and Algorithm (TPEA) message to provide AAA-S with an information that indicates UE's support of Third-party encryption and a list of algorithms that it supports for Third-party encryption. Alternatively, the TPEA information may have been provided in step 3. The UE has EAP-authenticated the AAA-S server and sends third party encryption information.

1012. The AMF sends the EAP response message to the AUSF in a Nausf_Communication_EAPMessage_Transfer Request (EAP msg, AAA-S address, GPSI, S-NSSAI, TPEA), which includes the TPEA received from the UE. Encryption information is forwarded to AAA-S.

1013. The AUSF invokes the Naaa_Communication_EAPmessageTransfer service to forward the message to the AAA-P.

1014. The AAA-P associates AAA-S address with the S-NSSAI and forwards the EAP Identity message to the AAA-S addressable by the AAA-S address together with S-NSSAI, GPSI and TPEA.

Note: In Steps 1007-1014, EAP-messages are exchanged with the UE. One or more than one iteration of these steps may occur.

1015. EAP authentication completes. An EAP-Success/Failure message is delivered to the AAA-P (or if the AAA-P is not present, directly to the AUSF) with GPSI and S-NSSAI. If authentication is EAP-Success, AAA-S may include Third-Party Encryption Information (TPEI). TPEI may indicate if Third-party encryption is required for that UE and the list of algorithms that it supports against the list of encryption algorithms that were described in Step 11. Alternatively, the TPEI may simply indicate which algorithm the UE should use. EAP-Success message sent together with the TPEI. Provided that Third-party encryption is required, TPEI may include an indication (e.g. code number) on which key to use, whether user needs to enter a previously configured passcode or a URL. A URL may indicate the UE to fetch keying material from the address of the supplied URL. If UE fails EAP-based authentication and authorization for a requested S-NSSAI, then TPEI is not populated in the response.

If the EAP authentication is a success, AAA-S includes third-party encryption information and indicates an activation request.

1016. If the AAA-P is used, the AAA-P sends the Nausf_Communication_EAPmessageTransfer (EAP-Success/Failure, S-NSSAI, GPSI, TPEI [success]) to the AUSF.

Note: TPEI [success] indicates that TPEI is delivered only if Slice-Specific Authentication and Authorization process is an EAP-Success.

1017. The AUSF sends the Namf_Communication_N1N2messageTransfer (EAP-Success/Failure, S-NSSAI, GPSI, TPEI [success]) to the AMF.

1018. The AMF transmits a NAS MM Transport message (EAP-Success/Failure, TPEI [success]) to the UE. In particular, the AMF transmits EAP-success/failure message to the UE. The UE is ready to execute third-party slice-specific encryption procedure.

1019. The AMF updates the UE's Allowed NSSAI to include the S-NSSAI by sending a UE configuration update message to the UE. Note that this message may alternatively be used to send some or all of the information of the TPEI to the UE.

Third-Party Slice-Specific Encryption Procedure

Previously discussed, the user plane encryption occurs in the PDCP layer in the UE to 5G-AN protocol stack. However, since the data protection due to PDCP layer is offered only between UE and the radio access network in the user plane, the user plane data may not be encrypted by 3GPP protocols when the data traverses the MNO's network.

As Third-Party demands data privacy between the UE and the third party's network, privacy protection must be extended beyond the access network. Therefore, encryption functionality may be introduced in a new layer so that data can be encrypted as it traverses the MNO's network. Specifically, the encryption can happen between the UE and the PSA UPF, instead of between the UE and RAN node.

Figure 11:
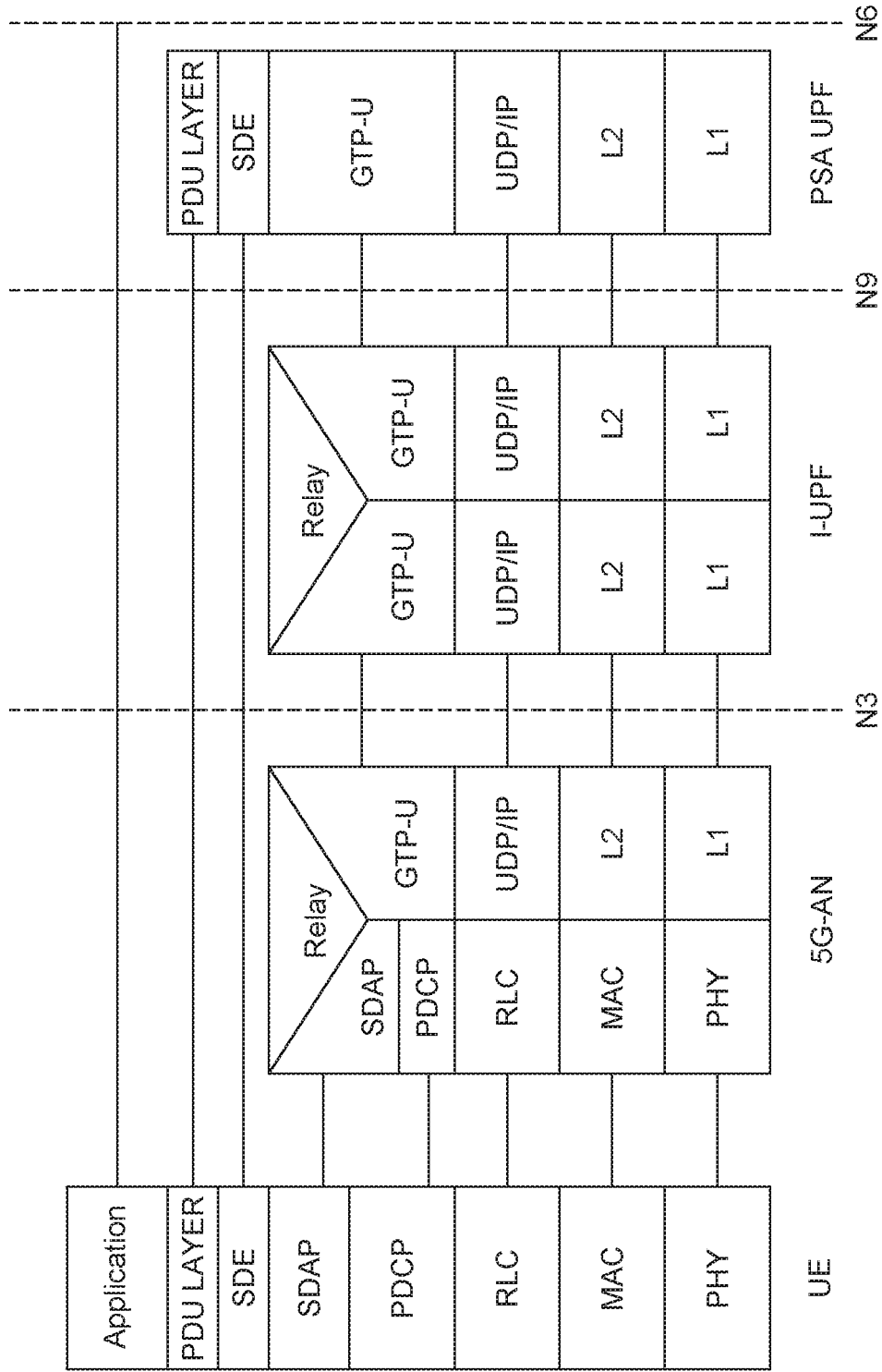
FIG. 11 shows an exemplary user plane protocol stack including slice data encryption (SDE) sublayer in accordance with the present application.

FIG. 11 shows an exemplary user plane protocol stack including slice data encryption (SDE) sublayer in accordance with the present application.

As FIG. 11 shows, a Slice Data Encryption (SDE) layer is provided in the UE protocol stack under PDU layer and above SDAP layer and, between PDU layer and the GTP-U layer in the PSA UPF's protocol stack. During third-party Slice Authentication and Authorization, the UE NAS Layer receives the TPEI. The TPEI is interpreted as an indication that encryption should be applied in the SDE Layer for all PDU Sessions that are associated with the network slice and that encryption should not be applied at the PDCP layer for all PDU Sessions that are associated with the network slice. Note that the SDE Layer is shown as a separate layer in the protocol stack of FIG. 11. Alternatively, the functionality of the SDE Layer may also be incorporated as part of the PDU layer or the SDAP layer. Of course, if the functionality were to be added to the SDAP layer, the functionality of the SDE layer also have to be added to the PSA UPF. Various alternatives for SDE functionality could be adapted in PSA UPF. For instance, it could be part of the PDU layer or GTP-U layer.

When sending packets, the SDE Layer receives PDUs (from the PDU layer, encrypts the PDU and submits the encrypted PDUs to the lower layer as Encrypted SDAP SDUs. The SDAP layer handles the Encrypted SDAP SDUs by assigning them QoS flow ID and adding SDAP headers.

A PSA is cascaded with the I-UPF using the N9 interface. As shown in FIG. 11, there exists a tunnel between the two UPFs. Note that GTP-U layer's tunneled data is the SDE sublayer's encrypted data. I-UPF relays the GTP-U level packets via the tunnel established between the I-UPF and the PSA. At the PSA, the GTP-U layer packets are received from the lower layer and are sent to the SDE Layer after removing GTP-U headers and GTP-U layer IDs. After the GTP-U layer at the PSA UPF removes the GTP-U header, it ends up with an encrypted PDU packet. This packet is sent to the upper SDE Layer. SDE Layer decrypts the PDU packets received from the GTP-U layer.

On the other hand, when 3rd party network wants to send slice-specific private data to the UE, PSA's SDE layer receives PDUs (i.e. packets) from the PDU layer, encrypts the PDUs and submits the encrypted PDUs to the lower GTP-U layer, where GTP-U headers are added over encrypted SDE packets. GTP-U packets from PSA are tunneled towards the GTP-U layer of I-UPF in the CN. GTP-U packets are relayed and further tunneled towards 5G-AN's GTP-U layer via N3 interface shown in FIG. 11. GTP-U packets are relayed towards SDAP layer in 5G-AN's protocol stack. SDAP layer in 5G-AN removes GTP-U headers and handles the packets as Encrypted SDAP SDUs by assigning them QoS flow ID and adding SDAP headers.

As packets are received at the UE's SDAP layer, SDAP headers are removed before sending packets to the SDE layer. At this point, the SDE layer has obtained SDE encrypted packet from the network. UE's SDE layer decrypts the packet using agreed-upon pre-shared key(s) used for slice-specific encryption. SDE layer sends the decrypted packets to the upper PDU layer.

The SDE sublayer may be an optional layer that may only be used if needed and as indicated by the TPEI, for instance in the case where Third-party slice-specific encryption is required. Activation of the SDE sublayer, or functionality, may further cause the UE to disable encryption at the PDCP layer.

Graphical User Interface

FIG. 12 shows an exemplary graphical user interface (GUI) 1200 for selecting contexts, pre-conditions and preparation actions for MEANS policy rules. FIG. 12 shows a user interface that could be used locally in a UE or in the AS network server, to select contexts, preconditions, and Preparation Actions to enable context aware URSP rules for mutually exclusive access to network slices.

An administrator may be able to activate third party encryption in a UE by entering a Third-party encryption (master) key, the name of the desired slice(s), where encryption may be applied, and list of encryption algorithms that UE shall support. A prototype user interface 1300 is shown in FIG. 13.

An exemplary embodiment of the present disclosure provides an apparatus comprising processing circuitry that is configured to receive a policy from a network device; process the policy according to context indications to determine whether the policy is to be applied to network traffic; transmit a registration update request to the network device; and establish a protocol data unit (PDU) session for communicating the network traffic. The policy may be a user equipment (UE) route selection policy (URSP). The policy may include includes pre-conditions, in which the processing circuitry processes the policy according to the pre-conditions. The processing circuitry may process the policy according to validation criteria provided in the policy.

To process the policy, the processing circuitry is configured to check validation criteria, and apply preconditions and contexts to determine whether the policy is to be applied to the network traffic. The processing circuitry may be further configured to apply a preparation action by selecting a route selection descriptor (RSD) from the policy, and the RSD indicates the preparation action that is applied.

The registration update request may indicate a request to register with a new Single Network Slice Selection Assistance Information (S-NSSAI). The S-NSSAI is associated with the network traffic, and the request indicates that the apparatus is adding the S-NSSAI. The PDU session is established in the S-NSSAI. The processing circuitry may use the PDU session to communicate the network traffic.

The processing circuitry may process the policy to determine a priority of the network traffic. The processing circuitry may process the policy to determine a congestion free network slice. The processing circuitry may process the policy to determine a priority of an ongoing network communication session. The processing circuitry may end the ongoing network communication session before establishing the PDU session.

The PDU session may be conducted on a network slice provided by the network device. The network slice is mutually exclusive from another network slice.

The processing circuitry may be further configured to execute a Mutually Exclusive Access to Network Slices (MEANS) procedure. The processing circuitry may be further configured to control a display to display a graphical user interface (GUI) for input, form a user, of information for the MEANS procedure. The information may include contexts for the policy preconditions for the policy or preparation actions for the policy.

First network traffic may be allocated to a first slice provided by the network device and second network traffic may be allocated to a second slice provided by the network device. The processing circuitry may be further configured to determine, based on the policy and the context indications, a higher priority slice of the first slice and the second slice, and maintain one of the first network traffic and the second network traffic that corresponds to the higher priority slice and terminate another of the first network traffic and the second network traffic. The registration update request may indicate a terminated slice of the first slice and the second slice, and the PDU session is performed on the higher priority slice.

An exemplary embodiment of the present disclosure provides a method performed by an apparatus including processing circuitry, the method comprising receiving a policy from a network device; processing, by the processing circuitry, the policy according to context indications to determine whether the policy is to be applied to network traffic; transmitting a registration update request to the network device; and establishing a protocol data unit (PDU) session for communicating the network traffic.

An exemplary embodiment of the present disclosure provides a non-transitory computer readable storage medium having computer-readable instructions tangibly recorded thereon which, when executed by processing circuitry, cause the processing circuitry to perform a message service method on a network, the method comprising receiving a policy from a network device; processing the policy according to context indications to determine whether the policy is to be applied to network traffic; transmitting a registration update request to the network device; and establishing a protocol data unit (PDU) session for communicating the network traffic.

An exemplary embodiment of the present disclosure provides an apparatus, comprising processing circuitry configured to transmit a policy to a user equipment (UE) that processes the policy; receive a registration update request from the UE; and establish a communication session with the UE.

An exemplary embodiment of the present disclosure provides an apparatus, comprising processing circuitry configured to transmit a registration request, to a network device, to register to a network slice; receive, from the network device in response to the registration request, a capability request for third-party encryption; transmit, to the network device, a capability response that indicates a capability of the apparatus for third-party encryption; receive, from the network device in response to the capability response, encryption information; and activate third-party encryption on the network slice for communication with a third-party device.

The registration request may trigger a slice-specific secondary authentication and authorization procedure. The network device may transmit the capability request to the apparatus according to the slice-specific secondary authentication and authorization procedure. The processing circuitry may EAP authenticate the network device and then transmits the capability of the apparatus. The network device may transmit the encryption information in response to the EAP authentication. The encryption information may include third-party encryption information or information identifying the third-party device.

The processing circuitry may be further configured to communicate with the third-party device on the network slice. The processing circuitry may communicate with the third party device according to protocols of the third-party encryption. The apparatus may activate the third-party encryption by transmitting the encryption information to the third-party device.

An exemplary embodiment of the present disclosure provides an apparatus, comprising processing circuitry configured to receive a registration request, from a user equipment (UE), to register to a network slice; transmit, to the UE in response to the registration request, a capability request for third-party encryption; receive, from the UE, a capability response that indicates a capability of the apparatus for third-party encryption; and transmit encryption information to the UE. The UE may activate third-party encryption on the network slice for communication with a third-party device.

An exemplary embodiment of the present disclosure provides a method performed by an apparatus including processing circuitry, the method comprising transmitting a registration request, to a network device, to register to a network slice; receiving, from the network device in response to the registration request, a capability request for third-party encryption; transmitting, to the network device, a capability response that indicates a capability of the apparatus for third-party encryption; receiving, from the network device in response to the capability response, encryption information; and activating third-party encryption on the network slice for communication with a third-party device.

An exemplary embodiment of the present disclosure provides a non-transitory computer readable storage medium having computer-readable instructions tangibly recorded thereon which, when executed by processing circuitry, cause the processing circuitry to perform a message service method on a network, the method comprising transmitting a registration request, to a network device, to register to a network slice; receiving, from the network device in response to the registration request, a capability request for third-party encryption; transmitting, to the network device, a capability response that indicates a capability of the apparatus for third-party encryption; receiving, from the network device in response to the capability response, encryption information; and activating third-party encryption on the network slice for communication with a third-party device.

It will be understood that any of the methods and processes described herein may be embodied in the form of computer executable instructions (i.e., program code) stored on a computer-readable storage medium, and when the instructions are executed by a machine, such as a computer, network device, machine-to-machine (M2M) terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in FIGS. 1A-14, specific terminology is employed for the sake of clarity. The claimed subject matter, however, may not be intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the application to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the application is indicated by the appended claims rather than the foregoing description and all changes that come within the meaning and range and equivalence thereof are intended to be embraced therein.

Efficiently Indicating to the Network which Policies are Installed on the UE

This section describes solutions for a how a UE can more efficiently indicate to the network what policies are stored on the UE.

As previously described, the UE uses the UE STATE INDICATION message to indicate to the PCF which policies are installed in the UE. This message may be carried inside of a container in the REGISTRATION REQUEST message.

Figure 17:
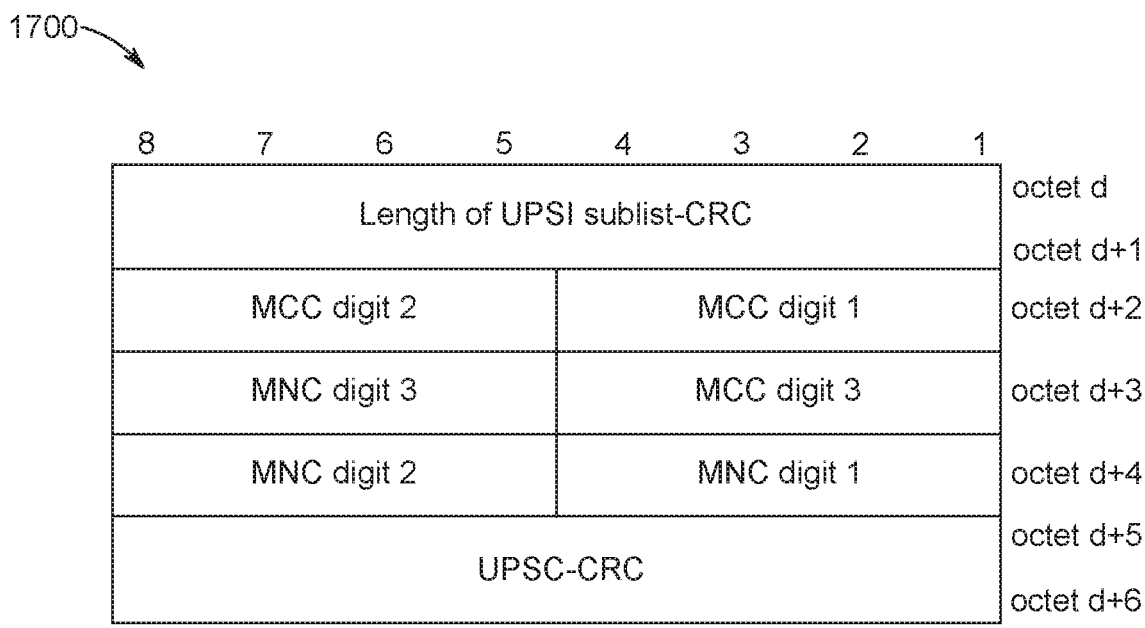
FIG. 17 shows an exemplary format of an enhanced UPSI sublist.

As previously described, the UE needs to indicate all of its stored PSI's for a given PLMN in the UE STATE INDICATION message. In order to make this message more efficient (i.e. smaller), it is proposed that, instead of sending all the UPSI's to the network, the UE instead sends a CRC value that is calculated based on all or part of the UPSI's that are associated with the PLMN. Note that an alternative to sending a CRC value may be sending values obtained from a hash function or other compression schemes or sending an identifier that can be mapped, or translated, to, one or more UPSI's. For example, a new type of information element can be created and carried included in the UE STATE INDICATION message. This new information can be part of the UPSI list instead of the UPSI sublist. The new information element can be called UPSI sublist-CRC and it can be formatted as shown in FIG. 17, which illustrates format 1700 of the enhanced UPSI sublist. Of course, if a CRC is not used, the information element may be called UPSI sublist-GroupID, etc.

The MCC and MNC digit fields can be used to encode the PLMN ID as described in reference TS 24.501. The UPSC- CRC field can be a CRC calculation that is performed on all of the installed UPSC values that are associated with the PLMN.

Note that, if the size of the UPSC-CRC value is fixed, then the "Length of UPSI sublist-CRC" field is not necessary in the UPSI sublist-CRC information element. However, if the length of the UPSC-CRC value is not fixed, for example because the UE is allowed to select from different types CRC calculations, then the "Length of UPSI sublist-CRC" can be used by the network to determine the length of the UPSC-CRC value.

When the PCF receives the UE STATE INDICATION message with the UPSI sublist-CRC information element, the PCF can perform the same CRC calculation on the UPSC's that should be installed on the UE. If the result of the calculation is the same as what is received in the UPSI-sublist CRC, then the PCF can understand that all necessary PSI's are installed on the UE. If the result is different, then PCF can determine that there is at least one PSI that needs to be installed, updated, or deleted.

When the PCF determines that the UE does not have all necessary policies, the PCF may install all the necessary policies in the UE by using the "UE Configuration Update procedure for transparent UE policy delivery" procedure and MANAGE UE POLICY COMMAND as previously described. The drawback of this approach is that the network might end up sending/re-installing policies that are already installed in the UE. In order to avoid this drawback, the PCF may send a new command to the UE to request that the UE Send the PCF a list of UPSI's that are installed on the UE. The new procedure may be a network-initiated UE STATE INDICATION or may be MANAGE UE POLICY COMMAND with a new instruction. The command, instruction, or procedure may cause the UE to send a UE STATE INDICATION and the command, instruction, or procedure may indicate to the UE that the UE STATE INDICATION needs to indicate all UPSC's or if the UE may instead include only the UPSC-CRC. Of course, if the PCF has already detected that the UE does not have all necessary policies, then the PCF will indicate to the UE that it must send all installed UPSC's to the PCF. The PCF can then determine which UPSC's are installed in the UE and then install, delete, or update any UPSIs that need to be installed, deleted, or updated.

The command, instruction, or procedure that was described in the previous paragraph is useful when the PCF wants to obtain information about the policies that are installed on the UE. The message that is sent from the UE may include a UPSC sublist (as shown in FIG. 15) which includes UPSC's that are installed on the UE for the PLMN. It may be useful to associate UPSC's with identifiers other than, or in addition to, PLMN ID (i.e. MCC and MNC). For example, it may be useful to associate UPSC's with certain groups, application type, OSId, user, or location. Such UPSC's could identify policies that are used by the UE when the UE is operating as a member of a certain group, using a particular type of application, OS, user, or in a location, regardless of what PLMN the UE is connect to. The network could then send a MANAGE UE POLICY COMMAND that instructs the UE to send, to the PCF, a list of what UPSC's are installed on the UE and are associated with a particular group, application type, OSId, user, or location.

How a UE Obtains a New Policy

This section describes solutions for a how a UE can indicate to the network that it needs policies to handle certain types of traffic.

As previously described, the UE may indicate to the network that it requests new V2X policies. However, as previously discussed, there are other times when a UE might want to request new URSP or ANDSP policies. Examples of these other times are when are a new application is installed or the UE's operating system being updated. However, in these other scenarios, the UE must perform a general registration procedure and indicate to the network all the of its installed PSI's.

Figure 18:
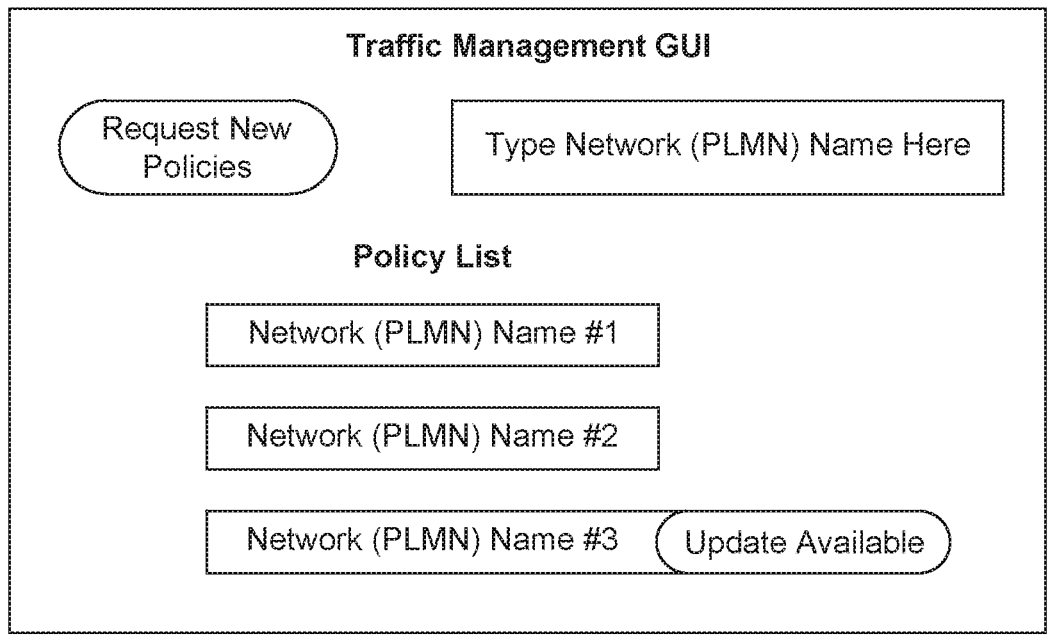
FIG. 18 shows an exemplary Traffic Management GUI.

It is proposed that the UE Policy Provisioning Request of section 6.2.4 of reference TS 23.287 incorporated herein by reference, be modified so that the UE can also use it to request URSP and ANSDP policies. For example, the UE Policy Provisioning Request may carry a UE STATE INDICATION message. The format of the UE STATE INDICATION message may be modified to allow the UE to indicate to the network that it needs a URSP policy for a certain type of traffic. For example, the UE STATE INDICATION message may be updated to allow the UE to indicate a Traffic Descriptor to the network. The Traffic Descriptor is defined in TS 24.526, incorporated herein by reference. Inclusion of a Traffic Descriptor in the UE STATE INDICATION message may be an indication to the network that the UE desires or needs a new or updated URSP rule for the associated traffic. For example, the UE may send this indication to the network when it finds that it cannot establish a route for traffic that meets the Traffic Descriptor e.g. when a PDU session establishment fails for the Traffic Descriptor or the UE attempts to update its allowed NSSAI to accommodate the route and determines that that it cannot update its allowed NSSAI. When the PCF receives the request, it may choose to send a new UPSI to the UE with a URSP policy that describes how to handle the associated traffic, or the PCF may choose to update an existing UPSI so that the UE is more likely to be able to successfully route the traffic. This new procedure may also be triggered when a new application is installed or updated on the UE, when the OS is updated, when a new OS is installed. Furthermore, the procedure may be triggered by a GUI. For example, a GUI that lists applications that are installed on the UE may allow a user to press a button to trigger the procedure for an application. The GUI may further allow the user to indicate what network the policy request should be for. The UE's request to the network could then specify what network (PLMN) the UE needs policies for. For example, the user may use this in a situation where he believes that the policies that are being used to handle the traffic of an application are out of date. The GUI may display a notification that indicates when policies were last updated or that the policies are out of date. The GUI may be aware that policies are out of date because, for example, when the OS was updated the update indicated to the UE policy identifiers (e.g. UPSC's) that should be installed or updated in the UE. An example of this GUI is shown in FIG. 18. In the example of FIG. 18, the GUI 1800 displays a Policy List that indicates for which networks the UE has policies. If updated policies are available, the UE may display an "Update Available" indicate. When a user presses, or click on, the Network Name, a new window may appear that lists the details of policies have been provisioned on the UE for the network. When a user presses the "Update Available" indication, the UE may request updated policies from the network for the network name that is indicated in the GUI.

Figure 19:
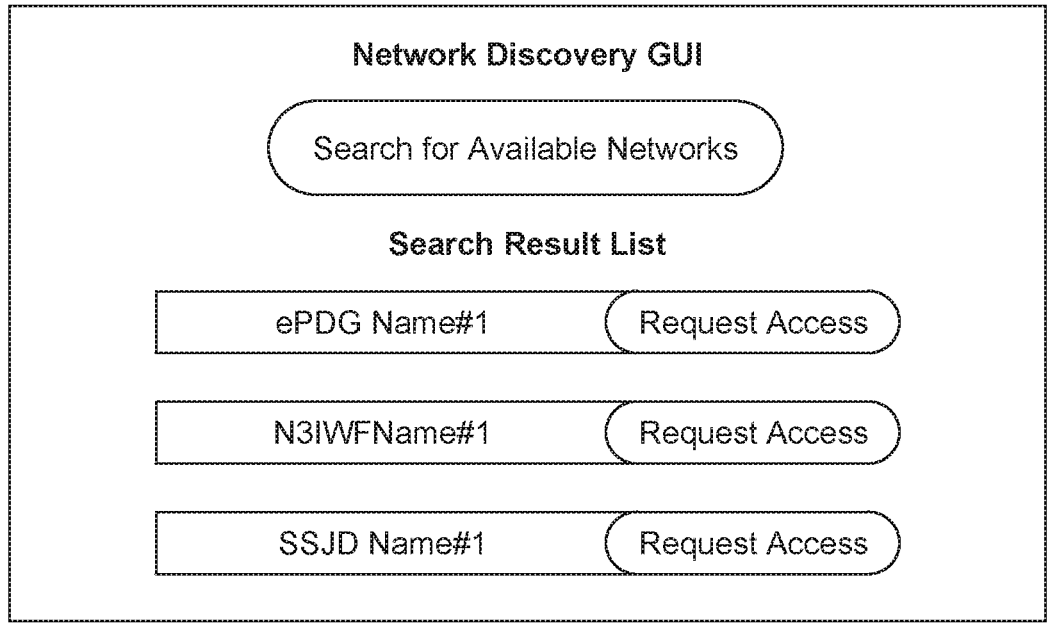
FIG. 19 shows an exemplary Network Discovery GUI.

Alternatively, the format of the UE STATE INDICATION message may be modified to allow the UE to provide to the network a copy of the packet that it could not route. The PCF can then analyze the packet and determine how to update the UE's policies The UE STATE INDICATION message may be updated to allow the UE to indicate an ePDG identifier, N3IWF Identifier, or SSID. Inclusion of an ePDG identifier, N3IWF Identifier, or SSID in the message may be an indication to the network that the UE would like to access the network via the ePDG identifier, N3IWF Identifier, or SSID. The PCF may respond to this request with a new ANDSP policy that can be used by the UE to access the network via the ePDG identifier, N3IWF Identifier, or SSID. The PCF may respond with an indication that the ePDG identifier, N3IWF Identifier, or SSID is not recognized or not allowed. This action may be triggered by the UE when the user uses a GUI to discover the availability of an ePDG, N3IWF, or SSID and touches a button that prompts the UE to request that the network provide it with an ANDSP policy that allows the UE to access the network via the ePDG, N3IWF, or SSID. An example of such is GUI 1900, which is illustrated in FIG. 19.

Transmission of the updated UE STATE INDICATION message by the UE to the network may also be triggered by events such as expiration of a validity timer on the UE, change of RAT by the UE (e.g. LTE RAT, NR RAT, WiFi), based on the UE's number of out-of-coverage entries, a change in location where a change of location may be defined as being a change in one or more of the following: PLMN, TS, or Cells, or a change in validity area where a change of validity area may be defined as being a change in one or more of the following: list of PLMN, list of TA, list of Cells. The enhanced UE Policy Provisioning Request that is described in this section is triggered by events that cause the UE to require new, or updated, URSP rules. Examples of events that might cause the UE to request new URSP rules are a new application being installed or the UE's operating system being updated, that the UE fails to map UL to an existing route, or that the UE maps UL data to an unestablished route and the unestablished route cannot be established. Other examples events are a prompt from a GUI where a user indicates to the UE that URSP rules should be refreshed. Another example is where an application requests that the UE refresh its URSP rules. In another example, an application (or GUI) may request that the UE retrieve a specific URSP rule(s) from the network. The specific URSP rule(s) may have an identifier such as a UPSC. The UR can then use the UE Policy Provisioning Request procedure that it would like to be provided with the identified URSP rule. The since a UPSC is PLMN specific and the application might not be PLMN aware, the identifier that is provided by the UE in the UE Policy Provisioning Request may be a globally unique identifier, such as an Application Identifier that the network can then use to determine what policies (identified by a UPSC) should be provided to the UE.

As previously described, URSP rules are used to associate application traffic with an existing, or new PDU session. If an application attempts to send uplink data and if the traffic cannot be associated to any PDU Session, the UE can inform the application that association of the application to PDU Session fails. In such a scenario, the Application may respond with an indication that the UE should attempt to acquire a URSP rule for the traffic from the network. The application may also provide an identifier that may be used by the UE to indicate to the network what URSP rule is needed.

How the Network Determines What Policies to Send to the UE

This section describes solutions for a how the network may determine what policies to send to the UE.

As previously discussed, if the network cannot determine what policies will be useful to the UE, then the network must send all policies to the UE that might be relevant to the UE (although some polices may actually be irrelevant); this is very inefficient.

As previously described, the UE could sometimes indicate to the network when it desires a policy that will allow it to handle a specific type of traffic or connect to a specific network.

However, there may be other times when the network is aware of the fact that it can provide policies that can be used by the network to more efficiently handle a particular type of traffic or to that can be used by the UE to connect to a particular type of network. The UE may not be aware of the fact that a policy is available. To handle such a scenario, then network (PCF) may send a message to the UE that lists Traffic Descriptors, ePDGs, N3IWFs, or SSIDs that the PCF can provide policies for. The UE may respond to the PCF with indications of the whether policies that are associated with the Traffic Descriptors, ePDGs, N3IWFs, or SSIDs are desired by the UE. For example, the inclusion of a Traffic Descriptor in the response from the UE may be an indication to the network that the associated application is installed on the UE. The PCF may use this indication to trigger the installation, update, of a PSI with the associated policy.

The initial message from the PCF to the UE, which indicates to the UE Traffic Descriptors, ePDGs, N3IWFs, or SSIDs that the PCF can provide policies for, may be triggered by:

- A message from an AF to the PCF. The message from the AF to the PCF may indicate to the PCF that the UE is in a location where an ePDG, N3IWF, or SSID may be reachable or that the UE has recently installed or updated an application or OS. The message from the AF to the PCF may be sent via the NEF.
- A message from the SMF that indicates that a certain type of traffic has been detected.
- A message from the AMF that the UE has entered a certain area. The PCF can use the UE's location to determine that the UE might want to use a particular type of application or access the network via a particular an ePDG, N3IWF, or SSID.
- A message from the NWDAF that it is anticipated that the UE will enter a certain area. The PCF can use the UE's anticipated location to determine that the UE might want to use a particular type of application or access the network via a particular an ePDG, N3IWF, or SSID.
- An unsuccessful PDU establishment attempt. The message from the PCF may be included in the PDU Establishment Reject message or it may be sent as part of a separate message to the UE.
- A message from the UDM/UDR to the PCF that indicates that the UE's subscription information has been updated. The PCF may have previously subscribed to this notification.

How the Network Determines if the UE is Correctly Applying URSP Rules

This section describes solutions for how the network may determine whether the UE is correctly applying URSP rules and how to handle the case where the UE is not correctly applying URSP rules.

As previously discussed, the network needs a way of checking that URSP rules are being correctly applied by the UE.

Checking that a UE is correctly applying URSP rules involves checking that the UE is selecting a correct slice among multiple slices, selecting a correct PDU session among multiple PDU sessions or that the UE is correctly deciding to establish a new PDU session rather than re-establishing a new PDU session. Since NF's that belong to a specific network slice should be unaware of other network slices, the NF that checks that the UE is correctly applying URSP rules should not be an NF that is only logically associated with one slice. Thus, it is proposed the PCF that is selected by the AMF for UE Policy Association Establishment during the UE's registration be the NF that checks that the UE is correctly applying URSP rules. This is the same PCF that sends URSP rules to the UE.

It might not be desirable, or efficient, for the PCF to check that every packet that is sent by the UE is sent via the correct route. Rather, it may be more efficient to only check that the UE is making the correct decision when it selects a route (i.e. selects an RSD) that has not been used for a certain amount of time, chooses to establish a new PDU session in order to create a route, chooses to establish a PDU session in a slice where it currently has no PDU session in order to create a route, or decides to request access to a new S-NSSAI in order to establish a PDU session in a slice where it currently has no PDU session in order to create a route. Furthermore, it might not be desirable to perform this check in all scenarios, rather, the network might only require the ability to check when PDU sessions are established to certain slices.

This application describes a solution where URSP events are detected at the UE and reported by the UE to the PCF so that the PCF can check that the UE is properly applying the URSP rules.

This application describes a solution where URSP events are detected at the UPF and reported by the UPF (via the SMF) to the PCF so that the PCF can check that the UE is properly applying the URSP rules.

This application also shows the procedure for how a UE is configured to detect URSP events, send URSP related reports to the PCF, and receive new or modified policy information from the PCF.

UE Based Detection of URSP Events—Configuring the UE to Send Report

It is proposed that new indication(s) be added to the UE Route Selection Policy Rule which is shown in Table 9. These new indication(s) may indicate to the UE that network verification is required for the URSP rule.

These new indication(s) may be associated with the entire URSP rule in the same way that the Rule Precedence is associated with this entire URSP rule. When an indication is associated with the entire URSP rule, the indication may be an indication to the UE that the UE should send a report to the network anytime that the UE begins to use the URSP rule or changes how it uses the URSP rule.

Alternatively, the indication(s) may be associated with the RSDs in the URSP rule in the same way that the RSD Precedence is associated with an RSD. When the indication(s) are associated with an RSD, the indication may be an indication to the UE that the UE should send a report to the network anytime that the UE begins to use the RSD or changes how it uses the RSD.

An indication may be simple on/off indication where the presence of the indication in the URSP rule is an indication to the UE that network verification is required. However, the indication may contain additional information that further describes what actions the UE should take in order to facilitate network verification of how the UE is applying URSP rules.

TABLE 9

Network Verification of URSP Indication - Information to be added to URSP Rules

| Field Name | Description |
| --- | --- |
| Network Verification of URSP Enabled Report at New PDU Session | The presence of this indication is an indication that Network Verification is required An indication that the UE should send a report to the network when this URSP Rule (or RSD) causes the UE to establish a new PDU session |
| Report at New PDU Session when First in Slice | An indication that the UE should send a report to the network when this URSP Rule (or RSD) causes the UE to establish a new PDU session and there are no existing PDU sessions for the slice |
| Report after duration | An indication that the UE should send a report when this URSP Rule (or RSD) is selected and has not been selected within the specified duration |
| Report first Traffic Descriptor Match | An indication that the UE should send a report when this URSP Rule (or RSD) is selected due to a Traffic Descriptor that matches and the Traffic Descriptor has not been matched with the URSP Rule (or RSD) within a specified duration |
| Location Criteria | An indication that reports should be sent, or should not be sent, when the UE is in certain locations, registration areas, etc. |
| Report on missing TCP Acknowledgements | An indication that reports should be sent if traffic that is associated RSD or URSP is experiencing a relatively large number of retransmissions, unacknowledged packets, etc. |
| Report at no Route Established | An indication that reports should be send when no existing route could be used to send the traffic and/or when a new route could not be established for the traffic. |
| Report on new Slice | An indication that a report should be sent when the traffic requires a new PDU Session to a slice where the UE currently has no existing PDU sessions and/or requires the UE to request that its Allowed NSSAI be updated. |

UE Based Detection of URSP Events—Sending a Report from the UE

As previously described, the UE may be triggered to report certain URSP related events to the network. These reports may be sent in a NAS message to the PCF via NAS-MM signaling. The report may contain the information that is listed in Table 10.

TABLE 10

URSP Event Report

| Field Name | Description |
| --- | --- |
| UPSI | The UPSI that is associated with the URSP rule that triggered the report. Alternatively, only the UPSC may be sent. |
| UE Policy Part ID | As defined in reference TS 24.501, a URSP policy is contained in a "UE Policy Part" Information Element. The "UE Policy Part" IE may be updated to include a UE Policy Part ID that is used by the UE and Network to identify a policy so that the UE can report which policy triggered a report. |
| UE Policy Part Index | Instead of enhancing the UE Policy Part ID to include a policy index. The UE Policy Part could be identified by an index, where the index is determined by the order of its placement in the UE Policy Section Contents Information element. |
| Traffic Descriptor | The Traffic Descriptor that triggered the report or part of the traffic descriptor (e.g. Traffic descriptor component type identifier) that triggered the report. The Traffic Descriptor is defined in TS 24.526. |

TABLE 10-continued

URSP Event Report

| Field Name | Description |
|---|---|
| Route Selection Descriptor ID | As defined in reference TS 24.526, a Route Selection Descriptor is contained in a "Route selection descriptor list" Information Element. The "Route Selection Descriptor" IE may be updated to include a Route Selection Descriptor ID that is used by the UE and Network to identify an RSD so that the UE can report which RSD triggered a report. |
| Route Selection Descriptor Index | Instead of enhancing the Route selection descriptor list to include an RSD index. The Route Selection Descriptor could be identified by an index, where the index is determined by the order of its placement in the Route selection descriptor list Information element. |
| Event Description | A description of the event that triggered the report. For example, the creation of a new PDU Session, the creation of a new PDU session in a slice where the UE previously had no PDU session, an update to the UE's request NSSAI, the inclusion of new traffic in a route where traffic that matches the associated traffic descriptor has not been sent on that route since a timer expired, etc. |

Alternatively, the URSP Event Report may be included in a PDU Session Establishment message. And forwarded by the AMF, or SMF, to the PCF to confirm that the traffic should have indeed caused the establishment of a new PDU Session.

UE Based Detection of URSP Events—Procedure for UE Based Reporting

This section presents a call flow showing the interaction between the UE and Network when the UE is configured to send URSP usage reports to the network (as described in 5.4.1.1), when the UE detects that a report is needed (as described in 5.4.1.1), and how the network sends a report to the network (as described in 5.4.1.2).

Figure 20:
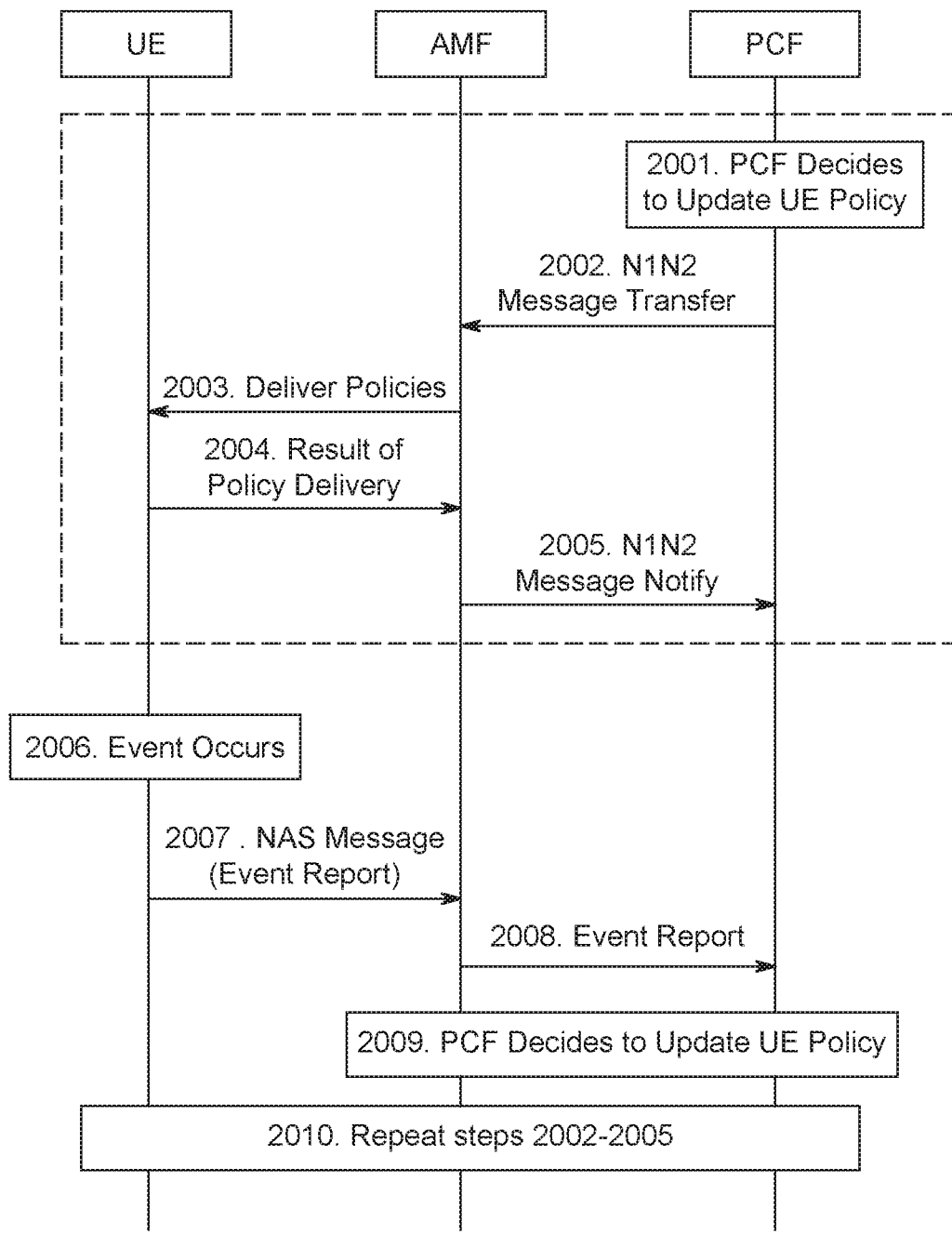
FIG. 20 shows an exemplary Procedure for UE Based Reporting.

The procedure is detailed in FIG. 20. Steps 2000-2005 and Steps 2009-2010 of procedure 2000 represent the UE Configuration Update procedure for transparent UE policy delivery which is detailed in section 4.2.4.3 of reference TS 23.502. The following description of FIG. 20 describes how the procedure should be enhanced.

2001. The PCF determines that policies should be configured on the UE.

2002. The PCF invokes Namf_Communication_N1N2MessageTransfer service operation provided by the AMF. The message includes SUPI, UE Policy Container. The UE policy container includes indications to the UE that the UE should sent reports to the PCF when certain URSP rules or route descriptors are used. These indications were described earlier in this application and in Table 9.

2003. The AMF transfers transparently the UE Policy container (UE access selection and PDU Session selection related policy information) received from the PCF to the UE. The UE Policy container includes the list of Policy Sections and the indications that reports are required. This message may be the MANAGE UE POLICY COMMAND.

2004. The UE updates the UE policy provided by the PCF and sends the result to the AMF.

2005. If the AMF received the UE Policy container and the PCF subscribed to be notified of the reception of the UE Policy container then the AMF forwards the response of the UE to the PCF using Namf_N1MessageNotify.

2006. An event occurs on the UE that causes the UE to determine that a report should be sent to the network. Examples of what events might cause the UE to make this determination are described earlier in this document and in Table 9 and include the establishment of a new PDU session, establishment of a new PDU session to a DNN or S-NSSAI where the UE currently has no established PDU session, modification of a PDU session, termination of a PDU session, determining that that a Requested NSSAI needs to be updated, etc.

2007. The UE sends a NAS message to the AMF. The message includes a container that will be transparently delivered to the PCF by the AMF. The container includes the event report. The content of the event report is described in earlier in this document and in Table 10. This information may be sent as part of the UE STATE INDICATION command 2008. The AMF forwards the container with the report to the PCF. The Npcf_UEPolicyControl_Update request service may be used to send the report to the PCF.

2009. The PCF evaluates the report and determines that a URSP rule is not being applied as desired, that new policies should be sent to the UE, that policies should be modified on the UE, or that policies should be removed from the UE.

2010. The PCF may repeat Steps 2002-2005, using the UE Configuration Update procedure for transparent UE policy delivery which is detailed in section 4.2.4.3 of reference TS 23.502 to send new policies to the UE, remove policies from the UE, or to modify policies on the UE.

In Steps 2001-2004, the UE is configured to send reports to the network for URSP related events. Alternatively, other procedures, such as MDT could be used to configure the UE to send such reports.

In Steps 2006-2007, the UE sends reports to the network for URSP related events. Alternatively, other procedures, such as MDT could be used to send such reports to the network.

Network-Based Detection of URSP Events

In a network-based approach, the PCF that performs the checking (i.e. the PCF that is selected by the AMF for UE Policy Association Establishment during the UE's registration) may configure an indication in the UE's subscription information that URSP checking should be enabled. The indication may be associated with the PCF's ID. When a PCF that serves one of the UE's PDU Sessions sees that indication is set in the UDR, the PCF may send the indication to the SMF that serves the PDU Session along with the associated PCF ID (the PCF that was selected for UE Policy Association Establishment). The indication from the PCF may be a trigger for the SMF to configure the UPF to report certain events to the SMF. An examples of an event that causes the UPF to report to the SMF is when the UPF detects that traffic matches a traffic descriptor. When the UPF sends an event report to the SMF, the SMF may forward the report to the PCF ID that was provided by the PCF that serves the PDU Session. The UPF may be configured to send reports the PCF when a traffic descriptor is matched, and the traffic is associated with a particular S-NSSAI and/or UE.

Checking the Event Report

As previously described, the PCF may receive a report from a UE and as previously described, the PCF may receive a report from a NF such as the SMF. The PCF may also perform any combination of the following steps.

1. Obtain the URSP policies that have been configured for the UE from the UDR (this step may be performed prior to receiving the report, e.g. during UE registration).

2. Obtain UE context information. For example, the UE's location may be obtained from the AMF.

3. Obtain information about the UE's PDU Sessions by subscribing to SMF's for notifications about PDU Session related events, etc.

The PCF may use the information in the report from the UE or SMF, UE context information (e.g. location), and information about the UE's PDU sessions to determine if the UE is correctly applying URSP rules.

If the PCF determines that the UE is not correctly applying URSP rules, then PCF may send a notification to the AMF requesting that the UE be de-registered, send new policies to the UE, uninstall policies from the UE, or update UE policies.

How the Network Determines when to Send Policies to the UE

This section describes solutions for how determines, or anticipates, that the UE will need new policies. Furthermore, this section describes how the UE may handle the case where it receives policies that related to traffic that is already ongoing.

As previously discussed, the policies that are needed by the UE may depend on the UE's location however, it might not be ideal to wait until a UE is in a location until sending it a new, or updated, policy.

One way to address this issue is for the PCF to invoke the Nnwdaf_AnalyticsSubscription (type=UE mobility information) service. This service can provide the PCF with predictions of where the UE will be at future times. Reference TS 23.288, incorporated herein by reference, describes how this procedure may be invoked by an NF. This service may be used by the PCF to periodically obtain predictions of the UE's future locations and the PCF may use these predictions to determine what policies to send to the UE and what policies to update on the UE as well as when to send the new policies or updates.

Another way to address this issue is to allow the PCF to subscribe to changes in the UE's Application Data that is stored in the UDR. Updates of the UE's Application Data may trigger the PCF to send new policies to the UE. Application that may be stored in the UDR is defined in reference TS 23.502 and includes PFDs, AF Traffic Influence Request Information, and Background Data Transfer information. Application Data may be enhanced to include anticipated, or future locations, of the UE. The AF may then configure the UDR (via the NEF) with anticipated, or future locations, of the UE by writing to the UE's Application Data (using Internal Group Identifier or SUPI as a Data Key). The PCF may subscribe to the UE's anticipated location information that is stored in the UDR so that the PCF may use this information to determine what policies to send to the UE and what policies to update on the UE as well as when to send the new policies or updates. The information that is provided by the AF and stored as Application Data in the UDR may further include identifiers of Applications that are installed on the UE, likely to be invoked by the UE, or likely to be installed on the UE. Furthermore, the list of anticipated applications may be associated with location and time information so that the network (PCF) can determine when and where it is likely that the UE will invoke certain applications. This information can then be used to determine what policies to send to the UE.

When new policies are sent to the UE the policies may relate to ongoing application traffic. For example, the UE may receive a UE Configuration Update message with a new, or updated, or deleted, URSP rule from the network when it enters a certain area or is about to enter a certain area. Depending on the type of application and traffic, it may or may not be desirable to have to the UE apply the updated URSP rules to the ongoing traffic. Thus, it is proposed that the UE Configuration Update command indicate to the UE when the updates rules should be enabled or indicate to the UE that the rules should not be enabled until the UE enters a certain location. Alternatively, the network may indicate to the UE that a URSP rule should not be evaluated when dealing with traffic that is already using an existing route/PDU session.

Group Based Policy Storage and Retrieval

This section describes how policies may be stored and retrieved in the UDR on a group basis and how the PCF may use this feature decrease the amount of information that it needs to retrieve from the UDR.

As previously discussed, it may be more efficient to store UE policies on a group basis. As described in reference TS 23.502, Policy Set Entry Data is currently stored per UE, using SUPI as a data key.

It is proposed that Group Data that is stored in the UDR and can be retrieved with an Internal Group Identifier or External Group Identifier Data Key as described in reference TS 23.502 be enhanced to include Policy Set Entry Data that may apply to all UE's in the group. When the PCF retrieves a UE's subscription data and sees that the UE is associated with an Internal Group Identifier or External Group Identifier, the PCF may use the Internal Group Identifier or External Group Identifier to retrieve the Policy Set Entry information that is associated with the group from the UDR. The PCF may also subscribe to changes in the Policy Set Entry information that is associated with the group. The PCF may use this information to determine what policies to send to the UE.

Alternatively, the UDR may be enhanced to allow Policy Set Entry Data to be stored, retrieved, and subscribed to, based on an Internal Group Identifier or External Group Identifier Data Key.

When the group's Policy Set Entry Data is stored in the UDR as part of Group Data or not, an AF may provide, or update the group's Policy Set Entry Data by sending the information to the UDR via the NEF.

When the PCF retrieves a policy for a UE from the UDR, the policy may indicate that it is a group policy and the indication may trigger the UE to send the policy to all UE's in the group.

Policy Management in Interworking Scenarios

This section describes how the UE can be provisioned with policies for its EPC traffic in scenarios where ANDSF is not available.

As previously described, there are scenarios where ANDSF is not available and policies need to be provisioned in the UE for when the UE is connected to EPC.

It is proposed that, when a UE registers with the 5GC, it indicates to the network that it is capable of interworking (i.e. connecting to the EPC). This indication may be a trigger to the network that the PCF should send the UE policies for 5GC and EPC. The PCF may send the UE different policies that for 5GC and EPC or each policy may include an indication of whether it should be applied when the UE is attached to 5GC, EPC, or both.

Note that instead of receiving this Interworking Indication from the UE via a NAS message, the PCF may receive this indication from the UDR as part of the UE's subscription information.

It is also proposed that, when a UE attaches or performs a TAU with the EPC, it indicates to the network that it is capable of interworking (i.e. connecting to the 5GC). This indication may trigger the MME to use the UE's identifier (e.g. IMSI) select a PCF via a DNS lookup. The MME may contact the PCF and provide the UE's identifier. The PCF may then provide with the MME with a policy container. The policy container may include EPC polices, 5GC policies, or both. The contents of the container may be transport to the MME. The MME may provide the container to the UE in the TAU Accept Message, Attach Accept Message, or in a new MME initiated NAS message. Note that the MME might not communicate directly with the PCF. Instead it may communicate with an AMF that is used for interworking between the EPC and 5GC. Thus, communication between the MME and PCF may be via an AMF.

Exemplary embodiments of the present application are provided as follows:

Example 1. An apparatus, comprising:
processing circuitry configured to
receive a policy from a network device;
process the policy according to context indications to determine whether the policy is to be applied to network traffic;
transmit a registration update request to the network device; and
establish a protocol data unit (PDU) session for communicating the network traffic.

Example 2. The apparatus according to Example 1, wherein the policy is a user equipment (UE) route selection policy (URSP).

Example 3. The apparatus according to Example 1, wherein
the policy includes pre-conditions, and
the processing circuitry processes the policy according to the pre-conditions.

Example 4. The apparatus according to Example 1, wherein the processing circuitry processes the policy according to validation criteria provided in the policy.

Example 5. The apparatus according to Example 1, wherein to process the policy, the processing circuitry is configured to check validation criteria, and apply preconditions and contexts to determine whether the policy is to be applied to the network traffic.

Example 6. The apparatus according to Example 1, wherein the processing circuitry is further configured to apply a preparation action.

Example 7. The apparatus according to Example 6, wherein
the processing circuitry applies the preparation action by selecting a route selection descriptor (RSD) from the policy, and
the RSD indicates the preparation action that is applied.

Example 8. The apparatus according to Example 1, wherein the registration update request indicates a request to register with a new Single Network Slice Selection Assistance Information (S-NSSAI).

Example 9. The apparatus according to Example 8, wherein
the S-NSSAI is associated with the network traffic, and
the request indicates that the apparatus is adding the S-NSSAI.

Example 10. The apparatus according to Example 8, wherein the PDU session is established in the S-NSSAI.

Example 11. The apparatus according to Example 10, wherein the processing circuitry uses the PDU session to communicate the network traffic.

Example 12. The apparatus according to Example 1, wherein the processing circuitry processes the policy to determine a priority of the network traffic.

Example 13. The apparatus according to Example 1, wherein the processing circuitry processes the policy to determine a congestion free network slice.

Example 14. The apparatus according to Example 1, wherein the processing circuitry processes the policy to determine a priority of an ongoing network communication session.

Example 15. The apparatus according to Example 14, wherein the processing circuitry ends the ongoing network communication session before establishing the PDU session.

Example 16. The apparatus according to Example 1, wherein the PDU session is conducted on a network slice provided by the network device.

Example 17. The apparatus according to Example 16, wherein the network slice is mutually exclusive from another network slice.

Example 16. The apparatus according to Example 1, wherein the processing circuitry is further configured to execute a Mutually Exclusive Access to Network Slices (MEANS) procedure.

Example 17. The apparatus according to Example 16, wherein the processing circuitry is further configured to control a display to display a graphical user interface (GUI) for input, form a user, of information for the MEANS procedure.

Example 18. The apparatus according to Example 17, wherein the information includes contexts for the policy.

Example 19. The apparatus according to Example 17, wherein the information includes preconditions for the policy.

Example 20. The apparatus according to Example 17, wherein the information includes preparation actions for the policy.

Example 21. The apparatus according to Example 1, wherein first network traffic is allocated to a first slice provided by the network device and second network traffic is allocated to a second slice provided by the network device.

Example 22. The apparatus according to Example 1, wherein the processing circuitry is further configured to
determine, based on the policy and the context indications, a higher priority slice of the first slice and the second slice, and
maintain one of the first network traffic and the second network traffic that corresponds to the higher priority slice and terminate another of the first network traffic and the second network traffic.

Example 23. The apparatus according to Example 22, wherein
the registration update request indicates a terminated slice of the first slice and the second slice, and
the PDU session is performed on the higher priority slice.

24. A method performed by an apparatus including processing circuitry, the method comprising:
receiving a policy from a network device;
processing, by the processing circuitry, the policy according to context indications to determine whether the policy is to be applied to network traffic;
transmitting a registration update request to the network device; and
establishing a protocol data unit (PDU) session for communicating the network traffic.

25. A non-transitory computer readable storage medium having computer-readable instructions tangibly recorded thereon which, when executed by processing circuitry, cause the processing circuitry to perform a message service method on a network, the method comprising:
receiving a policy from a network device;
processing the policy according to context indications to determine whether the policy is to be applied to network traffic;
transmitting a registration update request to the network device; and
establishing a protocol data unit (PDU) session for communicating the network traffic.

Example 26. An apparatus, comprising:
processing circuitry configured to
transmit a policy to a user equipment (UE) that processes the policy;
receive a registration update request from the UE; and
establish a communication session with the UE.

Example 27. An apparatus, comprising:
processing circuitry configured to
transmit a registration request, to a network device, to register to a network slice;
receive, from the network device in response to the registration request, a capability request for third-party encryption;
transmit, to the network device, a capability response that indicates a capability of the apparatus for third-party encryption;
receive, from the network device in response to the capability response, encryption information; and
activate third-party encryption on the network slice for communication with a third-party device.

Example 28. The apparatus according to Example 27, wherein the registration request triggers a slice-specific secondary authentication and authorization procedure.

Example 29. The apparatus according to Example 28, wherein the network device transmits the capability request to the apparatus according to the slice-specific secondary authentication and authorization procedure.

Example 30. The apparatus according to Example 27, wherein the processing circuitry EAP authenticates the network device and then transmits the capability of the apparatus.

Example 31. The apparatus according to Example 30, wherein the network device transmits the encryption information in response to the EAP authentication.

Example 32. The apparatus according to Example 27, wherein the encryption information includes third-party encryption information.

Example 33. The apparatus according to Example 32, wherein the third-party encryption information includes information identifying the third-party device.

Example 34. The apparatus according to Example 27, wherein the processing circuitry is further configured to communicate with the third-party device on the network slice.

Example 35. The apparatus according to Example 34, wherein the processing circuitry communicates with the third party device according to protocols of the third-party encryption.

Example 36. The apparatus according to Example 32, wherein the apparatus activates the third-party encryption by transmitting the encryption information to the third-party device.

Example 37. An apparatus, comprising:
processing circuitry configured to
receive a registration request, from a user equipment (UE), to register to a network slice;
transmit, to the UE in response to the registration request, a capability request for third-party encryption;
receive, from the UE, a capability response that indicates a capability of the apparatus for third-party encryption; and
transmit encryption information to the UE, wherein
the UE activates third-party encryption on the network slice for communication with a third-party device.

Example 38. A method performed by an apparatus including processing circuitry, the method comprising:
transmitting a registration request, to a network device, to register to a network slice;
receiving, from the network device in response to the registration request, a capability request for third-party encryption;
transmitting, to the network device, a capability response that indicates a capability of the apparatus for third-party encryption;
receiving, from the network device in response to the capability response, encryption information; and
activating third-party encryption on the network slice for communication with a third-party device.

Example 39. A non-transitory computer readable storage medium having computer-readable instructions tangibly recorded thereon which, when executed by processing circuitry, cause the processing circuitry to perform a message service method on a network, the method comprising:
transmitting a registration request, to a network device, to register to a network slice;
receiving, from the network device in response to the registration request, a capability request for third-party encryption;
transmitting, to the network device, a capability response that indicates a capability of the apparatus for third-party encryption;
receiving, from the network device in response to the capability response, encryption information; and
activating third-party encryption on the network slice for communication with a third-party device.

Example 40. An apparatus, comprising:
processing circuitry configured to
determine an identifier that represents groups of policies that are installed on the apparatus; and
transmit the identifier a network.

Example 41. The apparatus according to Example 40, wherein the determining the identifier includes a calculation that is based on a CRC or hash function.

Example 42. The apparatus according to Example 40, wherein the determining the identifier includes receiving the identifier from the network.

Example 43. The apparatus according to Example 42, wherein the identifier is received from the network as part of a UPSI list or the UPSI sublist information element.

Example 44. The apparatus according to Example 40, wherein the identifier is transmitted to the network in a UE STATE INDICATION message.

Example 45. The apparatus according to Example 40, wherein the apparatus is triggered by a message from the network to send the identifier to the network.

Example 46. The apparatus according to Example 45, wherein the trigger is sent in the MANAGE UE POLICY COMMAND.

Example 47. The apparatus according to Example 45 or 46, wherein the message further instructs the UE whether it should send, to the network, policy group identifiers to the network or an identifier that identifies more than one group of policies.

Example 48. The apparatus according to Example 40, wherein the identifier is created on a per PLMN, group, OS, user, location, or application type basis.

Example 49. The apparatus according to Example 40, wherein the apparatus receives a response message from the network that updates the apparatus's policies, deletes one or more of the apparatus' policies, or provides new policies to the apparatus.

Example 50. An apparatus, comprising:
processing circuitry configured to
receive a message from a network with configuration information that indicates that notifications related to the application of policies by the apparatus is desired; and
transmit a notification to the network, the notification relating to the application of policies by the apparatus Example 51. The apparatus according to Example 50, wherein the first message is a MANAGE UE POLICY COMMAND.

Example 52. The apparatus according to Example 50, wherein the notification is a sent in a UE STATE INDICATION.

Example 53. The apparatus according to Example 50, wherein the apparatus receives a second message from the network that provides the apparatus with new or updated or deleted policies that relate to the notification.

Example 54. The apparatus according to Example 50, wherein the configuration information is part of a URSP rule.

Example 55. The apparatus according to Example 50, wherein the notification is sent by the apparatus when the apparatus detects any of the events in Table 9 or the apparatus establishes a new PDU session, establishes a new PDU session to a DNN or S-NSSAI where the UE currently has no established PDU session, modifies a PDU session, terminates a PDU session, or determines that a Requested NSSAI needs to be updated.

Example 56. The apparatus according to Example 50, wherein the notification includes any of the information in Table 10.

Example 57. A policy control function, comprising:
processing circuitry configured to
receive analytic information related to the behavior of a user equipment;
use the received analytic information to determine what policies should be sent to the user equipment; and
send, to the user equipment, a message that updates what policies are installed on the user equipment.

Example 58. The apparatus according to Example 57, wherein the analytic information is received from an NWDAF or an AF.

Example 59. The apparatus according to Example 57, wherein the analytic information is received the UDR.

Example 60. The apparatus according to Example 59, wherein the policy control function subscribes to the UDR for the analytic information.

Example 61. An apparatus, comprising:
processing circuitry configured to
receive a message from a network that include policies and indicates conditions for when the policies should be applies; and
apply the policy when the indicated conditions apply Example 62. The apparatus according to Example 61, wherein the conditions indicate when the policies should be enabled or the conditions indicate that the rules should not be enabled until the apparatus enters a certain location or the conditions indicate to the UE that the a policy should not be applies when dealing with traffic that is already using an existing PDU session.

Example 63. A policy control function device, comprising:
processing circuitry configured to
receive subscription information for a data repository for a user equipment, the subscription information includes a group identifier;
use the group identifier to retrieve policy information from the data repository;
subscribe to the data repository for a notification when the policy information that is associated with the group identifier is updated;
receive a notification from the data repository that includes the policy information; and
determine to send updated policy information to more than one user equipment, the more than one user equipment all being associated with the group identifier.

Example 64. An apparatus, comprising:
processing circuitry configured to
transmit to a first type of network a first indication that the apparatus is capable of connecting to a second type of network;
receive policies from the network, the policies include second indication of whether they apply to the first type of network or the first type network; and
applying the policies according to the second indications.

Example 65. The apparatus according to Example 64, wherein the first indication is transmitted in an attach, registration, or tracking area update message.

Example 66. The apparatus according to Example 64, wherein the first network type is one of EPC and 5GC and the second network type is the other of EPC and 5GC.

Example 67. The apparatus according to Example 64, wherein the policies are received in a NAS message from an AMF or MME.

What is claimed is:

1. An apparatus, comprising:
processing circuitry configured to:
determine that a policy is needed from a network for at least one of a specific type of traffic or a type of network connection;
transmit a non-access stratum (NAS) message to the network to request the policy, wherein the message indicates at least one of the specific type of the traffic or the type of network connection required by the policy; and
receive a response from the network, wherein the NAS message is a user equipment (UE) STATE INDICATION.

2. The apparatus according to claim 1, wherein the policy is a UE route selection policy (URSP).

3. The apparatus according to claim 1, wherein the NAS message includes a Traffic Descriptor.

4. The apparatus according to claim 1, wherein the NAS message includes at least one of an Evolved Packet Data Gateway (ePDG) identifier, a Non-3GPP Interworking Function (N3IWF) Identifier, or a Service Set Identifier (SSID).

5. The apparatus according to claim 1, wherein the processing circuitry is further configured to determine whether to send the NAS message in one of a case in which the processing circuitry cannot establish a route for a data packet or a case in which a new application is installed.

6. The apparatus according to claim 5, wherein the processing circuitry is further configured to determine that the apparatus cannot establish the route for the data packet in one of a case in which a protocol data unit (PDU) session establishment fails or in a case in which the processing circuitry unsuccessfully attempts to update an allowed Network Slice Selection Assistance Information (NSSAI).

7. The apparatus according to claim 1, wherein the processing circuitry is further configured to whether determines to send the NAS message based on an indication from a graphical user interface (GUI).

8. An apparatus, comprising:
processing circuitry configured to
receive a first non-access stratum (NAS) message from a network with configuration information that indicates that notifications, associated with a use of policies, are desired by the apparatus; and
transmit a second NAS message to the network, the second NAS message includes the notifications associated with the use of policies by the apparatus, wherein the second NAS message is a user equipment (UE) STATE INDICATION.

9. The apparatus according to claim 8, wherein the first NAS message indicates that the notifications are desired for the use of at least one of a UE route selection policy (URSP) Rule, a protocol data unit (PDU) Session, a Traffic Descriptor, or a failure of a route to be established.

10. The apparatus according to claim 8, wherein the processing circuitry is further configured to transmit the second NAS message based on at least one of a determination by the processing circuitry of one of a use a UE rule selection policy (URSP) Rule, an establishment of a new protocol data unit (PDU) Session, a modification of an existing PDU Session, a termination of the existing PDU session, an update of an Allowed Network Slice Selection Assistance Information (NSSAI), a match of a piece of application traffic with a Traffic Descriptor, or a failure of an attempt to establish a new route.

11. The apparatus according to claim 10, wherein the notifications in the second NAS message includes at least one of a policy identifier, a route description identifier, or the traffic descriptor.

12. The apparatus according to claim 8, wherein the first NAS message is a MANAGE UE POLICY COMMAND.

13. The apparatus according to claim 8, wherein the notifications in the second NAS message is sent in the UE STATE INDICATION.

14. The apparatus according to claim 8, wherein the processing circuitry is further configured to receive a third NAS message from the network based on the notifications, wherein the third NAS message includes information associated with at least one of a new policy, an updated policy or a deleted policy.

15. The apparatus according to claim 8, wherein the configuration information is part of a UE rule selection policy (URSP) rule.

16. The apparatus according to claim 8, wherein the first NAS message is received from a policy control function (PCF) and the second NAS message is sent to the PCF.

17. A method, comprising:
determining, by processing circuitry, that a policy is needed from a network for at least one of a specific type of traffic or a type of network connection;
transmitting a non-access stratum (NAS) message to the network to request the policy, wherein the message indicates at least one of the specific type of the traffic or the type of network connection required by the policy; and
receiving a response from the network, wherein the NAS message is a user equipment (UE) STATE INDICATION.

18. The method according to claim 17, wherein the NAS message includes at least one of an Evolved Packet Data Gateway (ePDG) identifier, a Non-3GPP Interworking Function (N3IWF) Identifier, or a Service Set Identifier (SSID).

* * * * *